(12) United States Patent
Kumagai et al.

(10) Patent No.: US 7,058,002 B1
(45) Date of Patent: Jun. 6, 2006

(54) OFDM PACKET COMMUNICATION RECEIVER

(75) Inventors: Tomoaki Kumagai, Tokyo (JP);
Masahiro Morikura, Kanagawa (JP);
Masato Mizoguchi, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/787,927

(22) PCT Filed: Apr. 21, 2000

(86) PCT No.: PCT/JP00/02611

§ 371 (c)(1),
(2), (4) Date: Apr. 2, 2001

(87) PCT Pub. No.: WO00/65756

PCT Pub. Date: Nov. 2, 2000

(30) Foreign Application Priority Data

| Apr. 22, 1999 | (JP) | ................................. 11-115144 |
| Apr. 22, 1999 | (JP) | ................................. 11-115145 |
| Jun. 16, 1999 | (JP) | ................................. 11-169719 |
| Jun. 17, 1999 | (JP) | ................................. 11-171072 |
| Feb. 23, 2000 | (JP) | ............................. 2000-045963 |

(51) Int. Cl.
*H04J 11/00* (2006.01)

(52) U.S. Cl. ........................ 370/203; 375/260

(58) Field of Classification Search ................ 370/203, 370/208, 210, 503, 522, 516; 375/147, 136, 375/142, 143, 260, 326, 327
See application file for complete search history.

(56) References Cited

U.S. PATENT DOCUMENTS

| 5,787,123 A | * | 7/1998 | Okada et al. ................ 375/324 |
| 6,169,751 B1 | * | 1/2001 | Shirakata et al. ........... 370/480 |
| 6,219,334 B1 | * | 4/2001 | Sato et al. ................... 370/210 |

FOREIGN PATENT DOCUMENTS

| JP | 2000-165341 | 6/2000 |
| JP | 2000-165344 | 6/2000 |

OTHER PUBLICATIONS

Y. Matsumoto et al.; The Institute of Electronics, Information and Communication Engineers, vol. 98, No. 435, pp. 69-74. Nov. 27, 1998. See PCT search report.

Shuta Uwano et al.; The Institute of Electronics Information and Communication Engineers, pp. 364, B-5-13, Mar. 1999. See PCT search report.

Tadahiro Makabe et al.; The Institute of Electronics Information and Communication Engineers, pp. 376, B-5-25, Mar. 1999. See PCT search report.

* cited by examiner

*Primary Examiner*—Brenda Pham
(74) *Attorney, Agent, or Firm*—Armstrong, Kratz, Quintos, Hanson & Brooks, LLP

(57) ABSTRACT

In an OFDM packet communication receiver, the deterioration of received signal quality is suppressed, even when carrier frequency error and/or clock frequency error exists between a transmitter and a receiver, and/or phase noise and/or thermal noise is superimposed to a received signal in a receiver.

91 Claims, 48 Drawing Sheets

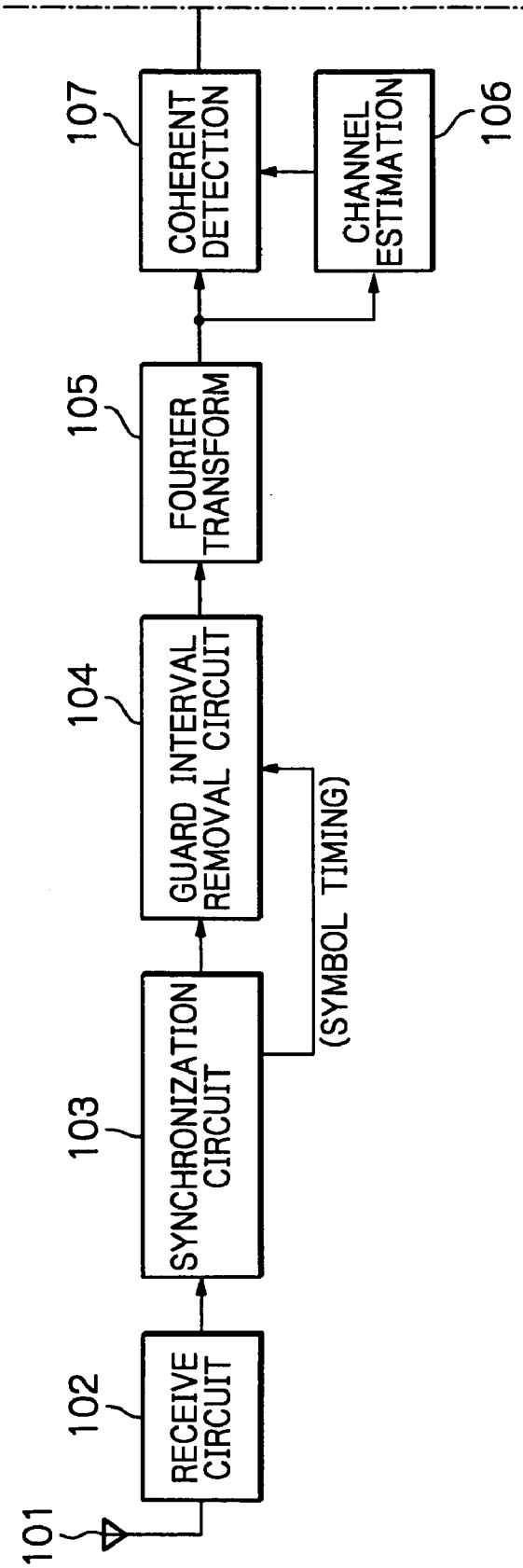

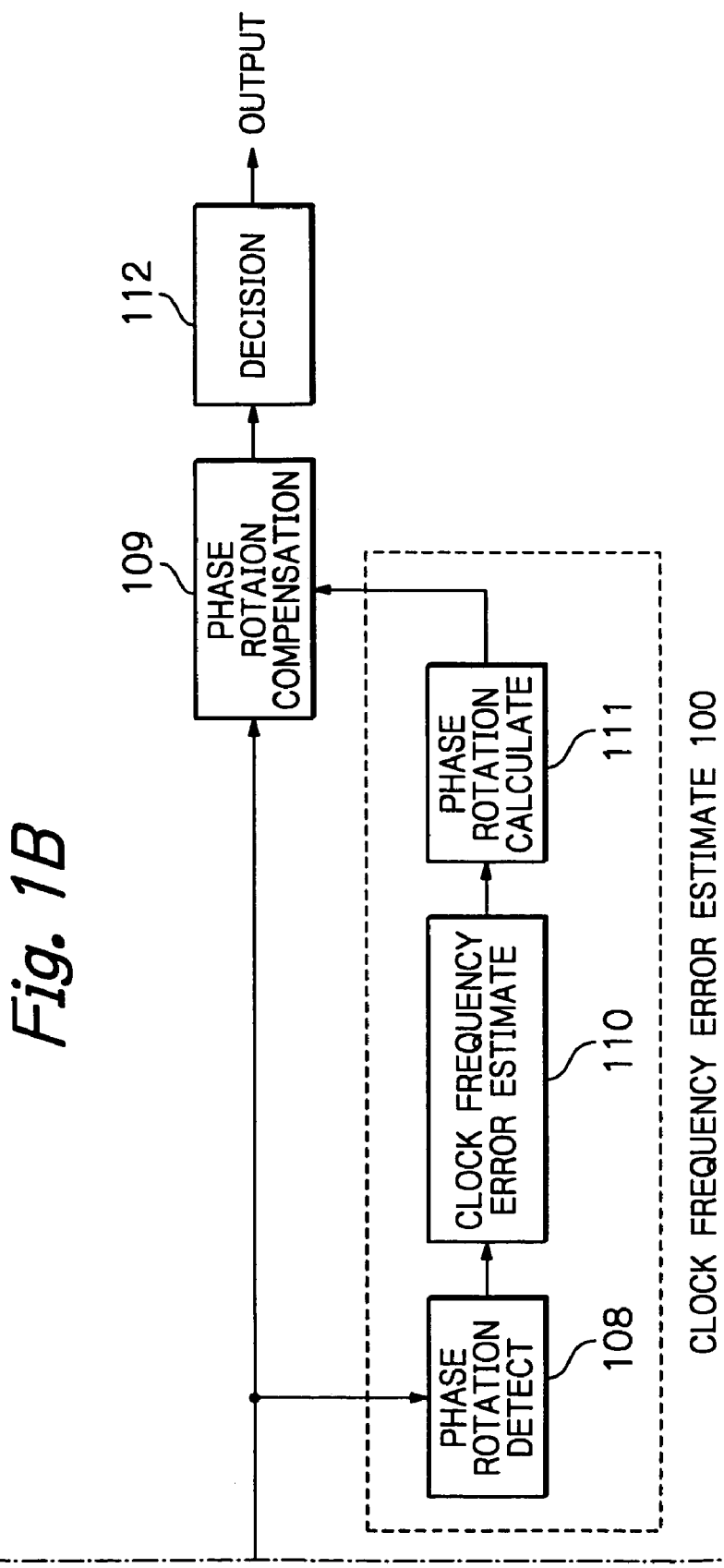

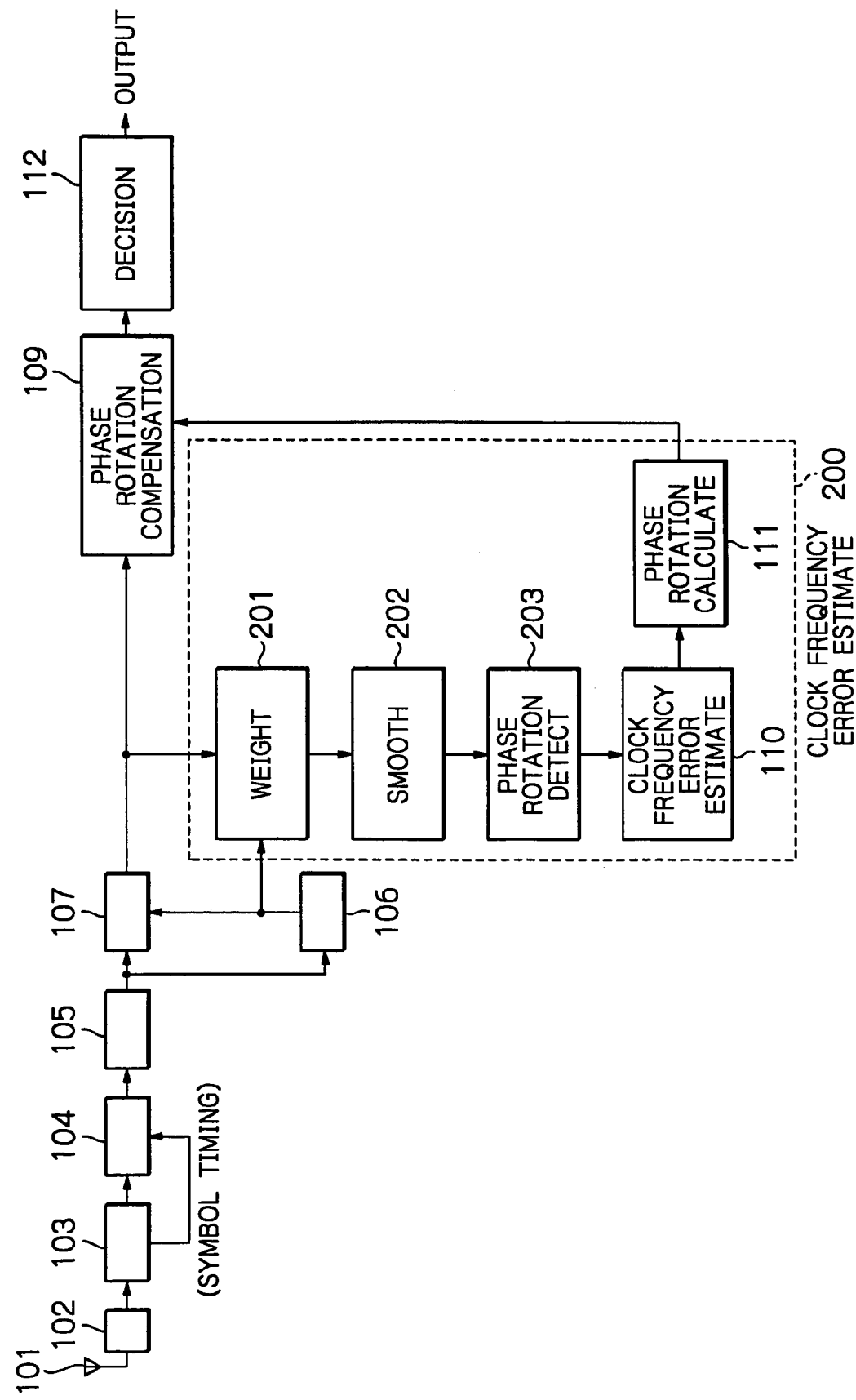

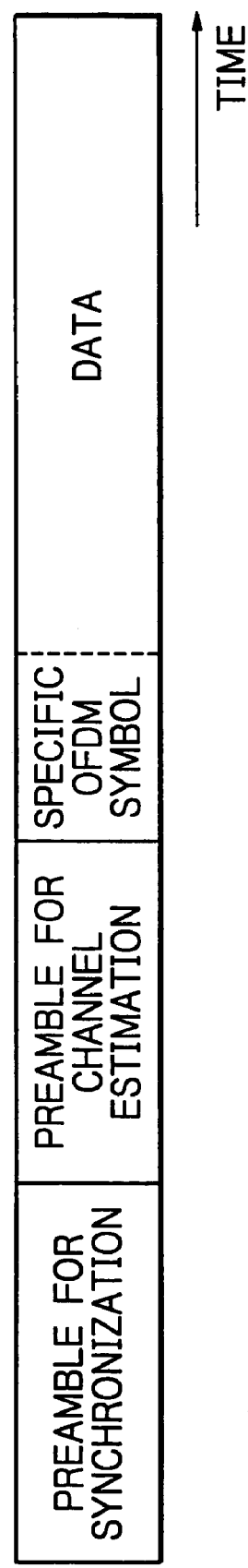

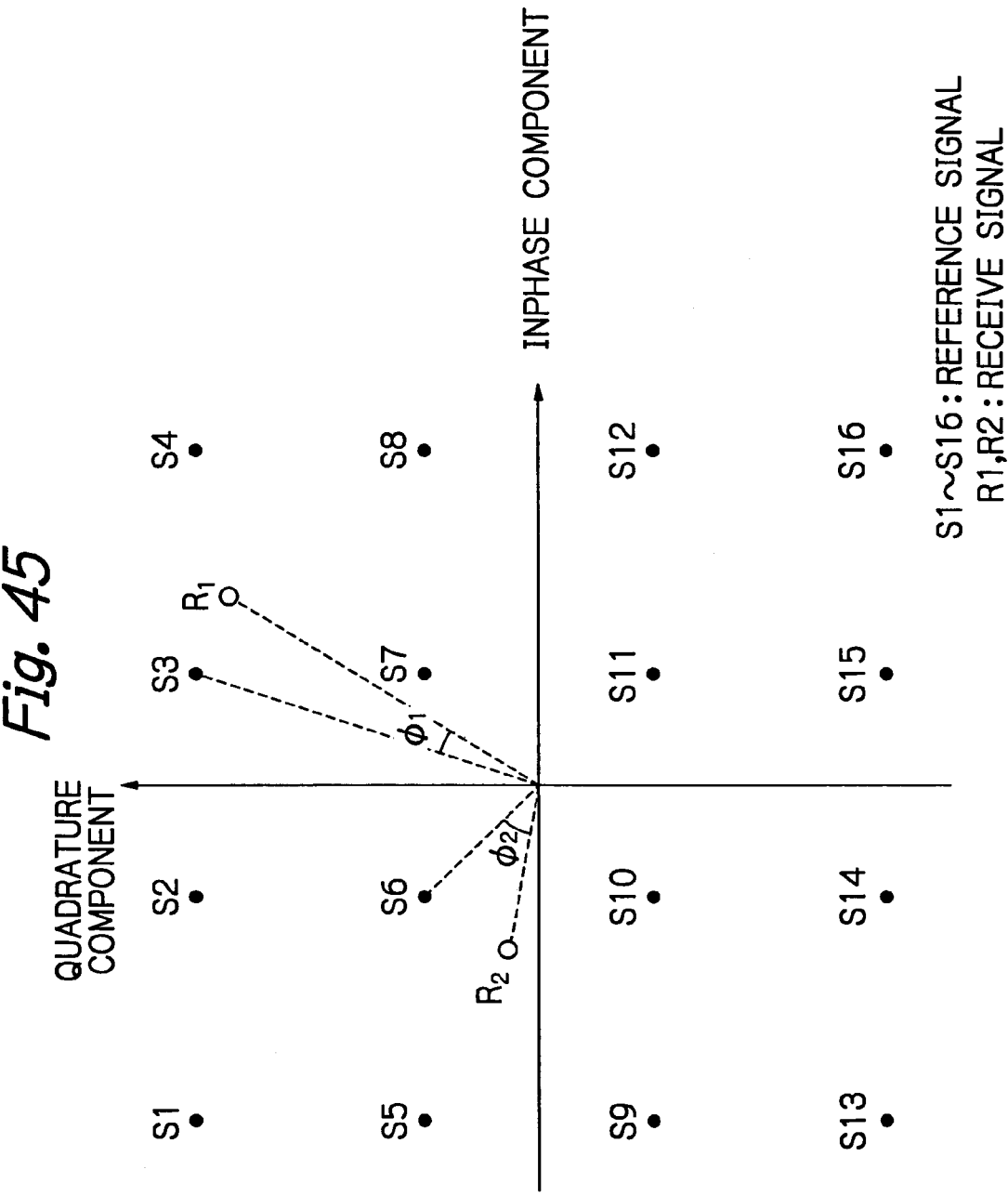

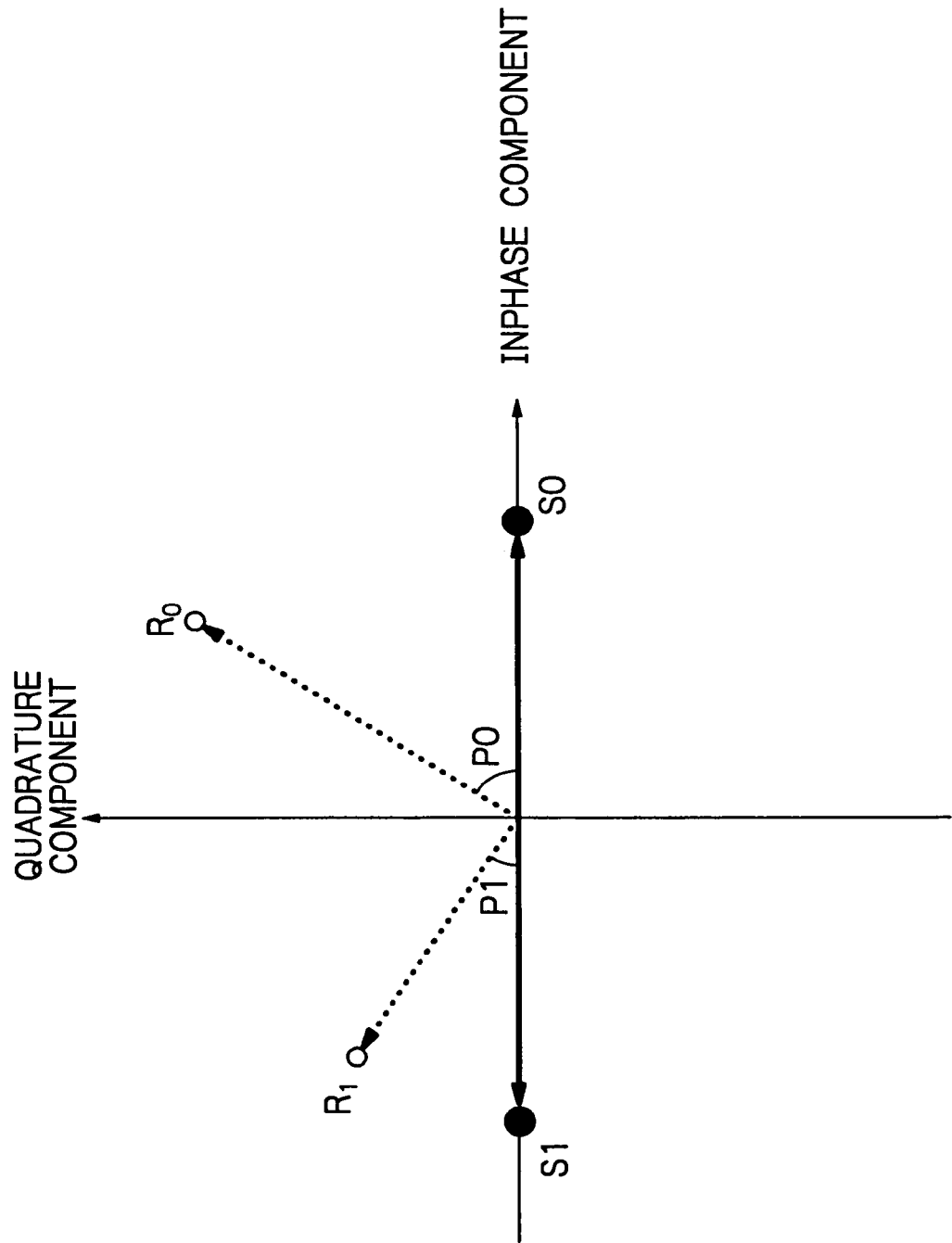

OFDM PACKET COMMUNICATION RECEIVER

BACKGROUND OF THE INVENTION

The present invention relates to a packet communication receiver used in OFDM (Orthogonal Frequency Division Multiplexing) digital wireless communication system. In particular, it relates to an OFDM receiver for demodulating OFDM signals accurately with little process delay and high transmission efficiency, even when there is a sampling clock frequency error and/or a carrier frequency error between a transmitter and a receiver, and/or received signals are affected by phase noise and/or thermal noise.

DESCRIPTION OF THE RELATED ART

An OFDM system is a kind of multicarrier transmission system which divides an original high rate signal stream into a plurality of low rate parallel signal streams and transmits them simultaneously. In an OFDM system, each subcarrier is closely located orthogonally with one another on the frequency axis. In general, when high rate signals are transmitted through wireless channel, signal quality will be degraded because of inter-symbol interference due to multi-path propagation caused by reflection and/or diffraction. However, in multicarrier systems such as OFDM systems, inter-symbol interference due to multi-path propagation is mitigated, because transmission rate of each subcarrier is decreased by the parallel transmission even in high rate transmission.

Moreover, OFDM systems have an advantage that each subcarrier can be easily multiplexed at a baseband process part of a transmitter by using inverse fast Fourier transform (IFFT), and each subcarrier can be easily de-multiplexed at a baseband process part of a receiver by using fast Fourier transform (FFT). Therefore, both a transmitter and a receiver can be simplified in structure. Further, by utilizing the nature of Fourier transform, a transmitter may transmit each OFDM symbol having a guard interval which is obtained by cyclical extending an inverse fast Fourier transform output, and a receiver takes only signals which have less inter-symbol interference in OFDM signal stream by using FFT window, so that inter-symbol interference is further decreased. Furthermore, because of the presence of a guard interval, a receiver can demodulate signals with no interference originated in adjacent symbols, even when symbol timing, i.e. FFT window timing, has a small timing error within said guard interval due to noise component and suchlike. Thus, no accurate timing synchronization, which is essential in single-carrier transmission systems, is required in OFDM systems. Accordingly, OFDM systems are suitable for high rate radio transmission.

A prior OFDM packet communication receiver is described in accordance with FIG. 43. It is assumed that a packet format shown in FIG. 44 is used to transmit OFDM signals.

In FIG. 43, OFDM signals received by an antenna 1 are fed to a receiving circuit 2, which carries out receiving process including frequency conversion, filtering, orthogonal detection and analog-to-digital (A/D) conversion to input OFDM signals, and outputs baseband signals in complex form. Clock frequency error information signals provided by a clock frequency error detector 8 are fed to the receiving circuit 2. The details of a clock frequency error will be described later. The receiving circuit 2 carries out said receiving process and compensates the sampling clock frequency by controlling an analog oscillator which is used for A/D conversion and others by using said clock frequency error information.

Output complex baseband signals of the receiving circuit 2 are fed to a synchronization circuit 3, which detects both carrier frequency error and OFDM symbol timing by using preamble signals for synchronization located in the header part of a packet, and outputs complex baseband signals after the carrier frequency error compensation process by using said detected carrier frequency error information. Moreover, the synchronization circuit 3 also outputs said detected OFDM symbol timing information. The OFDM symbol timing information is used in a succeeding guard interval removing circuit 4 which removes signals corresponding to guard intervals from the complex baseband signals, and extracts signals which are fed to a Fourier transform circuit 5.

Output signals of the synchronization circuit 3, which are the signals with carrier frequency error compensated and the OFDM symbol timing information signal, are fed to the guard interval removing circuit 4. The guard interval removing circuit 4 removes the signals corresponding to the guard interval from each OFDM symbol by applying the FFT window having time width equal to the difference of OFDM symbol duration and guard interval length so that the signals which should be fed to the Fourier transform circuit 5 are extracted.

The output signals of the guard interval removing circuit 4 are fed to the Fourier transform circuit 5, which carries out fast Fourier transform to the input signals which are free from the guard interval to provide frequency components of each subcarrier, and outputs subcarrier signals each separated on baseband region. The Fourier transform circuit 5 carries out fast Fourier transform for each OFDM symbol, and outputs subcarrier signals of each OFDM symbol.

Subcarrier signals, which are the output signals of the Fourier transform circuit 5, are fed to a coherent detection circuit 7, a channel estimator 6 and a clock frequency error detector 8. The clock frequency error detector 8 detects phase rotation of each subcarrier caused by sampling clock frequency error used in the receiving circuit 2, calculates sampling clock frequency error between a transmitter and a receiver based upon the detected phase rotation of the subcarriers, and outputs calculated clock frequency error information.

For example, in the case where 16QAM modulation scheme is used to modulate each subcarrier, a signal after coherent detection is to locate one of 16 reference signals S1 through S16 as shown in FIG. 45. However, when there exists a sampling clock frequency error between a transmitter and a receiver, the signals which are coherent detected are subject to said phase rotation, and output signals from the coherent detection circuit 7 (e.g., R1 or R2 in FIG. 45) do not coincide with one of the reference signals S1 through S16.

Therefore, a clock frequency error detector 8 detects phase rotation of each subcarrier in each OFDM symbol. For instance, when an output signal of the coherent detection circuit 7 is R1 in FIG. 45, the clock frequency error detector 8 finds the reference signal S3 which is the closest to the input signal R1 among the reference signals S1 through S16, and detects the phase difference θ1 between the reference signal S3 and the input signal R1. Further, when an output signal of the coherent detection circuit 7 is R2 in FIG. 45, the clock frequency error detector 8 finds the reference signal S6 which is the closest to the input signal R2 among the reference signals S1 through S16, and detects the phase difference 2 between the reference signal S6 and the input signal R2.

Now, the phase rotation of output subcarrier signals of the Fourier transform circuit 5 in the case where there is a sampling clock frequency error between a transmitter and a receiver is explained.

As mentioned above, the guard interval removing circuit 4 removes signals corresponding to a guard interval from each OFDM symbol by applying an FFT window by using symbol timing information obtained by preamble signals for synchronization located in the header part of a packet. However, when there exists a sampling clock frequency error between a transmitter and a receiver, timing difference between the symbol timing of each OFDM symbol and the FFT window timing depends upon the location of the OFDM symbol in the packet even in a single packet. Therefore, the FFT window timing at the OFDM symbol close to the head of a packet used for channel estimation differs from FFT window timing at other OFDM symbols.

When a sampling clock frequency in a transmitter is $F_{TCLK}$, a sampling clock frequency in a receiver is $f_{RCLX}$ and symbol timing difference of an OFDM symbol which appears after t seconds from the OFDM symbol used for channel estimation is $\Delta t$, the following equation is obtained.

$$t^* f_{TCLK} = (t - \Delta t)^* f_{RCLK}, \quad (1)$$

When the ratio of sampling clock frequency error between a transmitter and a receiver to their reference sampling clock frequency is $\Delta x$, the following equation is satisfied.

$$\Delta x = (f_{RCLK} - f_{TCLK})/f_{CLK} \quad (2)$$

where $f_{CLK}$ is a reference sampling clock frequency for a transmitter and a receiver.

From said equations (1) and (2), said timing difference $\Delta t$ is expressed as follows.

$$\Delta t = (f_{CLK}/f_{RCLK})^* \Delta x^* t \quad (3)$$

Considering that $f_{CLK} \approx f_{RCLK}$, that is $f_{CLK}/f_{RCLK}=1$, $\Delta t$ is approximated as follows.

$$\Delta t \approx \Delta x^* t \quad (4)$$

Thus, it should be appreciated that an FFT window timing difference is proportional to elapsed time (t) and ratio ($\Delta x$) of sampling clock frequency error between a transmitter and a receiver to a reference sampling clock frequency.

Above-mentioned FFT window timing difference affects to phase rotation of each subcarrier signal depending upon its subcarrier frequency because of fundamental principles of Fourier transform. Moreover, as an FFT window timing difference is proportional to elapsed time (t), the phase rotation is also proportional to elapsed time (t). Assuming that A(t) is result of Fourier transform of a(t), the result of Fourier transform of a(t+$\Delta t$) is A(t)*exp(j2πf$\Delta t$). Therefore, when an FFT window timing difference at the guard interval removing circuit 4 is $\Delta t$ ($\approx \Delta x^* t$ (equation (4)), a subcarrier signal provided by the Fourier transform circuit 5 has a phase rotation $\Delta \theta$ as follows.

$$\Delta \theta = 2\pi^* f^* t^* \Delta x \quad (5)$$

where f is a frequency offset between a subcarrier frequency and a center frequency of a channel, t is time of the current OFDM symbol elapsed from the OFDM symbols for channel estimation, and $\Delta x$ is ratio of sampling clock frequency error between a transmitter and a receiver to a reference sampling clock frequency.

Thus, when there exists a sampling clock frequency error between a transmitter and a receiver, a subcarrier signal provided by the Fourier transform circuit 5 has an undesirable phase rotation which increases or decreases proportional to time of the current OFDM symbol elapsed from the OFDM symbols for channel estimation, and frequency offset of the current subcarrier from a channel center frequency.

The clock frequency error detector 8 detects sampling clock frequency error between a transmitter and a receiver, that is to say, phase rotation originated in sampling clock frequency error between a transmitter and a receiver, from output signals of the Fourier transform circuit 5, and calculates clock frequency error information according to the equation (5).

The clock frequency error information is fed to the receiving circuit 2. The receiving circuit 2 controls a frequency of an internal oscillator, which corresponds to a sampling clock frequency for AD conversion and others, according to said clock frequency error information so that the sampling clock frequency error between a transmitter and a receiver is removed.

On the other hand, a channel estimator 6 estimates the condition of a transmission channel which transmits the OFDM signals of a current packet, by utilizing the received preamble signals for channel estimation which are known, located at the header part of the packet. Both amplitude and phase of each subcarrier signal shall fluctuate because of frequency selective fading caused by multi-path propagation. In this case, it is possible to estimate how amplitude and phase of each subcarrier signal have fluctuated through propagation path of the corresponding subcarrier by comparing the received subcarrier signal with the known reference signal.

Output signals of the channel estimator 6, i.e. the channel estimation results, are fed to a coherent detection circuit 7, and a weighting circuit 11.

The coherent detection circuit 7 carries out a coherent detection process to the input subcarrier signals by compensating each subcarrier signal for amplitude fluctuation and phase fluctuation originated in channel fluctuation and others by using said channel estimation results. It should be noted that propagation condition is almost constant during one packet transmission, because a packet length is sufficiently short in high rate packet communication systems which use OFDM technique and suchlike. Therefore, the coherent detection process can be performed even to the succeeding data symbols by using the channel estimation results, which are estimated by using the preamble signals for channel estimation at the header part of a packet. Output signals of the coherent detection circuit 7 are fed to a pilot signal phase rotation detector 10 and a phase compensator 9.

The pilot signal phase rotation detector 10 extracts known pilot signals which are transmitted through at least one specific subcarrier on each OFDM symbol, and detects phase rotation of each extracted pilot signal originated in residual carrier frequency error and phase noise. The phase noise is the noise which is added to phase component of the received signal due to imperfection of analog devices of both a transmitting circuit in a transmitter and a receiving circuit in a receiver. A residual carrier frequency error is the frequency error which is undesirably left with the output signals of the synchronization circuit 3 due to imperfection of a carrier frequency synchronization process at the synchronization circuit originated in thermal noise added in the receiving circuit 2 and others.

Now, phase rotation of output signals of the coherent detection circuit 7 in the case where there exist residual carrier frequency error and/or phase noise is explained briefly.

When there is a residual carrier frequency error, a common frequency error is added to all the subcarrier frequencies of output OFDM signals of the synchronization circuit 3. Therefore, phase rotation Δψ of each subcarrier originated in a residual carrier frequency error is expressed as follows.

$$\Delta\psi = 2\pi * \Delta f * t \qquad (6)$$

where Δf is a residual carrier frequency error, and t is elapsed time from the channel estimation at the header part of a packet.

As shown in the equation (6), the phase rotation of each subcarrier originated in a residual carrier frequency error is common to all the subcarriers, and constant amount of phase rotation increases for each OFDM symbol.

On the other hand, it can be assumed that phase rotation added to each OFDM signal originated in phase noise is constant during one OFDM symbol, because phase noise added to OFDM signals in the receiving circuit 2 varies slowly compared to OFDM symbol duration. Moreover, output signals of the Fourier transform circuit 5 shall have the same phase rotation as the phase rotation added to the input signals in the case where common phase rotation is added to input signals of the Fourier transform circuit 5, because the Fourier transform is a type of linear transform. Therefore, phase rotation originated in phase noise is common to all the subcarriers in one OFDM symbol, as is the case of a residual carrier frequency error. Furthermore, the change of phase noise among some adjacent OFDM symbols is also small, because the phase noise varies slowly compared to OFDM symbol duration as above-mentioned.

By the way, it is fundamentally impossible to compensate the phase rotation which varies for each OFDM symbol, because the coherent detection circuit 7 carries out coherent detection process by the use of the channel estimation result of each subcarrier obtained by using the OFDM symbol for channel estimation located at the header part of a packet. Therefore, the coherent detection circuit 7 outputs the signals which include phase rotation common to all the subcarrier signals in each OFDM symbol, originated in residual carrier frequency error and phase noise.

The pilot signal phase rotation detector 10 detects phase rotation for each OFDM symbol originated in residual carrier frequency error and phase noise in pilot signals included in output signals of the coherent detection circuit 7. The pilot signal phase rotation extraction circuit 10 outputs phase rotation information of each pilot signal. Output signals of the pilot signal phase rotation detector 10 are fed to a weighting circuit 11.

The weighting circuit 11 weights phase rotation information which are provided by the pilot signal phase rotation detector 10 according to channel estimation result of each subcarrier provided by the channel estimator 6. For instance, when signal level of a subcarrier obtained by the channel estimation result is high, the phase rotation information of the pilot signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of pilot signal which has low signal level, and accurate phase rotation can be obtained. For example, an weighted phase rotation information signal of each pilot signal can be obtained by forming a vector signal whose phase component and amplitude component are equal to the input phase rotation and the signal level derived from the channel estimation result, respectively. The weighted phase rotation information of the pilot signals (or the vector signals corresponding to said pilot signals) of each OFDM symbol are provided by the weighting circuit 11. Output signals of the weighting circuit 11 are fed to an intra-symbol averaging circuit 12.

The intra-symbol averaging circuit 12 averages the weighted phase rotation information of pilot signals within one OFDM symbol. In the above embodiment, the vector sum of the vector signals corresponding to the pilot signals in each OFDM symbol is calculated, so that the weighted phase rotation information is averaged. In this case, the phase of the vector sum shows averaged and weighted phase rotation information.

The phase rotation of each subcarrier originated in both residual carrier frequency error and phase noise is almost uniform in each OFDM symbol. Therefore, the phase rotation originated in residual carrier frequency error and phase noise, which provides common phase rotation to all the subcarrier signals of one OFDM symbol, is accurately obtained by averaging phase rotation information of the pilot signals within each OFDM symbol. The intra-symbol averaging circuit 12 provides weighted and averaged phase rotation information of pilot signals within each OFDM symbol to a moving average circuit 13.

The moving average circuit 13 takes time-oriented moving average of the input phase rotation information signals through multiple OFDM symbols. This time-oriented moving average suppresses noise component such as thermal noise added to signals in the receiving circuit 2.

Output signals of the moving average circuit 13 are fed to a phase compensator 9.

The phase compensator 9 compensates phase rotation of each subcarrier signal provided by the coherent detection circuit 7 originated in residual carrier frequency error and phase noise which are common in all the subcarrier signals within each OFDM symbol. The phase compensated signals are fed to a decision circuit 14.

The decision circuit 14 carries out a symbol decision process to data signals which are provided by the phase compensator 9 after phase compensation.

As described above, when sampling clock frequency has an error between a transmitter and a receiver, if coherent detection is carried out with no clock frequency error compensation, a receiver can not detect phase of each subcarrier signal correctly due to phase rotation of each subcarrier signal, and therefore, signal quality is considerably degraded. Therefore, a prior receiver detects clock frequency error between a transmitter and a receiver from subcarrier signals which are obtained after Fourier transform, and directly controls the sampling clock frequency, which is commonly used in various circuits in a receiver, by using analog process according to the detected clock frequency error information, so that sampling clock frequency error between a transmitter and a receiver is removed.

However, the control through analog process requires many complicated analog circuits. Moreover, it is difficult for analog process to realize high compensation accuracy. Therefore, a prior receiver can not obtain high transmission quality. In addition, it consumes much power.

On the other hand, to achieve coherent detection of OFDM packet signals affected by a carrier frequency error between a transmitter and a receiver, a carrier frequency error is detected by using the preamble signals for synchronization located at the header part of each OFDM packet, and compensated for complex baseband signals after the receiving process.

However, detected carrier frequency error generally includes some detection error because thermal noise is superimposed on received signals in receiving process which includes frequency conversion, orthogonal detection and others. Therefore, it is difficult for the above-mentioned carrier frequency compensation process to accurately compensate a carrier frequency error, and transmission quality is degraded due to the phase rotation of each subcarrier signal originated in carrier frequency error left in the received signals (i.e. the residual carrier frequency error). In order to compensate degradation of transmission quality originated in residual carrier frequency error, a prior receiver detects phase rotation originated in said residual carrier frequency error from the known pilot signals after coherent detection.

By the way, the phase rotation information of considerably large number of pilot signals must be detected and averaged to accurately detect the phase rotation originated in residual carrier frequency error, because the effect of thermal noise added to the received signals must be sufficiently mitigated.

However, the number of subcarriers, which transmit pilot signals, must be sufficiently small in terms of high spectrum efficiency. Therefore, the phase rotation information detected from many pilot signals spreading many OFDM symbols must be averaged for sufficient averaging. However, the above-mentioned time-oriented averaging process through many OFDM symbols deteriorates system throughput performance because of inevitable long process delay. Moreover, a prior art can not sufficiently average the phase rotation information of the OFDM symbols close to the head of a packet due to fundamental characteristic of time-oriented averaging process. Accordingly, a prior receiver has disadvantage that phase rotation originated in residual carrier frequency error included in OFDM symbols close to the head of a packet can not be well compensated.

Moreover, in a prior art, to compensate phase rotation of each subcarrier signal after coherent detection, which is originated in residual carrier frequency error and phase noise, phase rotation of the signal corresponding to a pilot signal after coherent detection is first detected, detected value is weighted according to received signal level of the pilot signal, and averaged in each OFDM symbol, and further, moving average of the phase rotation is taken among multiple OFDM symbols for decreasing affection by thermal noise, then, by using the measured result, phase rotation of each subcarrier signals after coherent detection is compensated.

However, in an actual receiver, thermal noise is superimposed on received signals in the receiving circuit 2 which processes the received signals in analog form, and the receiving circuit 2 outputs complex baseband signals which include noise component originated in said thermal noise. The noise component can not be removed in the synchronization circuit 3, the guard interval removing circuit 4 and the Fourier transform circuit 5. Therefore, signal quality of each subcarrier signal which is the output of the Fourier transform circuit 5 is deteriorated because of noise component in the case where noise component is superimposed on the received signals of the receiving circuit 2.

On the other hand, the channel estimator 6 estimates the condition of a channel which transmits the received OFDM signals by using only fixed length preamble signals (FIG. 44) for channel estimation located at the header part of a packet among all the signals provided by the Fourier transform circuit 5. The length of preamble signals for channel estimation is generally set to be short to realize high throughput performance. Therefore, accuracy of channel estimation at the channel estimator 6 shall be deteriorated in the case where subcarrier signals provided by the Fourier transform circuit 5 are deteriorated due to said noise component. When accuracy of channel estimation is decreased, decreased channel estimation result of each subcarrier is applied to the weighting circuit 11. Therefore, the weighting circuit 11 weights the phase rotation information of each pilot signal according to inaccurate signal level information. The intra-symbol averaging circuit 12 and the moving average circuit 13 can not compensate the effect of the above-mentioned inaccurate weighting in principle. As a result, the phase rotation compensator 9 carriers out inaccurate phase rotation compensation, thus, signal quality is much deteriorated.

In the prior art, in order to avoid decrease of accuracy of channel estimation due to thermal noise, a number of preamble signals are transmitted so that they are averaged to suppress noise component in a receiver for decreasing affection of thermal noise, and/or moving average of received preamble signals for channel estimation is taken on frequency axis (i.e. frequency-oriented moving average) for suppressing noise component and decreasing affection of thermal noise. However, the former has the disadvantage that transmission efficiency, that is throughput performance, is decreased, because ratio of preamble signals to all the signals in a packet is increased. The latter has the disadvantage that accuracy of channel estimation is decreased because of moving average on frequency axis which can not follow large change of channel condition between the subcarriers. Thus, in a prior art, weighting operation by using accurate signal level information is difficult, and high transmission quality can not be obtained.

Further, phase component of output signals provided by the intra-symbol averaging circuit 12 includes accumulated phase rotation components originated in phase noise, residual carrier frequency error, and thermal noise.

The moving average circuit 13 in FIG. 43 functions to decrease phase rotation component originated in thermal noise in the output signals of the intra-symbol averaging circuit 12, so that the succeeding circuits can accurately detect the phase rotation component originated in phase noise and residual carrier frequency error.

In moving average of signals, when variation of desired signal is small in a fixed period subject to moving average, it is possible to detect signal component of desired signal with mitigating the effect of thermal noise. However, when variation of desired signal is large within a period subject to moving average, moving average functions not only smoothing of noise component, but also desired signal. Therefore, signal quality is degraded because of moving average process itself.

In practice, phase rotation component originated in phase noise varies very little in several OFDM symbols. Thus, moving average process does not change phase rotation component originated in phase noise. However, accumulated phase rotation component originated in residual carrier frequency error increases (or decreases) monotonously, and further, as increase of the accumulated phase rotation in each OFDM symbol is relatively large, signal component is deteriorated by moving average operation.

Therefore, a phase rotation component originated in residual carrier frequency error of the output signals of the moving average circuit 13 includes a specific error which is proportional to residual carrier frequency error and period of moving average operation.

Thus, a prior art has the disadvantage that when the phase rotation compensator 9 compensates phase rotation of each subcarrier by using phase rotation information after moving average operation at the moving average circuit 13, the compensated signal is deteriorated proportional to residual carrier frequency error and period of moving average operation.

An object of the present invention is to suppress deterioration of transmission quality even when there is a sampling clock frequency error between a transmitter and a receiver, with simple circuit structure, in an OFDM packet communication receiver.

Another object of the present invention is to provide accurate demodulation of OFDM signals with short delay time even when carrier frequency error between a transmitter and a receiver exists, and/or thermal noise exists.

Still another object of the present invention is to suppress the deterioration of transmission quality with no decrease of throughput performance with simple circuit structure, even when thermal noise is added to the received signals in a receiver.

SUMMARY OF THE INVENTION

In order to achieve said object, the feature of the present invention resides in an OFDM packet communication receive system comprising; a receive means (102) for receiving an OFDM signal and carrying out a predetermined receive process to said OFDM signal; a synchronization means (103) for timing synchronization and carrier frequency synchronization for a receive signal of an output of said receive means (102); a Fourier transform means (105) for Fourier transformation of said receive signal so that separate sub-carriers of each OFDM signal are provided; a channel estimate means (106) for channel estimation by using each sub-carriers separated by said Fourier transform means; a coherent detection means (107) for coherent detection of sub-carriers separated by said Fourier transform means by using channel estimation of an output of said channel estimate means; wherein a clock frequency error estimate means (100) is provided for measuring phase rotation or accumulated phase rotation caused by clock frequency error between a transmit side and a receive side by measuring phase difference between a detected signal (R1, R2) and a reference signal (S1 through S16), and generating phase rotation ($\Delta\theta$) of a sub-carrier caused by said clock frequency error ($f_{RCLK}-f_{TCLK}$); a phase rotation compensation means (109) for compensating phase rotation of a detected signal of an output of said coherent detection means caused by said clock frequency error of an output of said clock frequency error estimate means; and a decision means (112) for deciding 1 or 0 of an output of said phase rotation compensation means.

Another feature of the present invention resides in an OFDM packet communication receive system comprising; receive means for receive process of a receive signal; synchronization means for timing synchronization and carrier frequency synchronization for an output of said receive means; Fourier transform means for Fourier transform of an output of said synchronization means for separating receive signal into a plurality of sub-carriers; channel estimate means for estimating channel condition of each sub-carrier; coherent detection means for coherent detection of each sub-carrier according to channel estimate result of an output of said channel estimate means; residual carrier frequency error measure means for measuring phase rotation of a part or all of an output of said coherent detection means; phase rotation estimate means for estimating phase rotation of an output of said coherent detection means according to carrier frequency error supplied by said synchronization means and residual carrier frequency error supplied by said residual carrier frequency error measure means; phase rotation compensation means for compensating phase rotation of an output of said coherent detection means according to an output of said phase rotation estimate means.

BRIEF DESCRIPTION OF THE DRAWINGS

FIG. 1 is a block diagram of a first embodiment of an OFDM packet communication receiver according to the present invention, FIG. 2 is a block diagram of a second embodiment of an OFDM packet communication receiver, FIG. 44 shows a packet format of an OFDM signal, FIG. 45 shows a signal modulated in 16QAM modulation system, and FIG. 46 shows a signal modulated in BPSK modulation system.

DESCRIPTION OF THE PREFERRED EMBODIMENTS

First Embodiment

Figure 3:
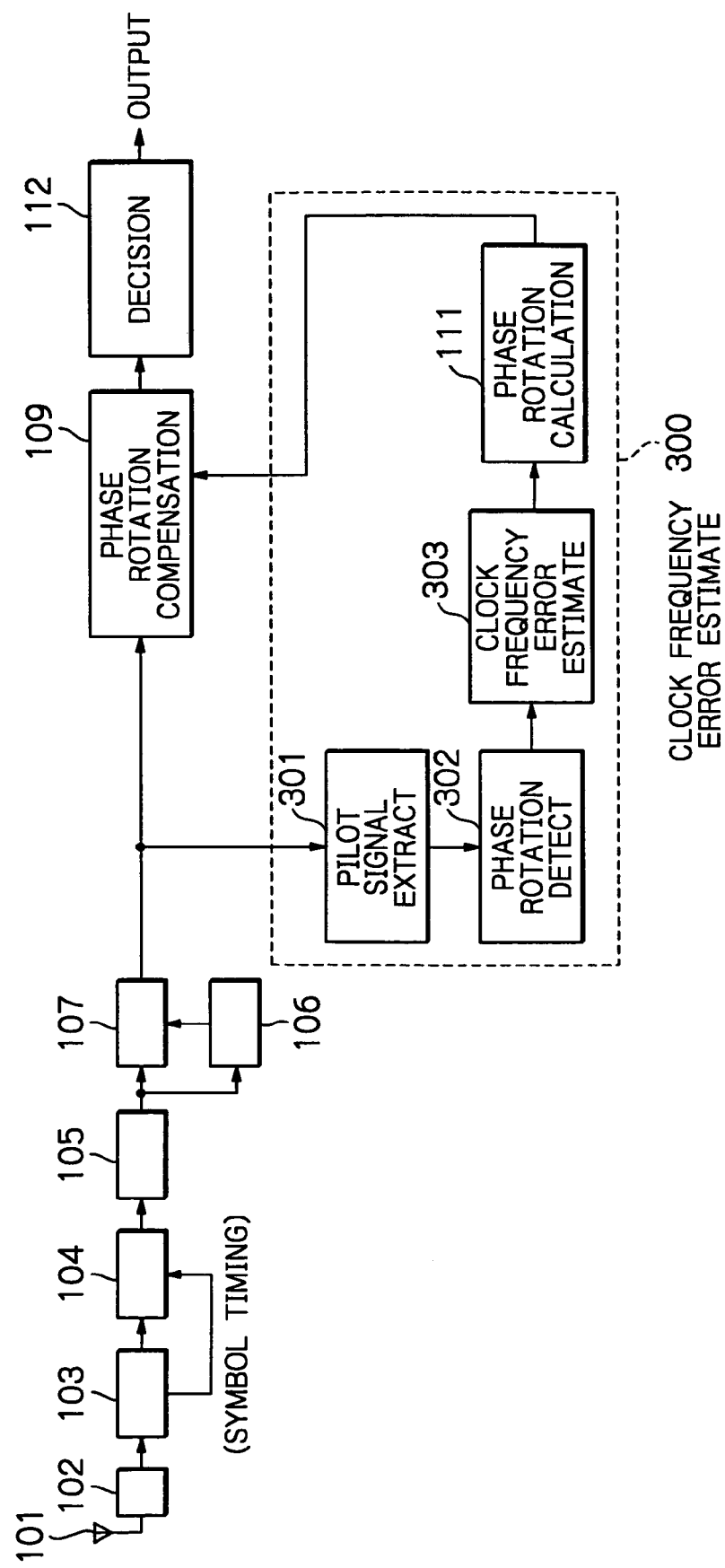
FIG. 3 is a block diagram of a third embodiment of an OFDM packet communication receiver.

FIG. 1 shows a block diagram of the first embodiment of the present OFDM packet communication receiver, and it relates to claim 1.

In the embodiment, receiving means, synchronization means, Fourier transform means, channel estimation means, coherent detection means, clock frequency error estimation means, and phase rotation compensation means in claim 1 correspond to a receiving circuit 102, a synchronization circuit 103, a Fourier transform circuit 104, a channel estimator 106, a coherent detection circuit 107, a clock frequency error estimation block 100, and a phase rotation compensator 109, respectively.

An OFDM signal received by an antenna 101 is applied to the receiving circuit 102, which carries out a receiving process including frequency conversion, filtering, orthogonal detection, and A/D conversion. Then, the receiving circuit 102 provides complex baseband signal which is an output of the receiving process.

An output signal of the receiving circuit 102 is applied to a synchronization circuit 103, which detects carrier frequency error and OFDM symbol timing by using a preamble signal for synchronization (see FIG. 44) included in the complex baseband signal, and carries out carrier frequency error compensation for the complex baseband signal by using the detected carrier frequency error.

The synchronization circuit 103 outputs a complex baseband signal which is compensated carrier frequency error, and a symbol timing information. The output signals of the synchronization circuit 103 are applied to a guard interval removing circuit 104. The detected OFDM symbol timing information is used to remove a guard interval which exists each OFDM symbol of received OFDM signals so that useful signal component in an OFDM symbol is taken out.

The guard interval removing circuit 104 carries out FFT window process to an input complex baseband signal by using symbol timing information supplied by the synchronization circuit 103. In other words, signal components having time width equal to that of FFT window are taken out from each OFDM symbol of the complex baseband signals, so that a guard interval is removed. The time width of FFT window is equal to time difference between symbol length of an OFDM symbol and length of a guard interval.

A complex baseband signal whose guard interval is removed by the guard interval removing circuit 104 is, for each OFDM symbol, applied to a Fourier transform circuit 105, which carries out fast Fourier transform to each OFDM symbol of input complex baseband signals, so that the input signals are divided into signal components of a plurality of subcarriers.

Subcarrier signals divided by the Fourier transform circuit 105 are applied to a coherent detection circuit 107 and a channel estimator 106. The channel estimator 106 estimates channel condition, which each subcarrier signal is transmitted, by using a preamble signals for channel estimation (see FIG. 44).

The channel estimation result which is provided by the channel estimator 106 shows, for instance, how each subcarrier is affected in phase and amplitude by fading. The channel estimation result is applied to a coherent detection circuit 107.

The coherent detection circuit 107 carries out coherent detection by compensating the amplitude fluctuation and the phase rotation, caused by fading and others, of each subcarrier signal supplied by the Fourier transform circuit 105, by using the channel estimation result of each subcarrier supplied by the channel estimator 106.

An output signal of the coherent detection circuit 107 is applied to a phase rotation compensator 109, and a clock frequency error estimation block 100. The latter is comprised of a phase rotation detector 108, a clock frequency error estimator 110, and a phase rotation calculator 111.

For example, in the case where 16QAM modulation scheme is used to modulate each subcarrier, a signal after coherent detection is to locate one of 16 reference signals S1 through S16 as shown in FIG. 45. However, when there exists a sampling clock frequency error between a transmitter and a receiver, the signals which are coherent detected are subject to said phase rotation, and output signals from the coherent detection circuit 107 (e.g., R1 or R2 in FIG. 45) do not coincide with one of the reference signals S1 through S16. An amount of phase rotation of detected signal depends upon each detected signal.

The phase rotation detector 108 in the clock frequency error estimation block 100 detects phase rotation or accumulated phase rotation of each detected subcarrier signal. For instance, when an output signal of the coherent detection circuit 107 is R1 in FIG. 45, the phase rotation detector 108 finds the reference signal S3 which is the closest to the input signal R1 among the reference signals S1 through S16, and detects the phase difference φ1 between the reference signal S3 and the input signal R1. Further, when an output signal of the coherent detection circuit 107 is R2 in FIG. 45, the phase rotation detector 108 finds the reference signal S6 which is the closest to the input signal R2 among the reference signals S1 through S16, and detects the phase difference φ2 between the reference signal S6 and the input signal R2.

The phase rotation caused by clock frequency error is expressed by the equation (5). As the phase rotation (Δθ) (e.g., φ1 or φ2 in FIG. 45) caused by clock frequency error, elapsed time (t) from the channel estimation, and frequency offset (f) of each subcarrier from channel center frequency are known, ratio (Δx) of sampling clock frequency error between a transmitter and a receiver to a reference sampling clock frequency can be calculated by using the equation (5). Further, as the reference sampling clock frequency ($f_{CLK}$) is known, amount of frequency error ($f_{RCLK}$–$f_{TCLK}$) of sampling frequency between a transmitter and a receiver can be calculated, from the ratio Δx) of sampling frequency error between a transmitter and a receiver to the reference sampling frequency.

A clock frequency error estimator 110 receives phase rotation information of each detected signal supplied by the phase rotation detector 108 for each OFDM symbol, and estimates ratio of sampling clock frequency error between a transmitter and a receiver to a reference sampling clock frequency (i.e., clock frequency deviation), or it estimates amount of clock frequency error between a transmitter and a receiver (i.e., clock frequency error), by using the equation (5).

The phase rotation calculator 111 receives the clock frequency error or the clock frequency deviation supplied by the clock frequency error estimator 110, and calculates phase rotation of each detected signal supplied by the coherent detection circuit 107, caused by clock frequency error. The phase rotation is calculated by using the equation (5).

The phase rotation compensator 109 receives detected signal from the coherent detection circuit 107, and carries out phase compensation process for removing phase rotation caused by clock frequency error according to phase rotation information supplied by the phase rotation calculator 111.

A decision circuit 112 receives a phase compensated detected signal supplied by the phase rotation compensator 109. The decision circuit 112 discriminates a symbol of data signal in a detected signal (see FIG. 44), and provides the result as a demodulated output. When 16QAM modulation scheme is used to modulate each subcarrier, the decision circuit 112 discriminates which reference signal among signals S1 through S16 each detected signal coincides. Since phase rotation is compensated by the phase rotation compensator 109 before a symbol is discriminated, the symbol discrimination is carried out free from clock frequency error. Thus, accurate clock frequency synchronization which is impossible in a prior art is realized. Further, as mentioned above, clock frequency error compensation is carried out through digital process, thus, no complicated analog circuit is required, and power consumption can be suppressed.

Second Embodiment

The second embodiment which is a modification of the first embodiment is described in accordance with FIG. 2. This embodiment is directed to claim 2. In FIG. 2, the same numerals as those in FIG. 2 show the same members.

In FIG. 2, a clock frequency estimation block 200 comprises a weighting circuit 201, a smoothing circuit 202, a phase rotation detector 203, a clock frequency error estimator 110, and a phase rotation calculator 111.

The weighting circuit 201 receives an output signal of the coherent detection circuit 107 and channel estimation result of each subcarrier provided by the channel estimator 106. The weighting circuit 201 detects phase rotation information of an output of the coherent detection circuit 107 from reference signal, and then, gives an weight to the detected phase rotation information according to the channel estimation result provided by the channel estimator 106.

For instance, when signal level of a subcarrier obtained by the channel estimation result is high, the phase rotation information of the detected signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of signal which has low signal level, and accurate clock frequency error estimation can be realized.

An output of the weighting circuit 201 is applied to the smoothing circuit 202, which calculates moving average of the weighted phase rotation information on time axis for each subcarrier, so that the weighted phase rotation is smoothed. This smoothing operation functions to avoid degradation of signal quality due to thermal noise superimposed on a received signal in the receiving circuit 102.

The phase rotation detector 203 receives an output of the smoothing circuit 202, and detects phase rotation (e.g., φ1 or φ2 in FIG. 45) or accumulated phase rotation of each detected signal caused by clock frequency error.

The clock frequency error estimator 110 estimates clock frequency deviation or clock frequency error according to the equation (5) by using the phase rotation information or the accumulated phase rotation information provided by the phase rotation detector 203.

The phase rotation calculator 111 calculates phase rotation information of each detected signal, which is an output of the coherent detection circuit 107, according to the clock frequency error information estimated by the clock frequency error estimator 110. This phase rotation information is obtained by the equation (5). An output of the phase rotation calculator 111 is applied to the phase rotation compensator 109.

When signal quality depends upon each subcarrier, the weight to the phase rotation of a subcarrier with good signal quality is high so that the fading affects a little. Thus, the clock frequency error is detected more accurately. Further, the smoothing operation of the weighted phase rotation on time axis suppresses the affection by thermal noise and others, so that the clock frequency error is detected further more accurately. Thus, highly accurate clock frequency compensation which is impossible in a prior art, is obtained. Further, as the clock frequency error compensation is carried out through digital process, no complicated analog compensation circuit is required, and power consumption is suppressed.

Third Embodiment

The third embodiment is described in accordance with FIG. 3, which is directed to claim 3, and is a modification of FIG. 1. In FIG. 3, the same numerals as those in FIG. 1 show the same members.

In FIG. 3, a clock frequency error estimation block 300 comprises a pilot signal extractor 301, a phase rotation detector 302, a clock frequency error estimator 303, and a phase rotation calculator 111.

This embodiment has the feature that a part of subcarriers in an OFDM signal transmit a known pilot signal.

A pilot signal extractor 301 receives output signals of the coherent detection circuit 107, and extracts pilot signals.

A phase rotation detector 302 receives the extracted pilot signals, and detects phase rotation or accumulated phase rotation of each pilot signal.

It should be noted that as a pilot signal is known, the reference signal of the pilot signal is also known. Therefore, when phase rotation of a pilot signal is only detected, no discrimination of reference signal is required, and thus, the signal processing is simplified. Further, even when high noise is added to a detected signal, no wrong discrimination of a reference signal of a detected signal occurs, and thus, phase rotation is detected more accurately.

A clock frequency error estimator 303 receives a phase rotation information or an accumulated phase rotation information provided by the phase rotation detector 302 for each detected signal, and estimates clock frequency deviation or clock frequency error.

A phase rotation calculator 111 calculates phase rotation, which is caused by clock frequency error, of a detected signal provided by the coherent detection circuit 107 for each detected signal, according to clock frequency deviation or clock frequency error estimated by the clock frequency error estimator 303. The phase rotation is obtained based upon the equation (5).

The phase rotation compensator 109 compensates phase rotation of an output of the coherent detection circuit 107 due to clock frequency error, according to phase rotation information provided by the phase rotation calculator 111.

Thus, when known pilot signals are transmitted by using a part of subcarriers in OFDM signals, a clock frequency error is detected by using the pilot signals. Thus, a clock frequency error can be detected by using only a part of detected signals, thus, a circuit for clock frequency error estimation can be simplified. Further, even when high noise is added to a received signal, no wrong discrimination of a reference signal of a detected signal occurs, and thus, a clock frequency error is detected more accurately.

Thus, highly accurate clock frequency compensation which is impossible in a prior art can be realized with a simple circuit. Further, as a clock frequency error is compensated through digital process, no complicated analog compensation circuit is required, and thus, power consumption is suppressed.

Fourth Embodiment

Figure 4:
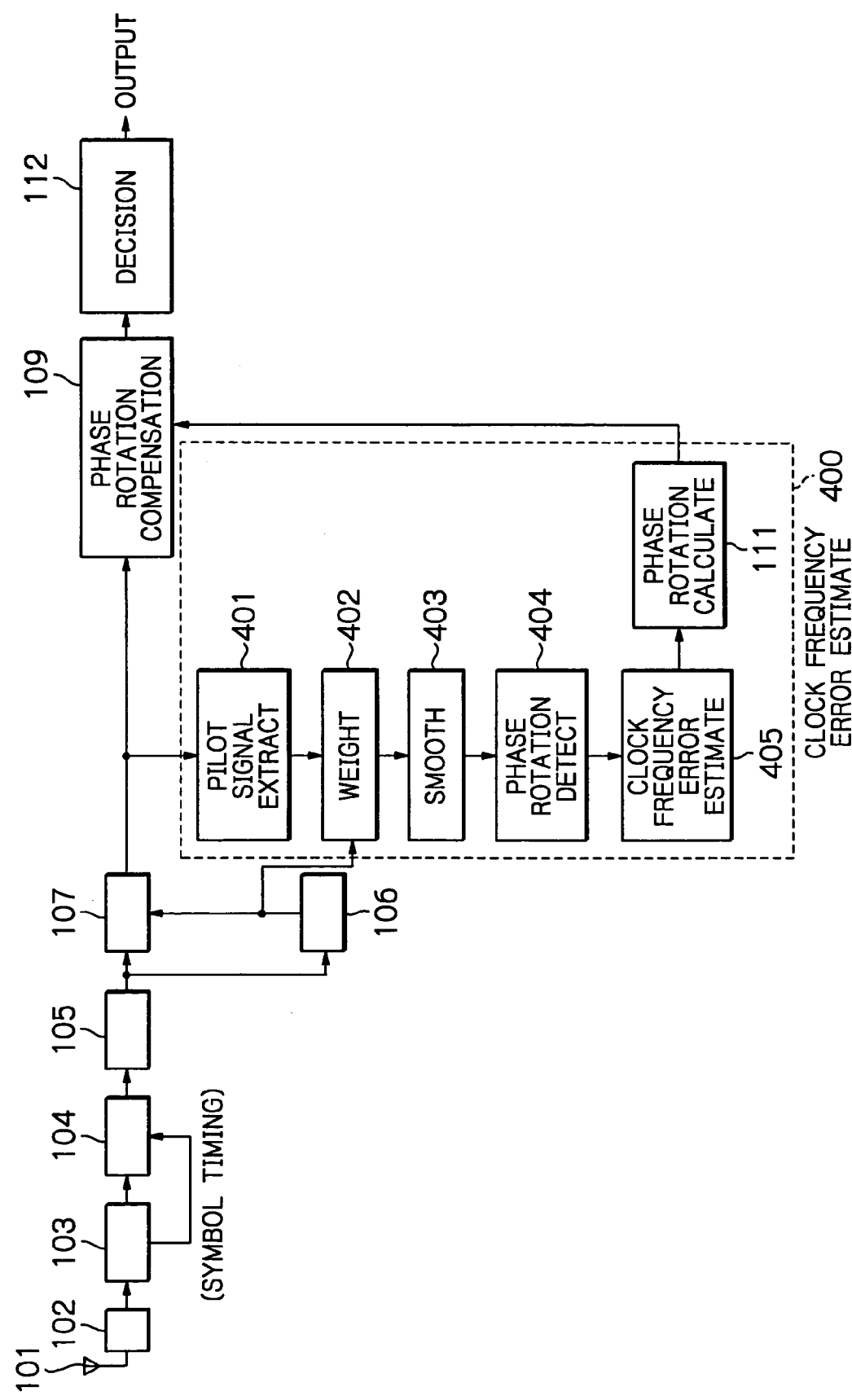
FIG. 4 is a block diagram of a fourth embodiment of an OFDM packet communication receiver.

The fourth embodiment of the present invention is described in accordance with FIG. 4 which is directed to claim 4 and is a modification of FIG. 1. The same numerals in FIG. 4 show the same members as those in FIG. 1.

A clock frequency estimation block 400 in FIG. 4 comprises a pilot signal extractor 401, an weighting circuit 402, a smoothing circuit 403, a phase rotation detector 404, a clock frequency error estimator 405, and phase rotation calculator 111.

This embodiment has feature that known pilot signals are transmitted by using a part of subcarriers included in OFDM signals.

The pilot signal extractor 401 receives output signals of the coherent detection circuit 107, and extracts only pilot signal components.

The weighting circuit 402 takes the phase rotation information of the pilot signals extracted by the pilot signal extractor 401 and gives a weight to the phase rotation information according to the channel estimation result which is the output of the channel estimator 106.

For instance, when signal level of a subcarrier obtained by the channel estimation result is high, the phase rotation information of the pilot signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of pilot signal which has low signal level, and accurate clock frequency error estimation can be realized.

An output of the weighting circuit 402 is applied to the smoothing circuit 403, which calculates moving average of the weighted phase rotation along time axis for each subcarrier. Thus, the smoothing circuit 403 smoothes the weighted phase rotation information. The smoothing operation removes the degradation of signal quality due to the effect of thermal noise and others added at the receiving circuit 102.

The phase rotation detector 404 receives the weighted and smoothed phase rotation information, and detects the phase rotation (e.g., $0_1$ or $O_2$ in FIG. 45) or the accumulated phase rotation caused by the clock frequency error for each pilot signal.

The clock frequency error estimator 405 calculates the clock frequency deviation or the clock frequency error according to the equation (5) by using the phase rotation or the accumulated phase rotation of each pilot signal.

The phase rotation calculator 111 calculates the amount of phase rotation of the coherent detected signal provided by the coherent detection circuit 107 according to the clock frequency error information provided by the clock frequency error estimator 405. This phase rotation is calculated according to said equation (5). An output of the phase rotation calculator 111 is applied to the phase rotation compensator 109.

As described above, when pilot signals are transmitted by using a part of subcarriers in OFDM signals, a clock frequency error is detected by using the pilot signals, thus, the clock frequency is detected by using only a part of OFDM signals, and thus, the circuit structure is simplified. Further, even when high noise is added to a coherently detected signal, a clock frequency error is detected accurately, since reference signal of each detected signal is discriminated correctly.

Further, when signal quality depends upon each subcarrier, the phase rotation detected by using a pilot signal on a high subcarrier which is in good transmission quality has large weight so that the affection by fading is decreased, and a clock frequency error is accurately detected. Further, the smoothed phase rotation along time axis suppresses the affection by thermal noise and others, and thus, the clock frequency error is detected more accurately.

Thus, the accurate clock frequency compensation is carried out by using a simple circuit, although it has been impossible in a prior art. Further, as the clock frequency error compensation is carried out in a digital circuit, no complicated analog compensation circuit is required, and the power consumption is saved.

Fifth Embodiment

Figure 5:
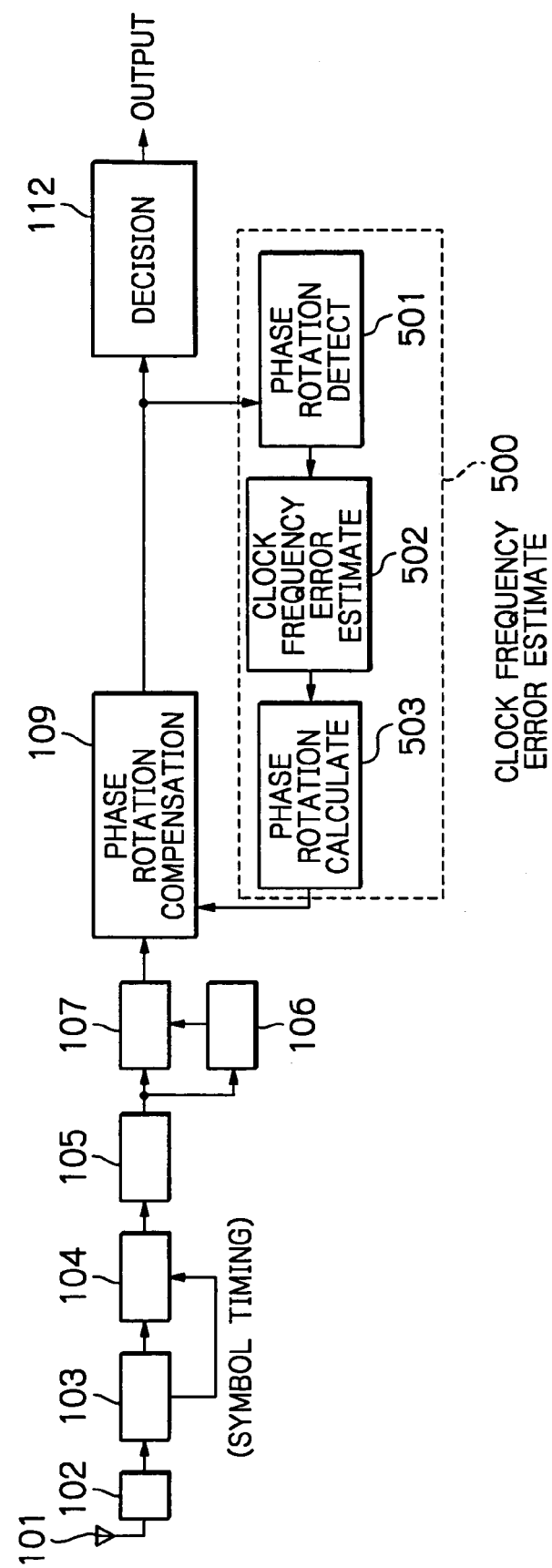
FIG. 5 is a block diagram of a fifth embodiment of an OFDM packet communication receiver.

FIG. 5 shows fifth embodiment, which is a modification of FIG. 1, and is directed to claim 5. In FIG. 5, the same numerals as those in FIG. 1 show the same members.

Receiving means, Synchronization means, Foufier transform means, channel estimation means, coherent detection means, clock frequency error estimation means, and phase rotation compensation means in claim 5 correspond, respectively, a receiving circuit 102, a synchronization circuit 103, a Fourier transform circuit 105, a channel estimator 106, a coherent detection circuit 107, a clock frequency error estimation block 500, and a phase rotation compensator 109 in FIG. 5.

The clock frequency error estimation block 500 in FIG. 5 comprises a phase rotation detector 501, a clock frequency error estimator 502, and a phase rotation calculator 503.

The phase rotation detector 501 receives an output of the phase rotation compensator 109, and detects the amount of phase rotation of coherently detected signal for each OFDM symbol, and each subcarrier. The operation of the phase rotation detector 501 is essentially the same as that of the phase rotation detector 108 in FIG. 1.

The clock frequency error estimator 502 estimates clock frequency deviation or clock frequency error by using phase rotation information of detected signal supplied by the phase rotation detector 501 until reception of the current OFDM symbol.

The phase rotation calculator 503 receives the clock frequency deviation or the clock frequency error supplied by the clock frequency error estimator 502, and calculates phase rotation of a detected signal caused by the clock frequency error which is supplied by the coherent detection circuit 107 for each detection signal. The amount of phase rotation can be calculated according to said equation (5).

The phase rotation compensator 109 receives a detected signal from the coherent detection circuit 107 and compensates phase rotation of the detected signal caused by clock frequency error according to phase rotation information supplied by the phase rotation calculator 503.

The modification of FIG. 5 has a feature that phase rotation is detected by using compensated output of the phase rotation compensator 109, while the embodiment of FIG. 1 detects phase rotation by using uncompensated signal of an input of the phase rotation compensator 109.

Thus, the embodiment of FIG. 5 compensates phase rotation of a coherently detected signal and then discriminates which reference signal each detected signal corresponds, as is the case of FIG. 1, and thus, it can discriminate a signal without being affected by clock frequency error, and provide highly accurate clock frequency error compensation which is impossible in a prior art. Further, as compensation process is carried out through digital process, no complicated analog compensation circuit is required, and power consumption is suppressed.

Sixth Embodiment

Figure 6:
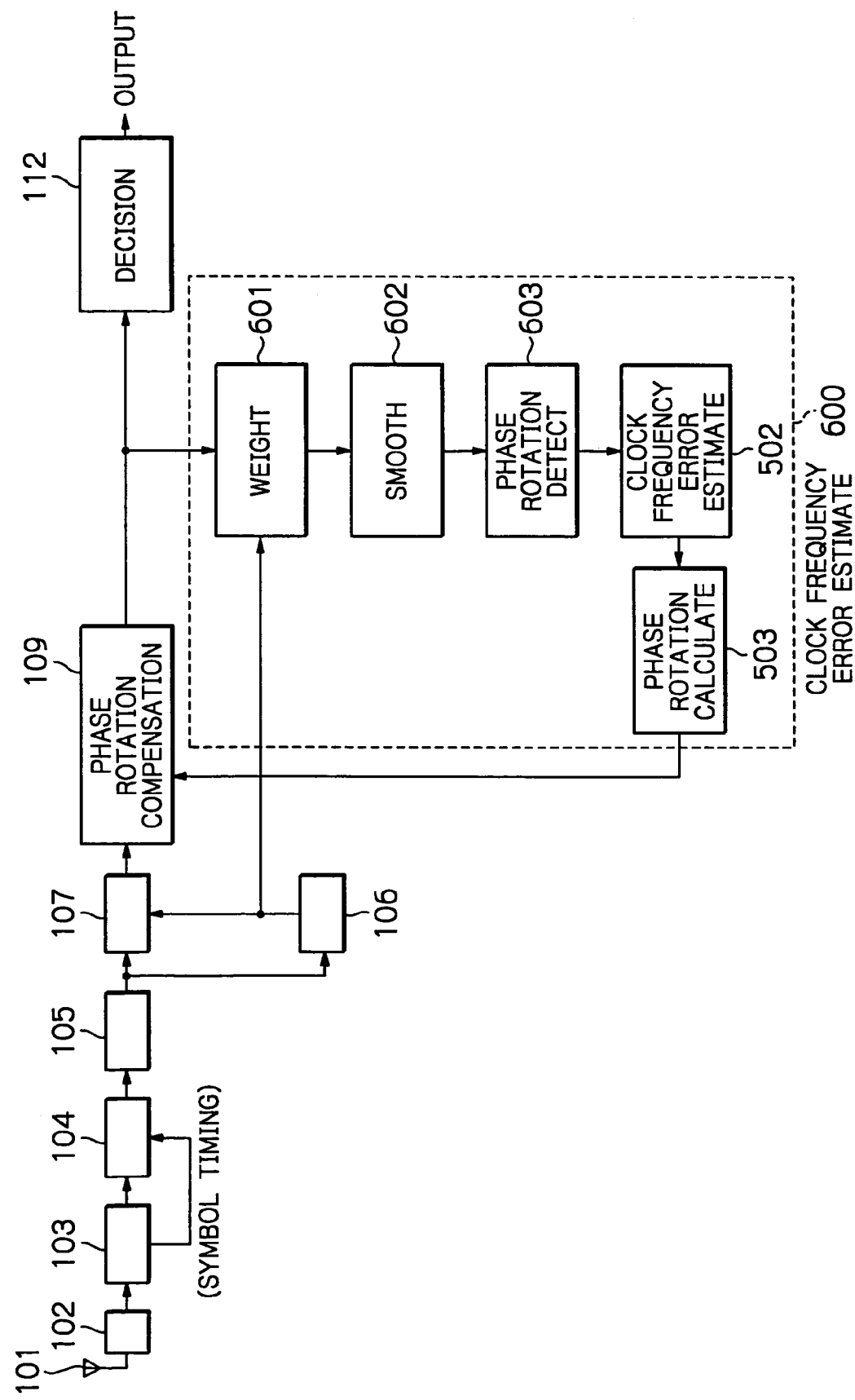
FIG. 6 is a block diagram of a sixth embodiment of an OFDM packet communication receiver.

FIG. 6 shows sixth embodiment, which is a modification of FIG. 5, and is directed to claim 6. The same numerals in FIG. 6 as those in FIG. 5 show the same members.

In FIG. 6, a clock frequency error estimation block 600 comprises a weighting circuit 601, a smoothing circuit 602, a phase rotation detector 603, a clock frequency error estimator 502, and a phase rotation calculator 503.

The clock frequency error estimator 502 estimates clock frequency deviation or clock frequency error by using the phase rotation information of a detected signal supplied by the phase rotation detector 603 until the reception of the current OFDM symbol.

The weighting circuit 601 receives an output of the phase rotation compensator 109 and detects phase rotation of the phase compensated signal from a reference signal, then, it gives a weight to the phase rotation information according to channel estimation result supplied by the channel estimator 106, for each coherently detected signal.

For instance, when signal level of a subcarrier obtained by the channel estimation result is high, the phase rotation information of the detected signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of the detected signal which has low signal level, and accurate clock frequency error estimation can be realized.

The weighted phase rotation information is applied to the smoothing circuit 602, which carries out the moving average of the weighted phase rotation information for each subcarrier along time axis, so that the weighted phase rotation information is smoothed. The smoothing operation removes degradation of signal quality which is degraded in a receiving circuit 2 by thermal noise and others.

The phase rotation detector 603 receives weighted and smoothed phase rotation information, and detects phase rotation caused by clock frequency error.

An output of the phase rotation detector 603 is applied to the clock frequency error estimator 502 for estimation of clock frequency deviation or clock frequency error.

When signal quality depends upon each subcarrier, the effect by fading is suppressed, as described above, by assigning large weight to the phase rotation which relates to a subcarrier having good signal quality, and clock frequency error can be detected more accurately. Further, as the smoothing operation along time axis suppresses the effect by thermal noise and others, clock frequency error is detected further more accurately. Thus, highly accurate clock frequency error compensation which is impossible in a prior art is realized. Further, as clock frequency error compensation is implemented through digital process, no complicated analog compensation circuit is required, and thus, power consumption is saved.

Seventh Embodiment

Figure 7:
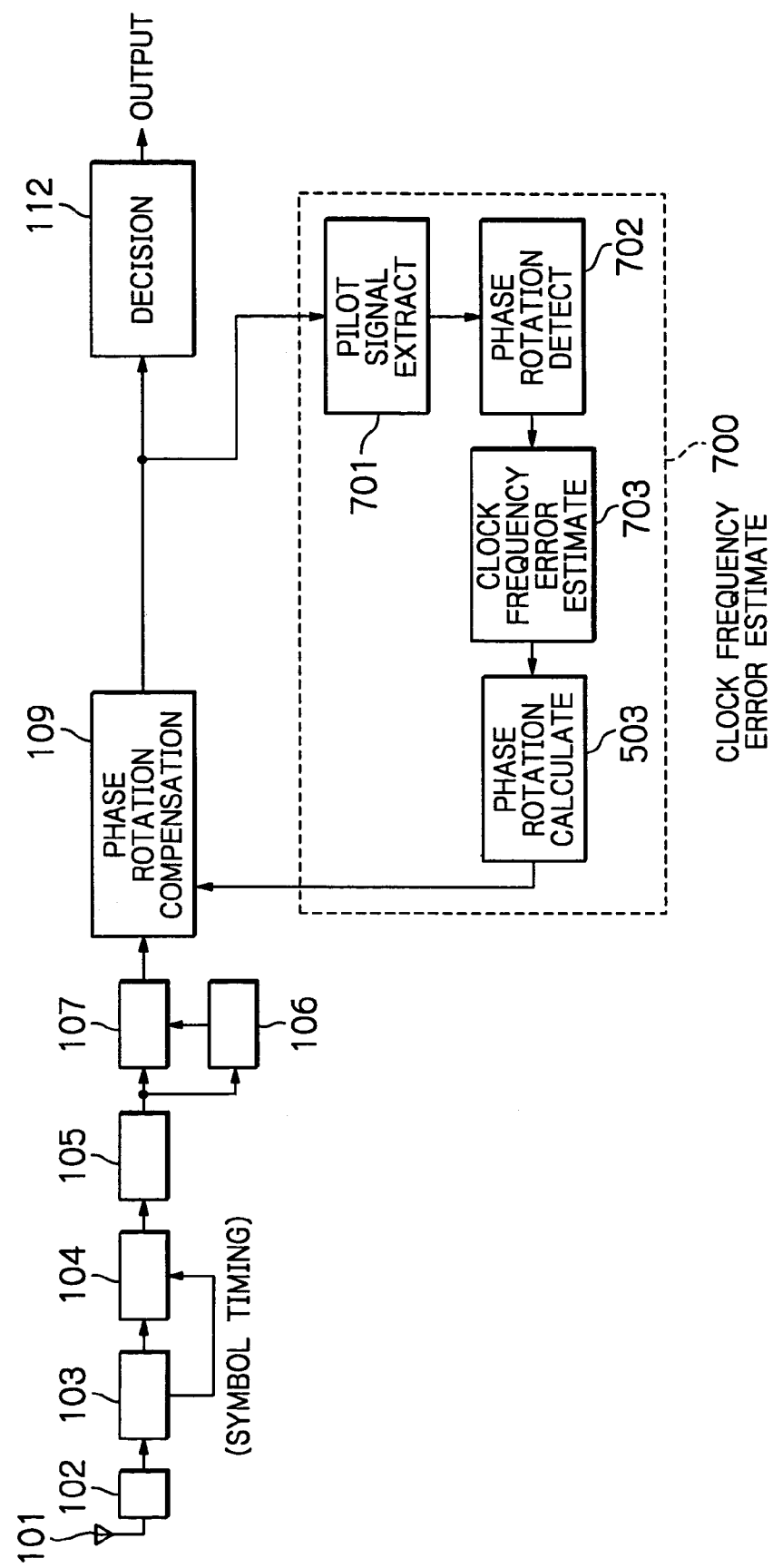
FIG. 7 is a block diagram of a seventh embodiment of an OFDM packet communication receiver.

FIG. 7 shows seventh embodiment, which is a modification of FIG. 5 and is directed to to claim 7. In FIG. 7, the same numerals as those in FIG. 5 show the same members.

In FIG. 7, a clock frequency error estimation block 700 comprises a pilot signal extractor 701, a phase rotation detector 702, a clock frequency error estimator 703 and a phase rotation calculator 503.

It is assumed in FIG. 7 that known pilot signals are transmitted by using a part of subcarriers in OFDM signals.

The pilot signal extractor 701 receives phase rotation compensated output of the phase rotation compensator 109, and extracts pilot signal components in detected signals.

The phase rotation detector 702 receives a pilot signal component, and detects phase rotation or accumulated phase rotation in the pilot signal component.

As a pilot signal is a known signal, a reference signal relating to a pilot signal is also known. Therefore, when phase rotation of a pilot signal is detected, no discrimination of a reference signal is required, and thus, signal processing is simplified. Further, even when high noise is added to a coherently detected signal, a reference signal can be correctly discriminated, and thus, phase rotation can be detected more accurately.

The clock frequency error estimator 703 receives an output of the phase rotation detector 702, and estimates clock frequency deviation or clock frequency error.

An output of the clock frequency error estimator 703 is applied to the phase rotation calculator 503 which calculates phase rotation in each coherently detected signal due to clock frequency error.

When known pilot signals are transmitted by using a part of subcarriers in OFDM signals, a clock frequency error estimator can be simplified, as clock frequency error can be detected by using pilot signals which are only a part of detected signals, and further, clock frequency error can be detected accurately as reference signal is correctly discriminated even under high noise condition. Thus, high accurate clock frequency compensation which is impossible in a prior art is realized. Further, as clock frequency error compensation process is carried out through a digital circuit, no complicated analog circuit is required, and power consumption is saved.

Eighth Embodiment

Figure 8:
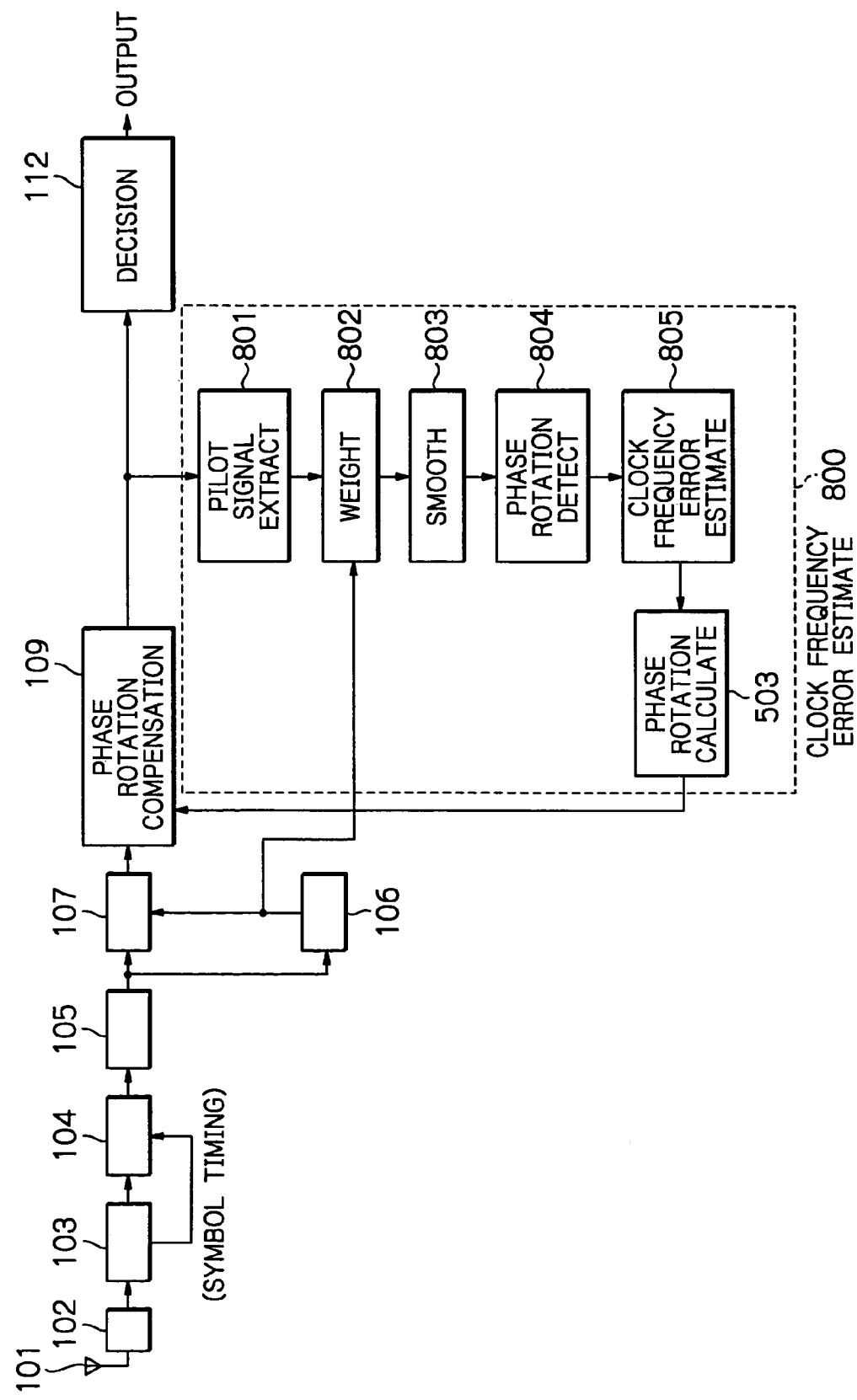
FIG. 8 is a block diagram of a eighth embodiment of an OFDM packet communication receiver.

FIG. 8 shows eighth embodiment, which is a modification of FIG. 5, and is directed to claim 8. The same numerals in FIG. 8 as those in FIG. 5 show the same members.

A clock frequency error estimation block 800 comprises a pilot signal extractor 801, a weighting circuit 802, a smoothing circuit 803, a phase rotation detector 804, a clock frequency error estimator 805, and a phase rotation calculator 503.

It is assumed in FIG. 8 that known pilot signals are transmitted by using a part of subcarriers in OFDM signals.

The pilot signal extractor 801 receives coherently detected and phase compensated signals from the phase rotation compensator 109, and extracts pilot signal components in the detected signals.

The weighting circuit 802 receives the extracted pilot signal, which has phase rotation information of a pilot signal, and then, gives a weight to said phase rotation information according to channel estimation result provided by the channel estimator 106.

For instance, when signal level of a subcarrier obtained by the channel estimation result is high, the phase rotation information of the pilot signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of a pilot signal which has low signal level, and accurate clock frequency error estimation can be realized.

An output of the weighting circuit 802 is applied to the smoothing circuit 803, which carries out moving average of the weighted phase rotation information along time axis for each subcarrier, so that the weighted phase rotation information is smoothed. The smoothing operation removes degradation of signal quality due to thermal noise and others in the receiving circuit 102.

The phase rotation detector 804 detects phase rotation of the weighted and smoothed pilot signal.

The clock frequency error estimator 805 estimates clock frequency deviation or clock frequency error by using the detected phase rotation according to the equation (5).

The clock frequency deviation or the clock frequency error estimated by the clock frequency error estimator 805 is applied to the phase rotation calculator 503.

As described above, when known pilot signals are transmitted by using a part of subcarriers in OFDM signals, clock frequency error can be detected effectively by using only a part of detected signals, and thus, structure of a clock frequency error estimator can be simplified. Further, even when high thermal noise is added to a coherently detected signal, a reference signal of the related signal is discriminated correctly, and thus, the accuracy of the clock frequency error is improved.

Further, even when signal quality depends upon each subcarrier, clock frequency error can be detected accurately, by mitigating the effect of fading by giving large weight to the phase rotation information relating to a pilot signal with good transmission quality. Further, as the smoothing operation along time axis suppresses the effect by thermal noise and others, clock frequency error is detected further more accurately. Thus, highly accurate clock frequency error compensation which is impossible in a prior art is accomplished. Further, as the clock frequency error compensation is carried out through digital process, and therefore, no complicated analog circuit is required, and power consumption is saved.

Ninth Embodiment

Figure 9:
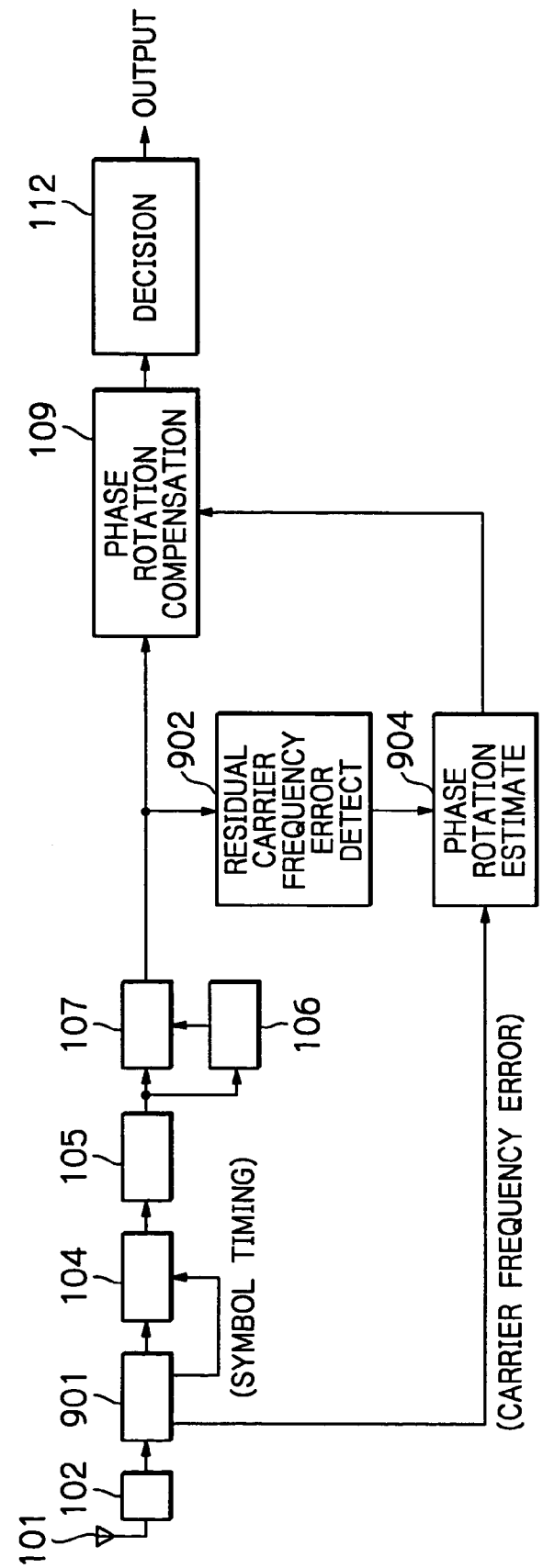
FIG. 9 is a block diagram of a ninth embodiment of an OFDM packet communication receiver.

FIG. 9 shows ninth embodiment which is directed to claim 9.

Receiving means, synchronization means, Fourier transform means, channel estimation means, coherent detection means, residual carrier frequency error estimation means, phase rotation estimation means, and phase rotation compensation means in claim 9 correspond, respectively, to a receiving circuit 102, a synchronization circuit 901, a Fourier transform circuit 105, a channel estimator 106, a coherent detection circuit 107, a residual carrier frequency error detector 902, a phase rotation estimator 904, and a phase rotation compensator 109.

It is assumed in FIG. 9 that sampling clock frequency is synchronized with carrier frequency in a transmitter which transmits OFDM signals. Further, a receiver in FIG. 9 controls so that sampling clock frequency in a receiver is synchronized with carrier frequency in a receiver. In the current embodiment, carrier frequency and sampling clock frequency are generated by a common single generator, and therefore, sampling clock frequency is inherently synchronized with carrier frequency.

An OFDM signal received by an antenna 101 is applied to a receiving circuit 102, which carries out receiving process including frequency conversion, filtering, orthogonal detection, A/D conversion and others to the received OFDM signals, and provides baseband signals in complex form as output signals.

The complex baseband signal from the receiving circuit 102 is applied to a synchronization circuit 901, which detects OFDM symbol timing and carrier frequency error by using a preamble for synchronization (FIG. 44) included in the complex baseband signals. By using the carrier frequency error information, the synchronization circuit 901 carries out to compensate the carrier frequency error for the complex baseband signals.

The synchronization circuit 901 provides complex baseband signals which the carrier frequency error is compensated, the symbol timing information, and the detected carrier frequency error information. The complex baseband signals and the symbol timing information are applied to the guard interval removing circuit 104, and the carrier frequency error information is applied to a phase rotation estimator 904. The symbol timing information is necessary for removing a guard interval of each received OFDM symbol, and extracting useful data component from each symbol.

The guard interval removing circuit 104 carries out FFT window process to the complex baseband signals according to the symbol timing information from the synchronization circuit 901. In other words, a guard interval is removed by extracting only signal components having time width equal to time width of FFT window for each OFDM symbol in complex baseband signals. The time width of FFT window is equal to the difference between OFDM symbol length and a guard interval length.

The complex baseband signal which is free from a guard interval is applied to a Fourier transform circuit 105 for each OFDM symbol. The Fourier transform circuit 105 carries out fast Fourier transform to each OFDM symbol so that the input signals are divided into subcarrier signals.

The divided subcarriers are applied to a coherent detection circuit 107 and a channel estimator 106. The channel estimator 106 estimates condition of a channel which each subcarrier is transmitted by using a preamble for channel estimation (FIG. 44).

An output of the channel estimator 106, i.e., channel estimation result, provides how amplitude and phase of each subcarrier is affected by fading. An output of the channel estimator 106 is applied to a coherent detection circuit 107.

The coherent detection circuit 107 carries out coherent detection process to the complex baseband signals from the Fourier transform circuit 105 by compensating amplitude fluctuation and phase rotation due to fading, carrier frequency error and others for each subcarrier by using the channel estimation result provided by the channel estimator 106.

An output of the coherent detection circuit 107 is applied to a residual carrier frequency error detector 902 and a phase rotation compensator 109. The residual carrier frequency error detector 902 detects residual carrier frequency error by detecting phase rotation caused by residual carrier frequency error in a coherently detected signals.

For example, in the case where 16QAM modulation scheme is used to modulate each subcarrier, a signal after coherent detection is to locate one of 16 reference signals S1 through S16 as shown in FIG. 45. However, when there exists a sampling clock frequency error between a transmitter and a receiver, the signals which are coherent detected are subject to said phase rotation as shown in the equation (5) and (6), and output signals from the coherent detection circuit 107 (e.g., R1 or R2 in FIG. 45) do not coincide with one of the reference signals S1 through S16.

The phase rotation caused by carrier frequency error is uniform to a signal component of all the detected signals in an OFDM symbol, as shown in the equation (6). Further, as OFDM symbol duration is fixed, phase rotation per one OFDM symbol is proportional to residual carrier frequency error. Therefore, the residual carrier frequency error detector 902 detects residual carrier frequency error according to the equation (6), by detecting phase rotation which is common to all the subcarriers in a certain OFDM symbol, or by detecting accumulated phase rotation from channel estimation until a current OFDM symbol.

In practice, phase rotation of each subcarrier from a reference signal is detected in a certain OFDM symbol. For instance, when a detected signal from the coherent detection circuit 107 is R1 in FIG. 45, the residual carrier frequency error detector 902 detects the phase difference θ1 between the detected signal R1 and the reference signal S3 which is the closest to the detected signal R1 among the reference signals S1 through S16. Further, when a detected signal is R2 in FIG. 45, the residual carrier frequency error detector 902 detects the phase difference φ2 between the detected signal R2 and the reference signal S6 which is the closest to the detected signal R2.

The detected phase rotation includes not only the phase rotation caused by residual carrier frequency error shown in the equation (6), but also the phase rotation caused by clock frequency error shown in the equation (5). Therefore, in order to detect the phase rotation which is uniform to all the subcarriers in a certain OFDM symbol caused by the residual carrier frequency error, the carrier frequency error detector 902 takes an average of the phase rotations of all the subcarriers in the OFDM symbol.

The phase rotation caused by clock frequency error is proportional to frequency offset between channel center frequency and current subcarrier frequency as shown in the equation (5). Therefore, when phase rotations of all the subcarriers in an OFDM symbol are averaged, phase rotations of the subcarriers symmetrical to channel center frequency are cancelled with each other, and thus, only the phase rotation of the equation (6) due to the residual carrier frequency error is obtained. By using the phase rotation information thus obtained, the residual carrier frequency error is calculated according to the equation (6). The residual carrier frequency error detector 902 provides the thus calculated residual carrier frequency error information.

The phase rotation estimator 904 receives the residual carrier frequency error information from the residual carrier frequency error detector 902, and the carrier frequency error information from the synchronization circuit 901. Then, the phase rotation estimator 904 estimates phase rotation due to clock frequency error for each detected signal.

In the embodiment, it is assumed that carrier frequency and sampling clock frequency are synchronized with each other in a transmitter, and carrier frequency and sampling clock frequency in a receiver are synchronized with each other. With that assumption, the ratio ($\Delta x$) of the sampling clock frequency error between a transmitter and a receiver to a reference sampling clock frequency is equal to the ratio of the carrier frequency error between a transmitter and a receiver to a reference carrier frequency. Thus, the following equation is satisfied.

$$\Delta x = (f_{RCLK} - f_{TCLK})/f_{CLK} = \Delta f/f_{RF} = (f_{RRF} - f_{TRP})/f_{RF} \quad (7)$$

where;

$f_{TRF}$; carrier frequency in a transmitter $f_{RRF}$; carrier frequency in a receiver $f_{RF}$ reference carrier frequency Accordingly, by inserting the equation (7) into the equation (5), the phase rotation $\Delta\theta$ of a detected signal due to clock frequency error between a transmitter and a receiver is expressed as follows.

$$\Delta\theta \approx 2\pi * f * t * (f_{RRF} - f_{TRP})/f_{RF} \quad (8)$$

Thus, the phase rotation $\Delta\theta$ due to clock frequency error between a transmitter and a receiver is obtained based upon the equation (8) according to carrier frequency error information from the synchronization circuit 901 and residual carrier frequency error information from the residual carrier frequency error detector 902. By the way, although the phase rotation $\Delta\theta$ might be obtained based upon the equation (8)

only by using the clock frequency error information between a transmitter and a receiver, the use of the residual carrier frequency error information improves the accuracy of the detected phase rotation.

It should be noted in the equation (8) that the phase rotation $\Delta\theta$ due to clock frequency error between a transmitter and a receiver depends upon each subcarrier and each OFDM symbol. Therefore, the phase rotation estimator 904 estimates the phase rotation of a coherently detected signal based upon the equation (8) due to clock frequency error between a transmitter and a receiver by using both an output of the synchronization circuit 901 and an output of the residual carrier frequency error detector 902.

The phase compensator 903 carries out the phase compensation for each coherently detected signals from the coherent detection circuit 107 according to the phase rotation information for each detected signals from the phase rotation estimator 904.

An output of the phase rotation compensator 109 is applied to a decision circuit 112, which discriminates a symbol for data signals (FIG. 44), and provides a discriminated result as a demodulated output. When 16QAM modulation scheme is used to modulate each subcarrier, the decision circuit 112 discriminates which reference signal S1 through S16 a detected signal corresponds. Since the phase rotation is compensated accurately, the signal can be discriminated with no affection of clock frequency error. Thus, a highly accurate clock frequency error compensation which is impossible in a prior art is obtained. Further, as clock frequency error compensation is carried out through digital process, no complicated analog compensation circuit is required, and power consumption is saved.

Tenth Embodiment

Figure 10:
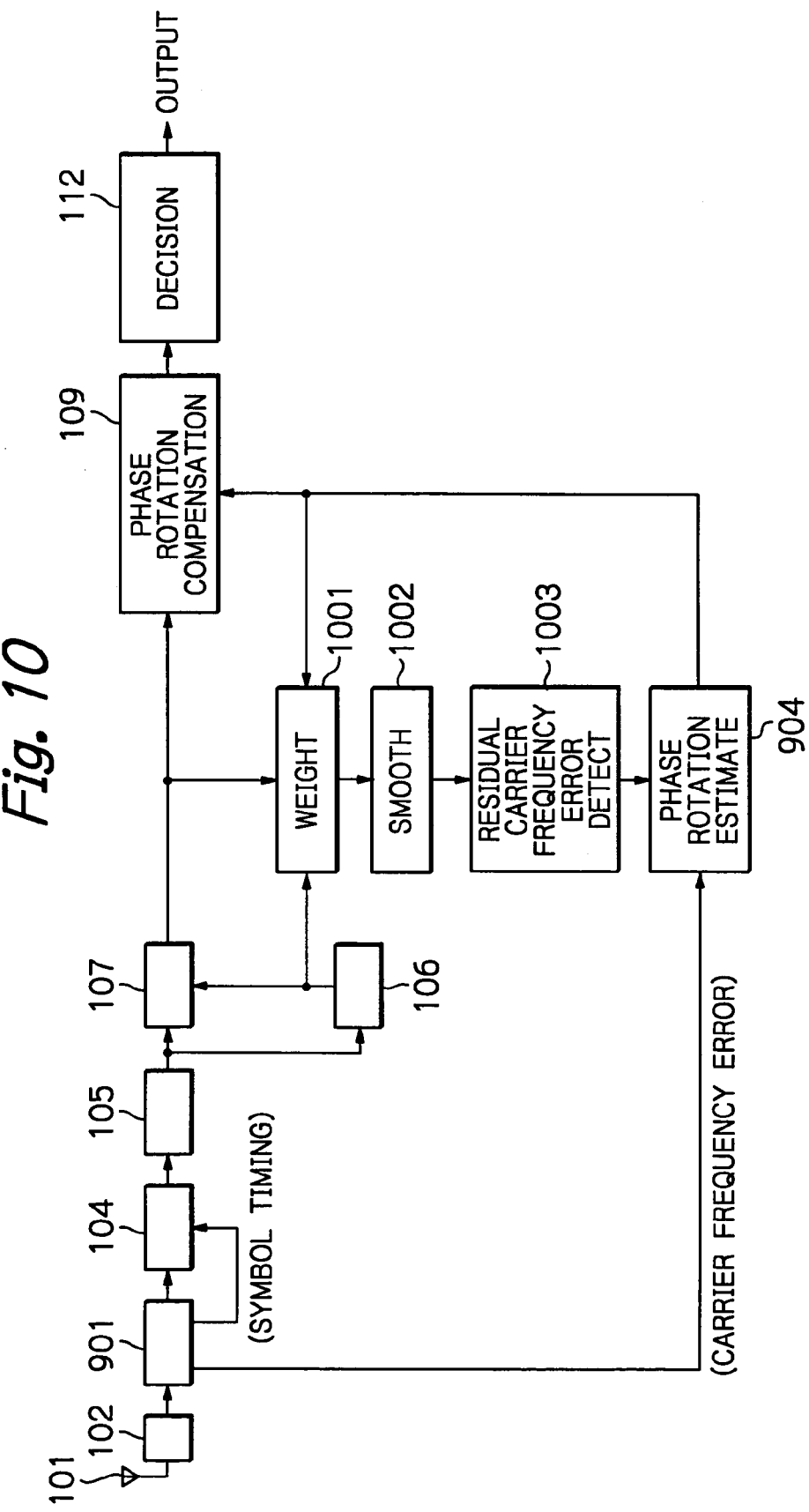
FIG. 10 is a block diagram of a tenth embodiment of an OFDM packet communication receiver.

FIG. 10 shows tenth embodiment, which is a modification of FIG. 9, and is directed to claim 10. The same numerals in FIG. 10 as those in FIG. 9 show the same members.

FIG. 10 embodiment comprises a weighting circuit 1001 and a smoothing circuit 1002. The operation of a residual carrier frequency error detector 1003 is essentially the same as that of the residual carrier frequency error detector 902.

It is assumed in FIG. 10 that carrier frequency and clock frequency are synchronized with each other in a transmitter, and further, clock frequency in a receiver is controlled so that it synchronizes with carrier frequency.

A weighting circuit 1001 receives an output of the coherent detection circuit 107, an output of the channel estimator 106, and an output of a phase rotation estimator 904.

The weighting circuit 1001 receives a part or all of the detected signals of the coherent detection circuit 107. The weighting circuit 1001 compensates phase rotation in the detected signal caused by clock frequency error by using the phase rotation information provided by the phase rotation estimator 904, and then, the weighting circuit 1001 gives a weight to the phase rotation information according to an output of the channel estimator 106.

For instance, when signal level of a subcarrier obtained by the channel estimation result is high, the phase rotation information of the signal transmitted by the corresponding subcarrier is weighted with a large weight coefficient, and when signal level of a subcarrier is low, the phase rotation information is weighted with a small weight coefficient. The above-4 mentioned weighting is advantageous that residual carrier frequency error estimator are affected little by phase rotation of the signal which has low signal level, and accurate residual carrier frequency error estimation can be realized.

The phase rotation information weighted by the weighting circuit 1001 is applied to the smoothing circuit 1002, which carries out moving average of the weighted phase rotation information for each subcarrier along time axis. Thus, the smoothing circuit 1002 smoothes the weighted phase rotation information. The smoothing operation removes the signal degradation due to thermal noise and others added to a received signal in the receiving circuit 102.

The residual carrier frequency error detector 1003 receives the weighted and smoothed phase rotation information, and calculates residual carrier frequency error according to the equation (6) by detecting the phase rotation caused by residual carrier frequency error in the weighted and smoothed phase rotation information. The operation of the residual carrier frequency error detector 1003 is essentially the same as that of the residual carrier frequency error detector 902.

The phase rotation estimator 904 estimates phase rotation caused by clock frequency error for each detected signal according to carrier frequency error information from the synchronization circuit 901 and residual carrier frequency error information from the residual carrier frequency error detector 1003.

When signal quality depends upon each subcarrier, the effect of fading is decreased by assigning large weight to the phase rotation information relating to a subcarrier with good communication quality, and the residual carrier frequency error is accurately detected. Further, with the averaging of the phase rotation along time axis, further accurate residual carrier frequency error is obtained by suppressing effect of thermal noise and others. Thus, a highly accurate clock frequency error compensation which is impossible in a prior art is obtained, and further, the compensation for clock frequency error is carried out through digital process, no complicated analog circuit is required, and power consumption is saved.

Eleventh Embodiment

Figure 11:
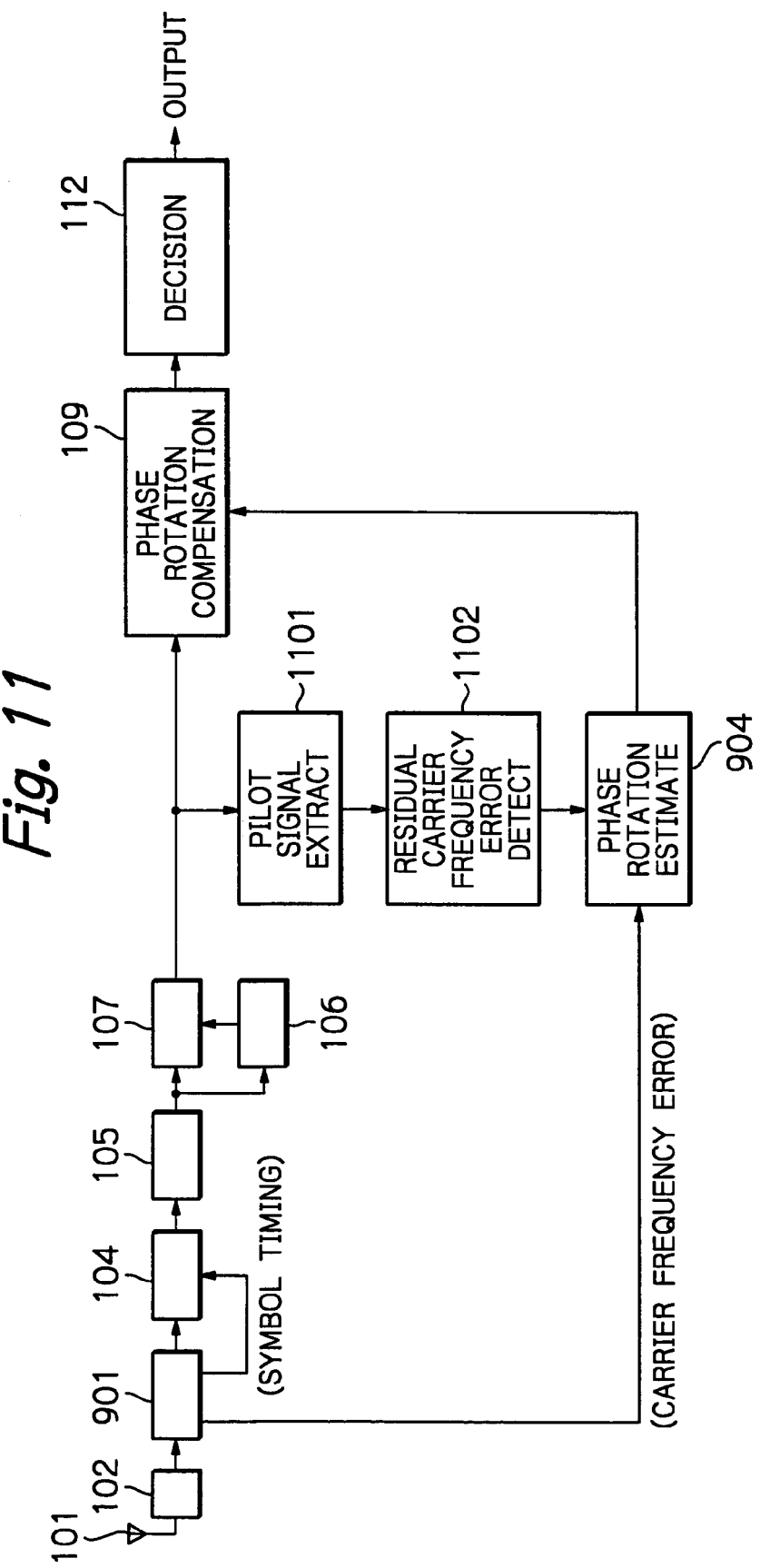
FIG. 11 is a block diagram of an eleventh embodiment of an OFDM packet communication receiver.

FIG. 11 shows eleventh embodiment, which is a modification of FIG. 9 and is directed to claim 11. The same numerals in FIG. 11 as those in FIG. 9 show the same members.

The embodiment of FIG. 11 has a pilot signal extractor 1101. The operation of a residual carrier frequency error detector 1102 is essentially the same as that of the residual carrier frequency error detector 902.

It is assumed in FIG. 11 that known pilot signals are transmitted by using a part of subcarriers in OFDM signals. Further, it is assumed in FIG. 11 that carrier frequency and clock frequency are synchronized with each other in a transmitter, and clock frequency is controlled in a receiver so that it synchronizes with carrier frequency.

The pilot signal extractor 1101 receives output signals of the coherent detection circuit 107, and extracts signal components of pilot signals in said output signals.

The residual carrier frequency error detector 1102 receives said pilot signal, and detects phase rotation for each detected signal or accumulated phase rotation in the detected signal which is common to all detected signals in an OFDM symbol.

As a pilot signal is a known signal, a reference signal (e.g., one of S1 through S16 in FIG. 45) corresponding to the pilot signal is also known. Therefore, when phase rotation of a pilot signal is only detected, no reference signal relating to the pilot signal is necessary to be discriminated, and the signal processing in the residual carrier frequency error detector 1102 is simplified. Further, even when noise component is added to a detected signal, a reference signal relating to the detected signal is correctly discriminated, and thus, the phase rotation is accurately detected.

The residual carrier frequency error detector 1102 obtains residual carrier frequency error according to the equation (6) from the detected phase rotation or accumulated phase rotation. The operation of the residual carrier frequency error detector 1102 is essentially the same as that of the residual carrier frequency error detector 902. An output of the residual carrier frequency error detector 1102 is applied to the phase rotation estimator 904.

As described above, when pilot signals which are known are transmitted, residual carrier frequency error can be detected by using pilot signals which are only a part of the detected signals, and thus, the structure of the residual carrier frequency error detection means is simplified. Further, even when noise component is added to a detected signal, the detected signal is correctly discriminated, and therefore, the residual carrier frequency error is detected accurately.

Thus, a highly accurate clock frequency compensation which is impossible in a prior art is obtained. And further, as the clock frequency error compensation is carried out through digital process, no complicated analog circuit is required, and power consumption is saved.

Twelfth Embodiment

Figure 12:
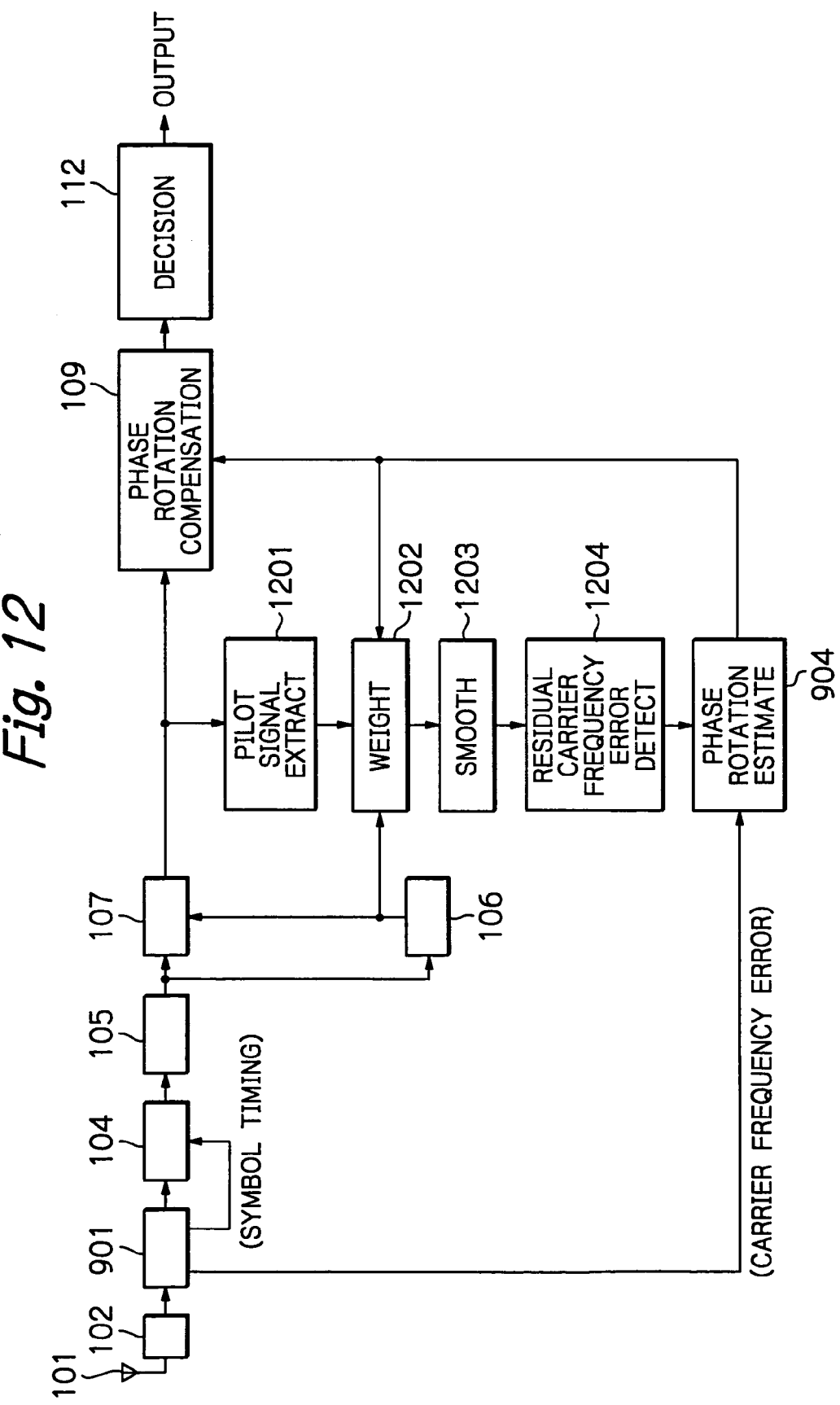
FIG. 12 is a block diagram of a twelfth embodiment of an OFDM packet communication receiver.

FIG. 12 shows twelfth embodiment, which is a modification of FIG. 9, and is directed to claim 12.

The same numerals in FIG. 12 as those in FIG. 9 show the same members.

The embodiment of FIG. 12 comprises a pilot signal extractor 1201, a weighting circuit 1202, a smoothing circuit 1203, and a residual carrier frequency error detector 1204. The operation of the residual carrier frequency error detector 1204 is essentially the same as that of the residual carrier frequency error detector 902.

It is also assumed in FIG. 12 that known pilot signals are transmitted by using a part of subcarriers.

Further, it is assumed that carrier frequency and clock frequency are synchronized with each other in a transmitter, and clock frequency in a receiver is synchronized with carrier frequency.

The pilot signal extractor 1201 extracts pilot signals in output signals of the coherent detection circuit 107.

The weighting circuit 1202 receives a pilot signal extracted by the pilot signal extractor 1201, a channel estimation result estimated by the channel estimator 106, and phase rotation information provided by the phase rotation estimator 904. The weighting circuit 1202 compensates, first, phase rotation of a detected signal caused by clock frequency error by using phase rotation information of the corresponding detected signal provided by the phase rotation estimator 904, and detects phase rotation of the phase compensated signal from a reference signal. Then, the weighting circuit 1202 gives a weight to the phase rotation information according to a channel estimation result provided by the channel estimator 106.

For instance, when signal level of a subcarrier obtained by the channel estimation result is high, the phase rotation information of the pilot signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of pilot signal which has low signal level, and accurate residual carrier frequency error estimation can be realized.

The phase rotation information weighted by the weighting circuit 1202 is applied to a smoothing circuit 1203, which carries out moving average of the weighted phase rotation information for each subcarrier along time axis. Thus, the smoothing circuit 1203 smoothes the weighted phase rotation information. The smoothing operation removes signal degradation caused by thermal noise and others in the receiving circuit 102.

The residual carrier frequency error detector 1204 receives an output of the smoothing circuit 1203, detects phase rotation caused by residual carrier frequency error, and calculates residual carrier frequency error. The operation of the residual carrier frequency error detector 1204 is essentially the same as that of the residual carrier frequency error detector 902. An output of the residual carrier frequency error detector 1204 is applied to the phase rotation estimator 904.

As described above, as pilot signals are transmitted and residual carrier frequency error can be efficiently detected by using pilot signals which are only a part of the coherent detected signals, the circuit structure of residual carrier frequency error detection means is simplified. Further, even when noise is added to a detected signal, the reference signal relating to the detected signal is correctly discriminated, and therefore, the residual carrier frequency error can be accurately detected.

Further, when communication quality depends upon each subcarrier, the weight relating to a subcarrier with good signal quality is selected large, so that the effect by fading is decreased, and therefore, the residual carrier frequency error is further accurately detected. Further, as the smoothing operation of phase rotation along time axis suppresses the effect by thermal noise and others, residual carrier frequency error is detected further more accurately. Thus, a highly accurate clock frequency error compensation which is impossible in a prior art is realized. And further, as the clock frequency error compensation is carried out through digital process, no complicated analog circuit is required, and power consumption is saved.

Thirteenth Embodiment

Figure 13:
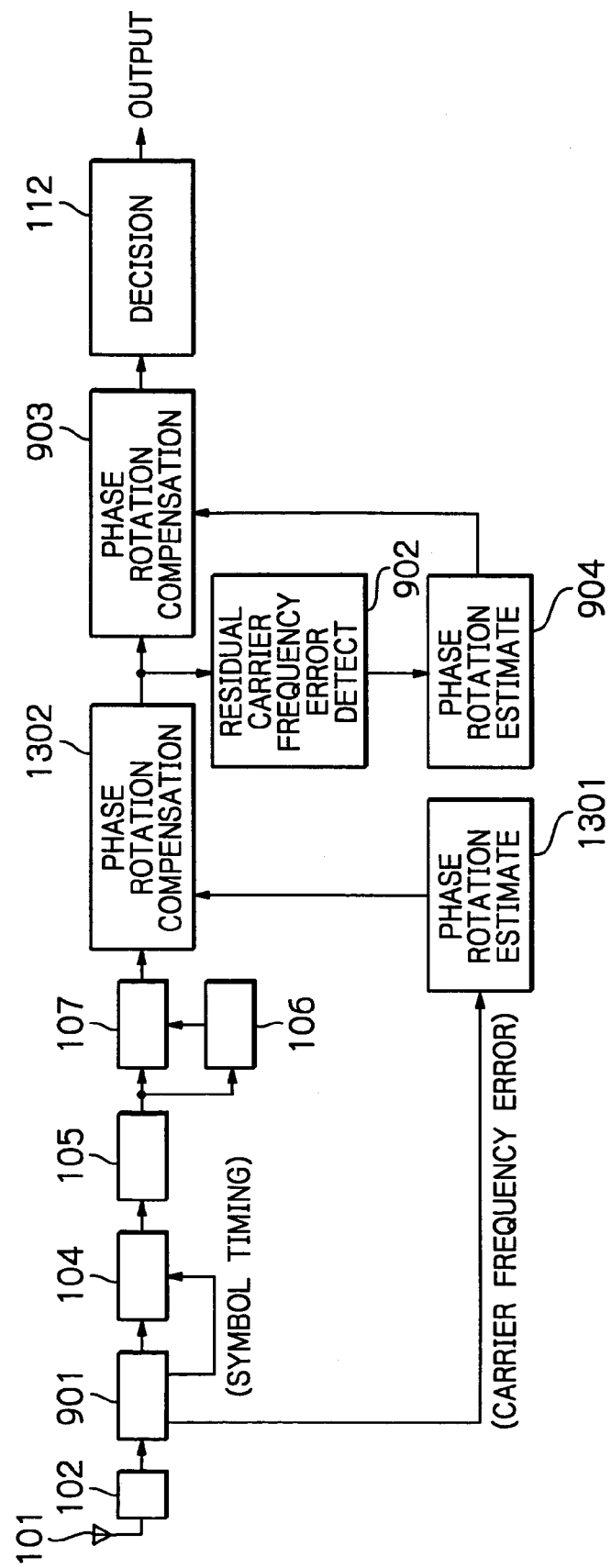
FIG. 13 is a block diagram of a thirteenth embodiment of an OFDM packet communication receiver.

FIG. 13 shows thirteenth embodiment, which is a modification of FIG. 9, and is directed to claim 13. The same numerals in FIG. 13 as those in FIG. 9 show the same members.

In claim 13, receiving means, synchronization means, Fourier transform means, channel estimation means, coherent detection means, first phase rotation estimation means, first phase rotation compensation means, residual carrier frequency error estimation means, second phase rotation estimation means, and second phase rotation compensation means correspond, respectively, to a receiving circuit 102, a synchronization circuit 901, a Fourier transform circuit 105, a channel estimator 106, a coherent detection circuit 107, a phase rotation estimator 904, a phase rotation compensator 1302, a residual carrier frequency error detector 902, a phase rotation estimator 904, and a phase rotation compensator 903.

It is also assumed in FIG. 13 that sampling clock frequency is synchronized with carrier frequency in a transmitter, and a receiver controls sampling clock frequency so that it synchronizes with carrier frequency.

In FIG. 13, an OFDM packet communication receiver comprises two independent phase rotation estimators 1301 and 904, and two independent phase rotation compensators 903, and 1302. The phase rotation estimator 1301 estimates phase rotation of a coherently detected signal caused by clock frequency error by using carrier frequency error information from a synchronization circuit 901.

As sampling clock frequency in a transmitter is synchronized with carrier frequency, and sampling clock frequency in a receiver is synchronized with carrier frequency, the phase rotation caused by clock frequency error can be obtained by using the carrier frequency error information according to the equation (6). As phase rotation depends upon each detected signal, the phase rotation estimator 1301 calculates phase rotation of each detected signal.

The phase rotation compensator 1302 receives a coherently detected signal provided by the coherent detection circuit 107, and compensates phase rotation caused by clock frequency error of the coherently detected signal according to phase rotation information of the related coherently detected signal estimated by the phase rotation estimator 1301.

However, in an actual receiver, a synchronization circuit 901 can not detect and compensate carrier frequency error completely accurately due to thermal noise added to a received signal in a receiving circuit 102, and therefore, complex baseband signal provided by the synchronization circuit 901 includes residual carrier frequency error. Since the phase rotation compensator 1302 compensates phase rotation estimated by the phase rotation estimator 1301 according to carrier frequency error information provided by the synchronization circuit 901, the output of the phase rotation compensator 1302 still includes phase rotation caused by residual clock frequency error corresponding to the residual carrier frequency error.

In order to solve the above problem, the current embodiment has another phase rotation compensator 903 for compensating residual phase rotation caused by residual clock frequency error which is a part of phase rotation caused by clock frequency error.

The residual carrier frequency error detector 902 receives an output of the first phase rotation compensator 1302, and detects residual carrier frequency error included in said output. The residual carrier frequency error is detected by detecting the phase rotation of each coherently detected signal caused by residual carrier frequency error. The operation of the residual carrier frequency error detector 902 has already been described.

The phase rotation estimator 904 estimates said residual phase rotation in an output of the phase rotation compensator 1302 according to the residual carrier frequency error information provided by the residual carrier frequency error detector 902, for each detected signal.

As it is assumed in the current embodiment that sampling clock frequency in a transmitter is synchronized with carrier frequency, and sampling clock frequency in a receiver is synchronized with carrier frequency, the phase rotation caused by clock frequency error can be obtained according to the equation (8) by using the residual carrier frequency error detected by the residual carrier frequency error detector 902. As phase rotation depends upon each detected signal, the phase rotation estimator 904 calculates phase rotation for each detected signal.

The phase rotation compensator 903 carries out the phase rotation compensation process so that the phase rotation in an output of the first phase rotation compensator 1302 is removed, according to phase rotation information of each coherently detected signal provided by the phase rotation estimator 904. The second phase rotation compensation removes residual phase rotation caused by clock frequency error which can not be removed in the first phase rotation compensator 1302.

The phase rotation compensators 1302 and 903 accurately compensate phase rotation caused by clock frequency error between a transmitter and a receiver for each detected signal, before a detected signal is discriminated which reference signal corresponds. Therefore, the decision circuit 112 can discriminate a signal with no affection by clock frequency error. Thus, a highly accurate clock frequency error compensation which is impossible in a prior art is obtained. Further, as said clock frequency error compensation process is carried out through digital process, no complicated analog circuit is required, and power consumption is saved.

Fourteenth Embodiment

Figure 14:
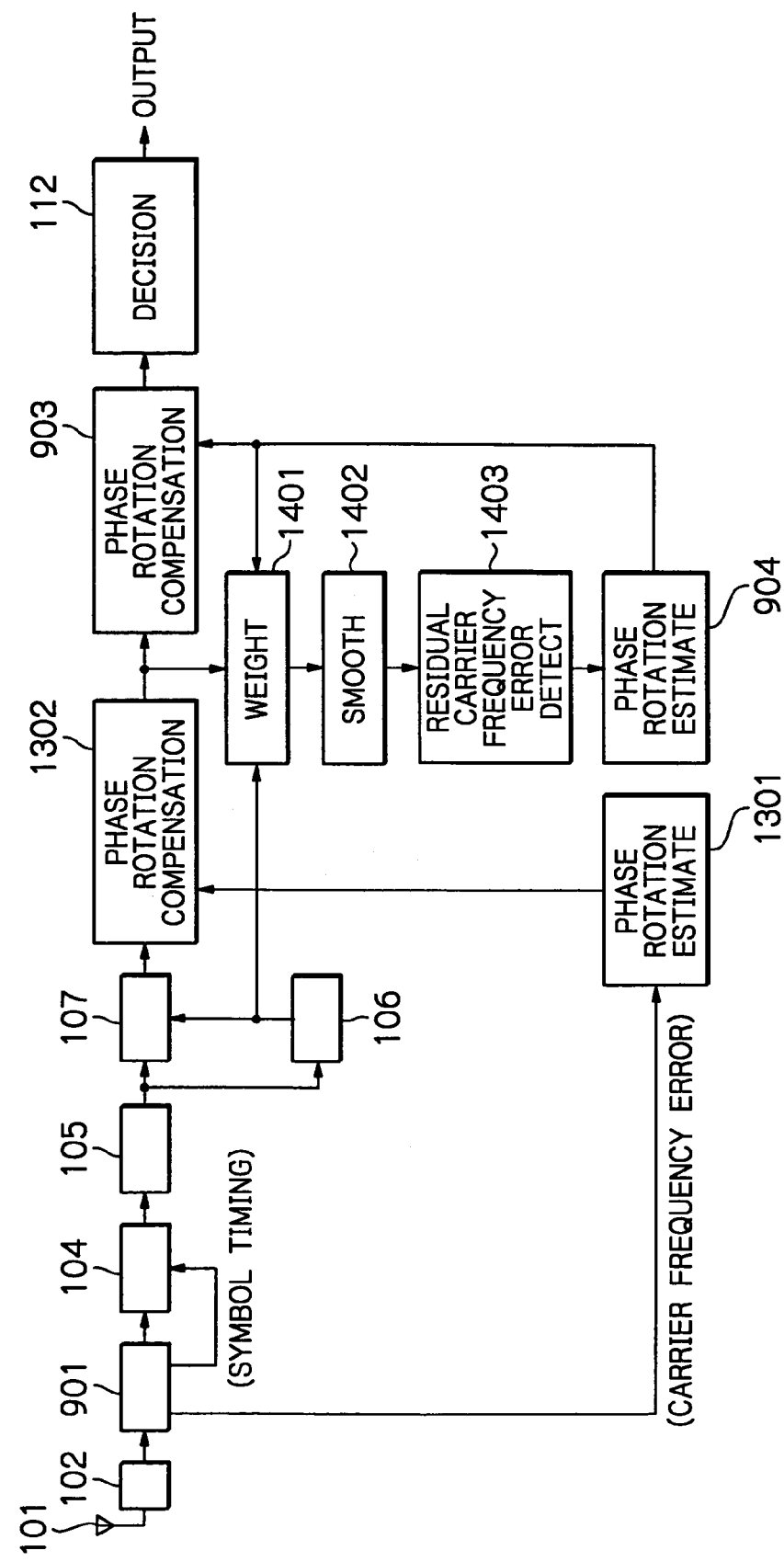
FIG. 14 is a block diagram of a fourteenth embodiment of an OFDM packet communication receiver.

FIG. 14 shows fourteenth embodiment, which is a modification of FIG. 13, and is directed to claim 14. The same numerals in FIG. 14 as those in FIG. 13 show the same members.

The receiver in FIG. 14 comprises a weighting circuit 1401 and a smoothing circuit 1402. The operation of a residual carrier frequency error detector 1403 is essentially the same as that of said residual carrier frequency error detector 902.

It is assumed also in FIG. 14 that sampling clock frequency in a transmitter is synchronized with carrier frequency, and sampling clock frequency in a receiver is synchronized with carrier frequency.

A weighting circuit 1401 receives an output of the phase rotation detector 1302, an output of the channel estimator 106, and an output of a phase rotation estimator 904.

The weighting circuit 1401 receives a part of or all the detected signals supplied by the phase rotation compensator 1302. The weighting circuit 1401 compensates, first, phase rotation of each detected signal caused by clock frequency error by using an output of the phase rotation estimator 904, and detects phase rotation between a phase compensated detected signal and a reference signal. Then, it gives a weight to said phase rotation information according to an output of the channel estimator 106.

For instance, when signal level of a subcarrier obtained by the channel estimation result is high, the phase rotation information of the signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of the signal which has low signal level, and accurate clock frequency error estimation can be realized.

The weighted phase rotation information is applied to the smoothing circuit 1402, which calculates moving average of weighted phase rotation information along time axis for each subcarrier, thus, the smoothing circuit 1402 smoothes the weighted phase rotation information. The smoothing operation removes degradation of signal quality caused by thermal noise and others added to a received signal in the receiving circuit 102.

The residual carrier frequency error detector 1403 receives the weighted and smoothed phase rotation information, and detects residual carrier frequency error by detecting phase rotation caused by residual carrier frequency error in an input signal. The operation of the residual carrier frequency error detector 1403 is essentially the same as that of the residual carrier frequency error detector 902.

The phase rotation estimator 904 estimates said residual phase rotation relating to clock frequency error included in the detected signal for each detected signal according to an output of the residual carrier frequency error detector 1403.

When signal quality depends upon each subcarrier, phase rotation relating to a subcarrier with high signal level is assigned large weight, so that the affection by fading is suppressed, and residual carrier frequency error is detected accurately. Further as phase rotation is processed through moving average along time axis, the affection by thermal noise and others is suppressed and residual carrier frequency error can be detected further accurately. Thus, a highly accurate clock frequency error compensation which is impossible in a prior art is obtained. Further, as clock frequency error compensation is carried out through digital process, no complicated analog circuit is required, and power consumption is saved.

Fifteenth Embodiment

Figure 15:
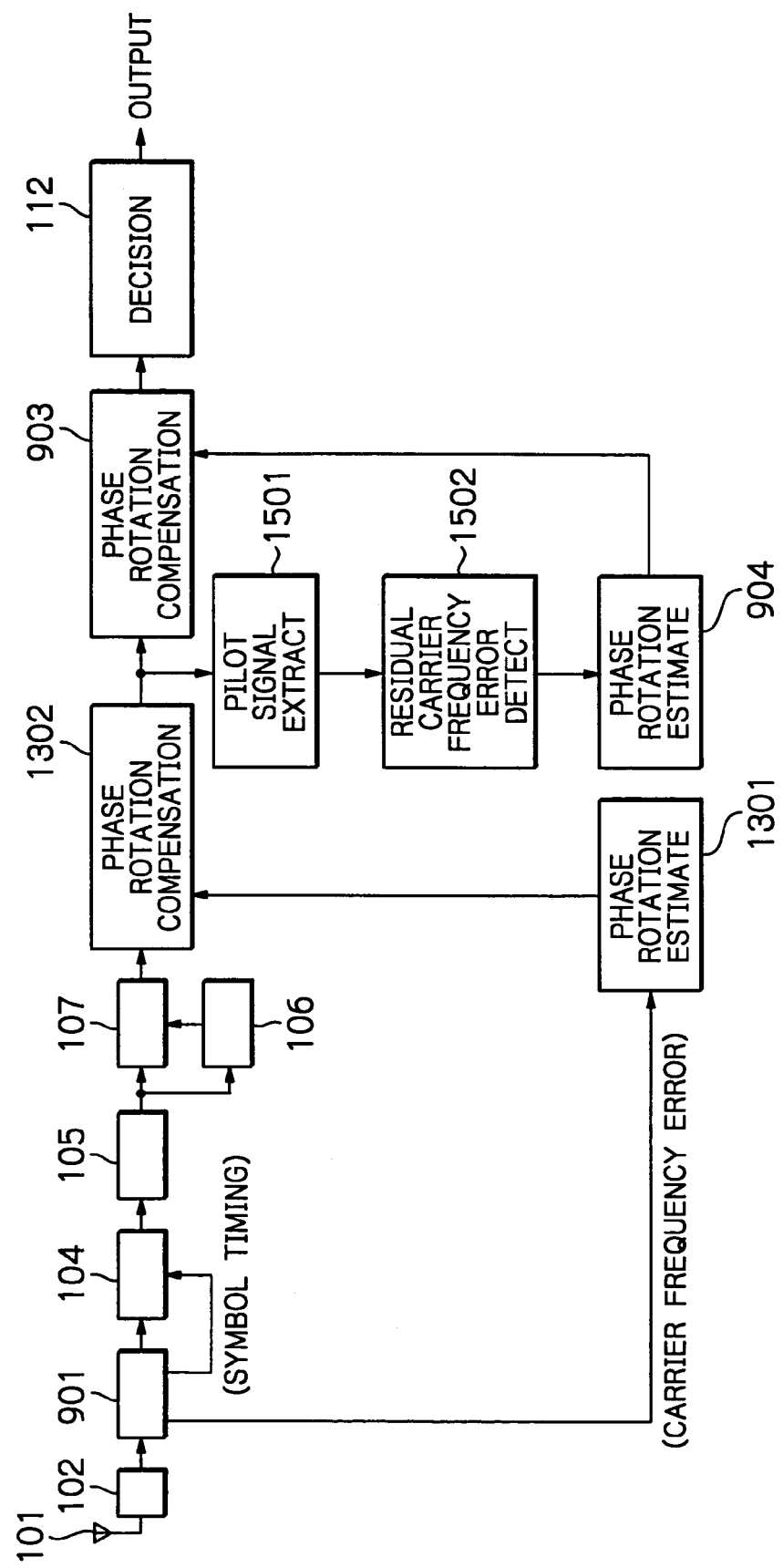
FIG. 15 is a block diagram of a fifteenth embodiment of an OFDM packet communication receiver.

FIG. 15 shows fifteenth embodiment, which is a modification of FIG. 13, and is directed to claim 15. The same numerals in FIG. 15 as those in FIG. 13 show the same members.

An OFDM packet communication receiver in FIG. 15 comprises a pilot signal extractor 1501. The operation of the residual carrier frequency error detector 1502 is essentially the same as that of the residual carrier frequency error detector 902.

It is assumed also in the current embodiment that known pilot signals are transmitted by using a part of subcarriers.

Further, it is assumed in the current embodiment that sampling clock frequency in a transmitter is synchronized with carrier frequency, and a receiver controls sampling clock frequency so that it synchronizes with carrier frequency.

The pilot signal extractor 1501 receives output signals of the phase rotation compensator 1302, and extracts signal components of pilot signals in said output signals. The residual carrier frequency error detector 1502 receives a pilot signal component extracted by the pilot signal extractor 1501, and detects phase rotation of each pilot signal, or accumulated phase rotation of each pilot signal.

Therefore, when phase rotation of only pilot signals is detected, no discrimination of the related reference signal is necessary, and thus, the signal processing in the residual carrier frequency error detector 1502 is simplified. Further, even when large noise is added to a coherently detected signal, phase rotation can be accurately detected, since a reference signal related to a detected signal is discriminated correctly.

The residual carrier frequency error detector 1502 detects residual carrier frequency error according to detected phase rotation information. The operation of the residual carrier frequency error detector 1502 is essentially the same as that of the residual carrier frequency error detector 902. The residual carrier frequency error information detected from pilot signals by the residual carrier frequency error detector 1502 is applied to the phase rotation estimator 904.

When pilot signals which are known are transmitted by using a part of the subcarriers in OFDM signals, residual carrier frequency error can be detected effectively by using only a part of the detected signals. Therefore, circuit structure of residual carrier frequency error detection means is simplified. Further, even when large noise is added to detected signals, residual carrier frequency error can be detected accurately since no wrong discrimination of the reference signal relating to the detected signal occurs.

Thus, a highly accurate clock frequency error compensation which is impossible in a prior art is obtained. Further, as clock frequency error compensation process is carried out through digital process, no complicated analog circuit is required, and power consumption is saved.

Sixteenth Embodiment

Figure 16:
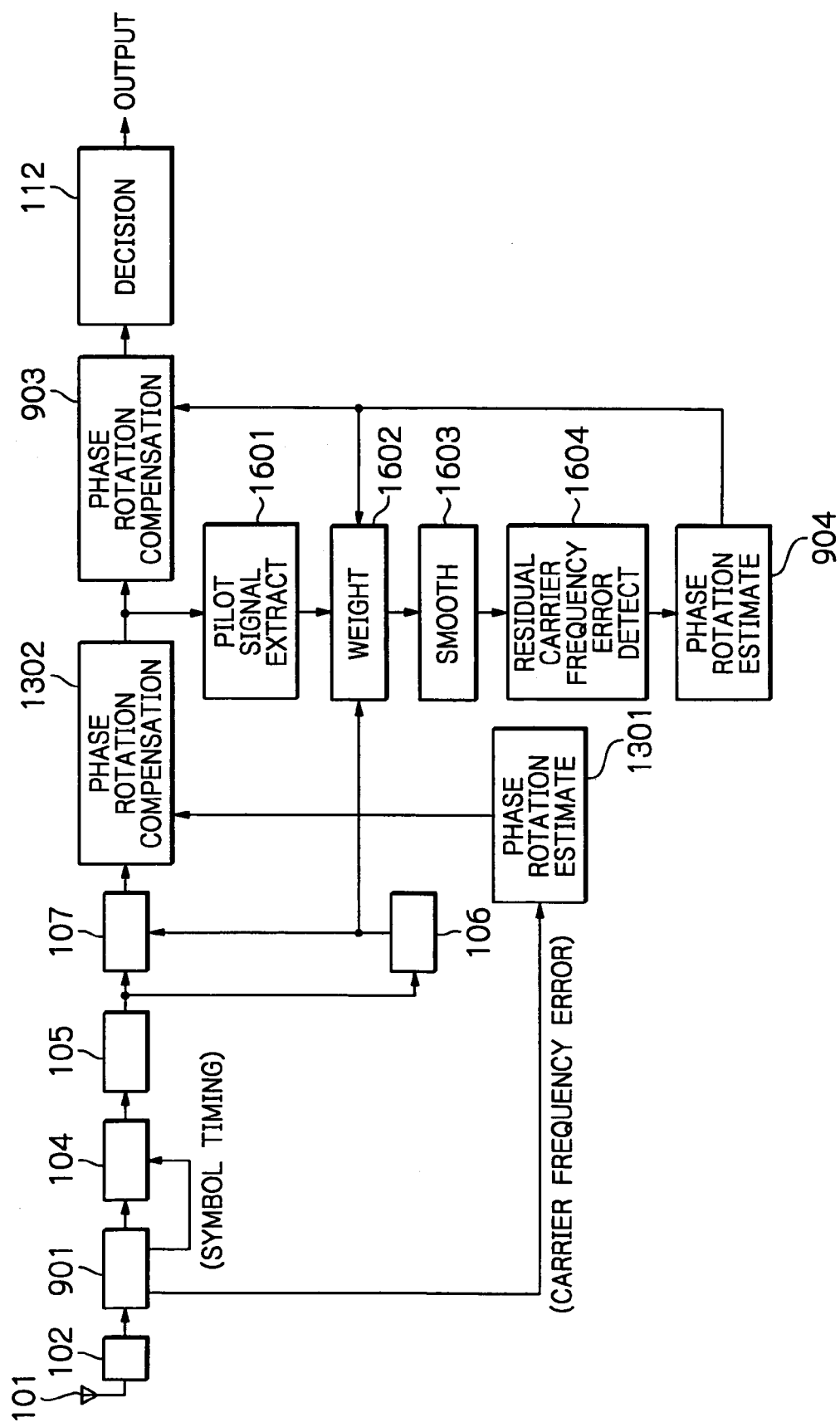
FIG. 16 is a block diagram of a sixteenth embodiment of an OFDM packet communication receiver.

FIG. 16 shows sixteenth embodiment, which is a modification of FIG. 13, and is directed to claim 16. The same numerals in FIG. 16 as those in FIG. 13 show the same members.

An OFDM packet communication receiver in FIG. 16 comprises a pilot signal extractor 1601, a weighting circuit 1602, a smoothing circuit 1603, and a residual carrier frequency error detector 1604. The operation of the residual carrier frequency error detector 1604 is essentially the same as that of the residual carrier frequency error detector 902.

It is assumed also in FIG. 16 that pilot signals which are known are transmitted by using a part of subcarriers in OFDM signals.

It is further assumed that sampling clock frequency in a transmitter is synchronized with carrier frequency, and a receiver controls sampling clock frequency so that it synchronizes with carrier frequency.

The pilot signal extractor 1601 receives an output of the phase rotation compensator 1302, and extracts subcarrier components which relate to a pilot signal in the detected signals.

The weighting circuit 1602 receives a coherently detected signal relating to a pilot signal from the pilot signal extractor 1601, a channel estimation result from the channel estimator 106, and phase rotation information of a detected signal which relates to a pilot signal from the phase rotation estimator 904.

The weighting circuit 1602 compensates phase rotation in the detected signal which relates to a pilot signal caused by clock frequency error according to phase rotation information from the phase rotation estimator 904, and then, detects phase rotation of the compensated signal from a reference signal. Then, it gives a weight to detected phase rotation information according to channel estimation result provided by the channel estimator 106.

For instance, when signal level of a subcarrier obtained by the channel estimation result is high, the phase rotation information of the pilot signal transmitted by the corresponding subcarrier is weighted with a large weight coefficient, and when signal level of a subcarrier is low, the phase rotation information is weighted with a small weight coefficient. The above-mentioned weighting is advantageous that succeeding circuits are affected little by phase rotation of pilot signal which has low signal level, and accurate residual carrier frequency error estimation can be realized.

The weighted phase rotation information is applied to the smoothing circuit 1603, which provides moving average of the weighted phase rotation information for each subcarrier along time axis, so that it smoothes weighted phase rotation information. The smoothing operation removes degradation of signal quality caused by thermal noise and others added to a received signal in a receiving circuit 102.

The residual carrier frequency error detector 1604 receives the weighted and smoothed phase rotation information, and detects phase rotation caused by residual carrier frequency error, and then, obtains residual carrier frequency error according to the detected phase rotation information. The operation of the residual carrier frequency error detector 1604 is essentially the same as that of the residual carrier frequency error detector 902.

An output of the residual carrier frequency error detector 1604 is applied to the phase rotation estimator 904.

When pilot signals which are known are transmitted by using a part of subcarriers in OFDM signals, circuit structure of residual carrier frequency error detection means is simplified, because residual carrier frequency error can be efficiently detected by using only a part of coherently detected signals relating only to pilot signals. Further, even when large noise is added to coherently detected signals, reference signal relating to the detected signal is discriminated correctly, and therefore, residual carrier frequency error can be detected accurately.

Further, when signal quality depends upon each subcarrier, phase rotation information relating to subcarrier which has high signal level is given large weight, so that the affection by fading is suppressed, and residual carrier frequency error can be detected further accurately. Further, moving average of phase rotation along time axis suppresses the affection by thermal noise and others, and residual carrier frequency error can be detected further accurately. Thus, a highly accurate clock frequency error compensation which is impossible in a prior art is obtained. Further, as the compensation is carried out through digital process, no complicated analog compensation circuit is required, and power consumption is saved.

Seventeenth Embodiment

Figure 17:
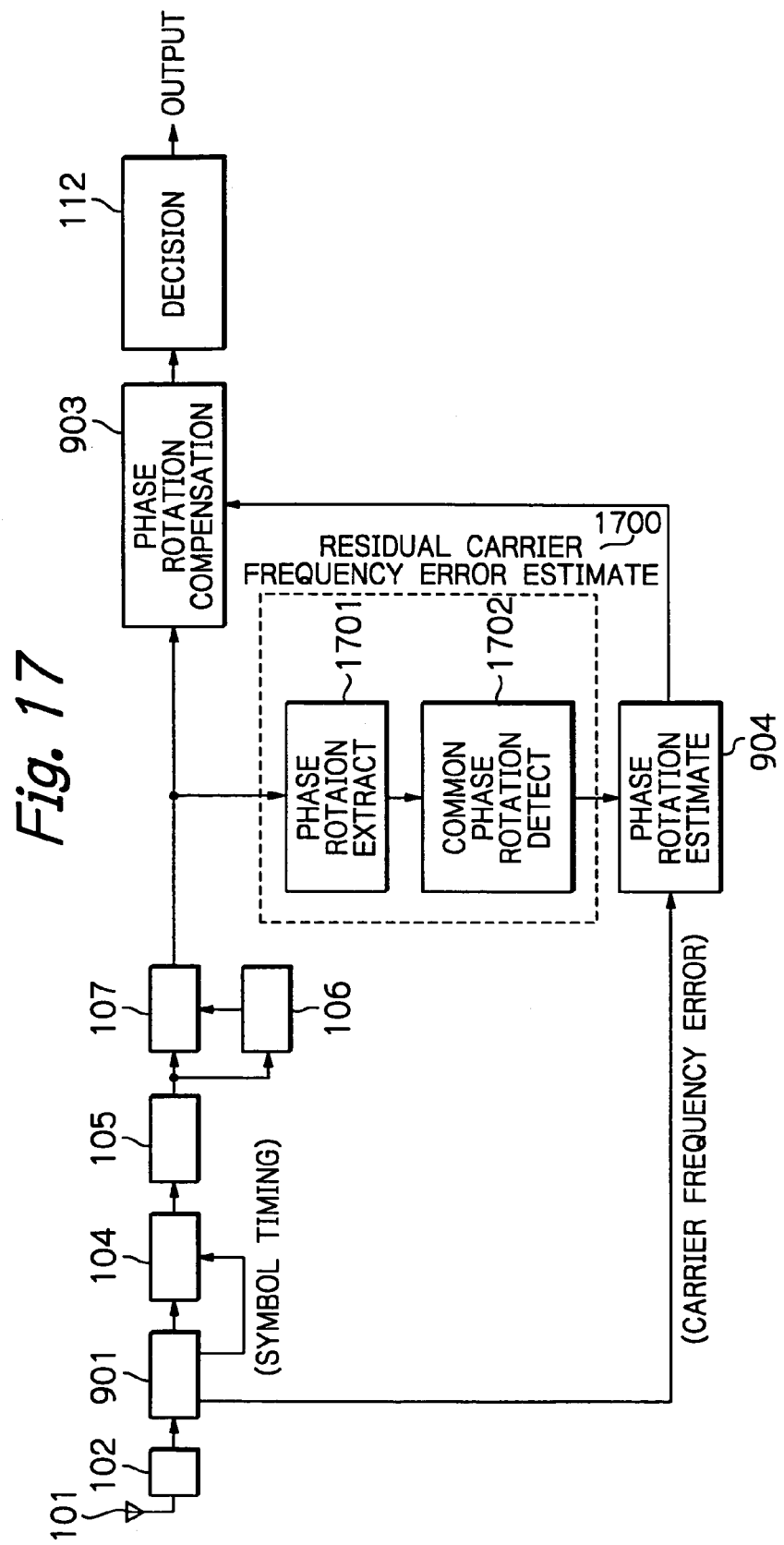
FIG. 17 is a block diagram of a seventeenth embodiment of an OFDM packet communication receiver.

FIG. 17 shows seventeenth embodiment, which is a modification of FIG. 9, and is directed to claim 17. The same numerals in FIG. 17 as those in FIG. 9 show the same members.

A residual carrier frequency error detection block 1700 comprises a phase rotation information detector 1701, and a common phase rotation detector 1702.

It is assumed also in the current embodiment that sampling clock frequency in a transmitter is synchronized with carrier frequency, and sampling clock frequency in a receiver is controlled to be synchronized with carrier frequency.

An output of a coherent detection circuit 107 is applied to the phase rotation information detector 1701 and phase rotation compensator 903. The phase rotation information extractor detects phase rotation of a part of or all of the coherently detected signals from reference signals shown in FIG. 45. The phase rotation information extracted by the phase rotation information detector 1701 is applied to the common phase rotation detector 1702.

As shown in the equation (6), the phase rotation caused by carrier frequency error is common to all the components of the coherently detected signals included in a certain OFDM symbol. Moreover, as an OFDM symbol duration is fixed, phase rotation per one OFDM symbol is proportional to residual carrier frequency error.

Therefore, the common phase rotation detector 1702 detects phase rotation per one OFDM symbol, which is caused by residual carrier frequency error and common to each coherently detected signal, or accumulated phase rotation from channel estimation until the current OFDM symbol, and calculates residual carrier frequency error information according to the equation (6). The residual carrier frequency error information calculated by the common phase rotation detector 1702 is applied to the phase rotation estimator 904.

Thus, the phase rotation caused by clock frequency error is accurately compensated by the phase rotation compensator 903 for each detected signal, before a detected signal is discriminated which reference signal corresponds, the decision circuit 112 can discriminate a signal with no affection by clock frequency error. Thus, a highly accurate clock frequency error compensation which is impossible in a prior art is obtained. Further, as clock frequency error compensation is carried out through digital process, no complicated analog compensation circuit is required, and power consumption is saved.

Eighteenth Embodiment

Figure 18:
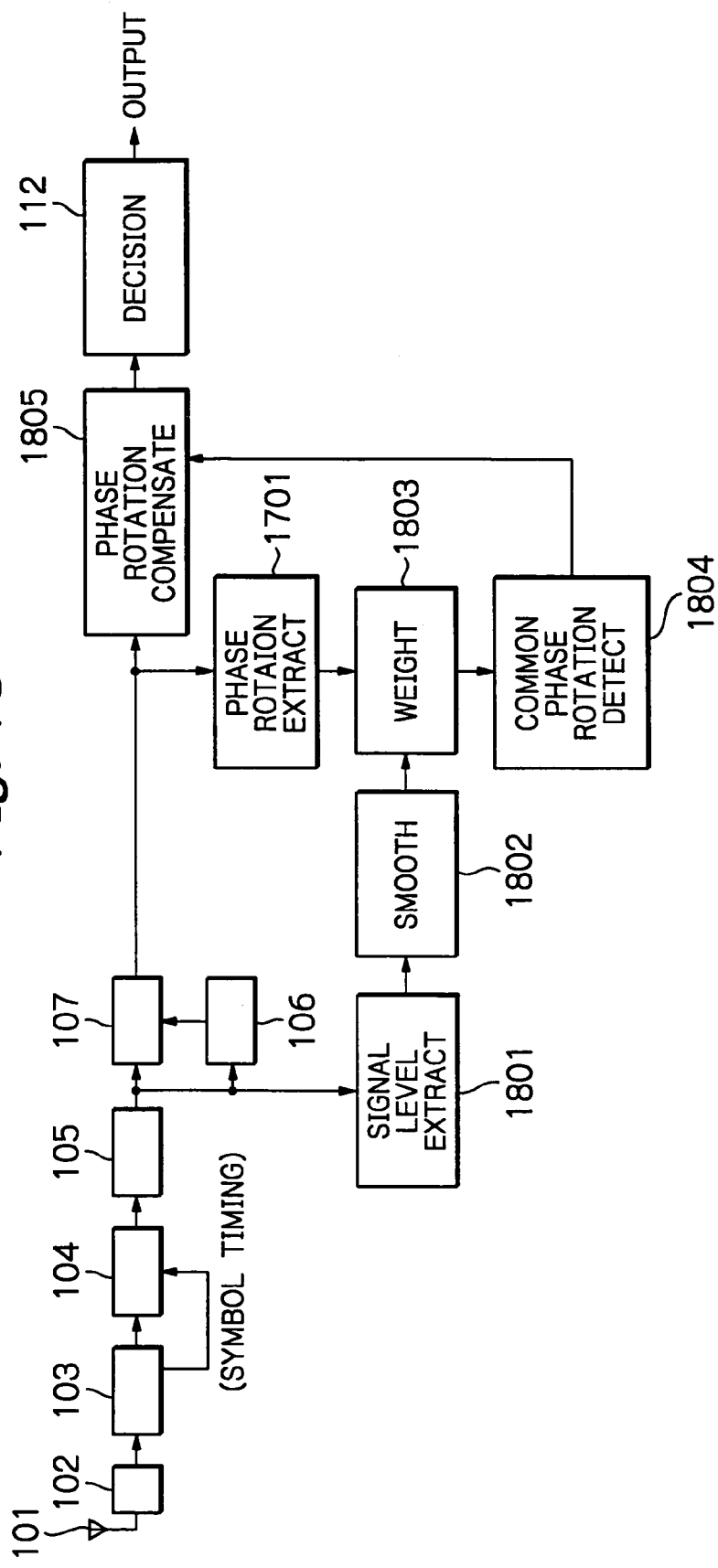
FIG. 18 is a block diagram of a eighteenth embodiment of an OFDM packet communication receiver.

FIG. 18 shows eighteenth embodiment, which is a modification of FIG. 1, and is directed to claim 18. The same numerals in FIG. 18 as those in FIG. 1 show the same members.

In FIG. 18, subcarrier signals provided by a Fourier transform circuit 105 are applied to a channel estimator 106, a coherent detection circuit 107, and a signal level detector 1801, which detects signal level from a part or all of the subcarriers. The detected signal level is provided for each OFDM symbol. An output of the signal level detector 1801 is applied to a signal level information smoothing circuit 1802.

When thermal noise is added to a received signal in receiving process in a receiving circuit 102, a subcarrier which is divided by the Fourier transform circuit 105 has amplitude error and phase error. As the signal level detector 1801 detects signal level of an output of the Fourier transform circuit 105, the detected signal level would have an error due to thermal noise if thermal noise is added to a received signal in the receiving circuit 102. Therefore, a signal level information smoothing circuit 1802 smoothes signal level information obtained from the signal level detector 1801 along time axis. The smoothing operation mitigate the effect of noise component caused by thermal noise and others included in detected signal level information, and thus, signal level information of each subcarrier can be detected accurately.

An output of the signal level information smoothing circuit 1802 is applied to a weighting circuit 1803. An output of a coherent detection circuit 107 is applied to a phase rotation information detector 1701 and a phase rotation compensator 1805. The phase rotation information detector 1701 detects phase rotation of an input signal from a reference signal which is shown in FIG. 45. The phase rotation information detected by the phase rotation information detector 1701 is applied to a weighting circuit 1803, which gives a weight to the phase rotation information according to the smoothed signal level information supplied by the signal level information smoothing circuit 1802. For instance, phase rotation information of a subcarrier which has high signal level is given large weight, and phase rotation information of a subcarrier which has low signal level is given small weight. For example, a weighted phase rotation information signal is obtained by generating a vector signal whose phase is equal to an input phase rotation and amplitude is equal to the smoothed signal level supplied by the signal level information smoothing circuit 1802. As the weighting circuit 1803 gives an weight to a phase rotation information according to the accurate signal level information, the highly accurate weighting process is carried out.

A weighted phase rotation information supplied by the weighting circuit 1803 is applied to a common phase rotation detector 1804. The phase rotation caused by carrier frequency error is uniform to all the detected signal components in an OFDM symbol as expressed by the equation (6). Further, the phase rotation caused by phase noise is also uniform to all the detected signal components in an OFDM symbol. Therefore, the common phase rotation detector 1804 detects the phase rotation common to the detected signals in the current OFDM symbol caused by residual carrier frequency error and phase noise in the detected signal supplied by the coherent detection circuit 107, or the accumulated phase rotation from the channel estimation until the current OFDM symbol. In other words, the common phase rotation detector 1804 provides the information of phase rotation caused by residual carrier frequency error and phase noise, of each detected signal supplied by the coherent detection circuit 107. An output of the common phase rotation detector 1804 is applied to a phase rotation compensator 1805.

The phase rotation compensator 1805 compensates phase rotation of an output of the coherent detection circuit 107 caused by residual carrier frequency error and phase noise according to an output of the common phase rotation detector 1804.

In the current embodiment, the accuracy of signal level information is improved with no increase of the number of preamble signals for channel estimation, and therefore, the phase rotation in the detected signal caused by residual carrier frequency error and phase noise can be compensated accurately without decreasing throughput of the system. Further, said phase rotation can be compensated accurately even when fluctuation of condition of transmission channels between adjacent subcarriers is large, because signal level information is obtained accurately due to disuse of moving average along frequency axis.

Nineteenth Embodiment

Figure 19:
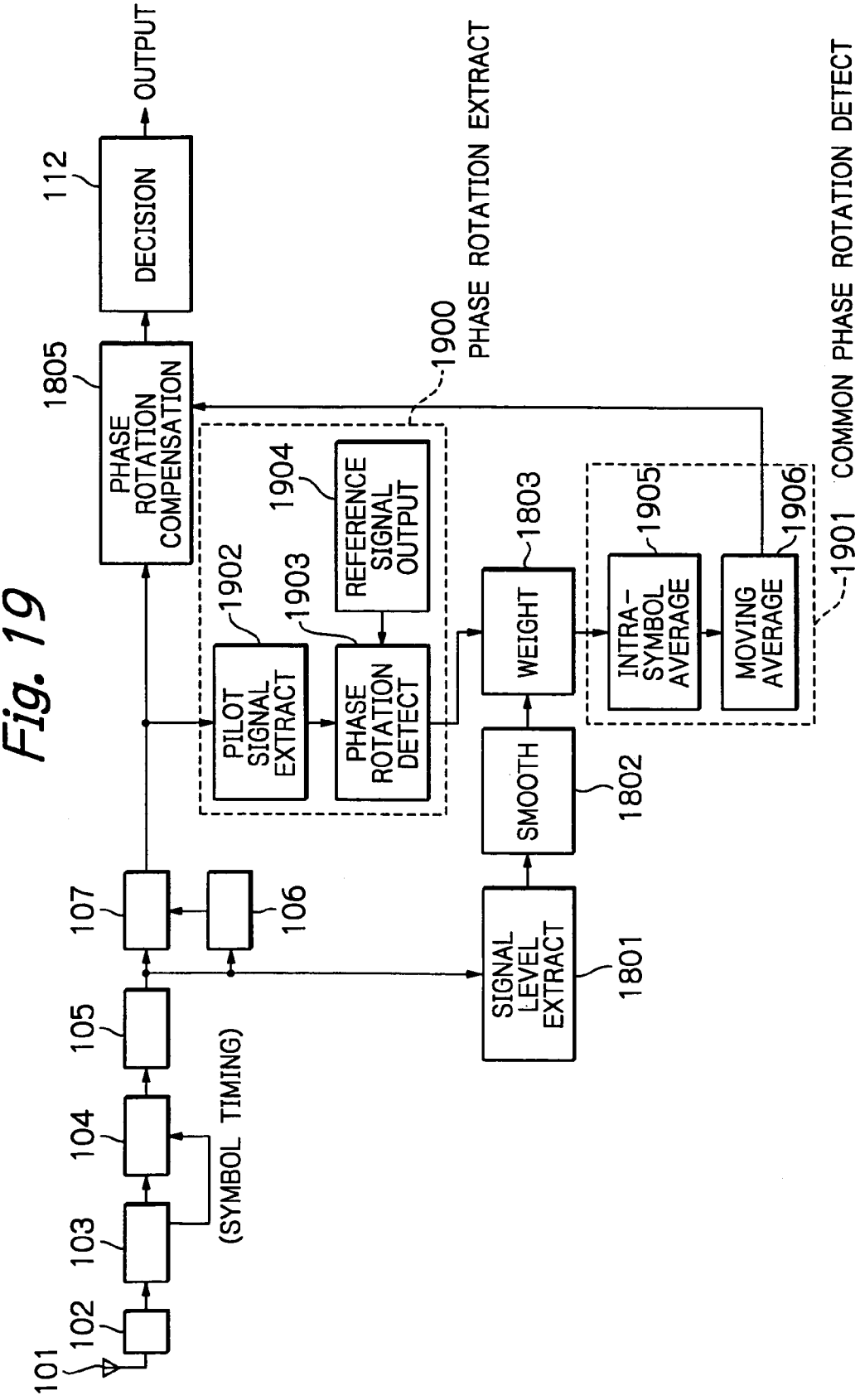
FIG. 19 is a block diagram of a nineteenth embodiment of an OFDM packet communication receiver.

FIG. 19 shows nineteenth embodiment, which is a modification of FIG. 18, and is directed to claims 19 and 20. The same numerals in FIG. 19 as those in FIG. 18 show the same members.

A phase rotation information detection block 1900 in FIG. 19 comprises a pilot signal extractor 1902, a phase rotation detector 1903 and a reference signal generator 1904. A common phase rotation detection block 1901 comprises an intra-symbol averaging circuit 1905, and a time-oriented moving average circuit 1906.

It is assumed in FIG. 19 that pilot signals which are known are transmitted by using a part of subcarriers in OFDM signals.

An output of a coherent detection circuit 107 is applied to a phase rotation compensator 1805, and a pilot signal extractor 1902, which extracts pilot signals from the detected signals. A pilot signal thus extracted is applied to a phase rotation detector 1903. A reference signal generator 1904 provides a reference signal (see FIG. 45) which relates to the pilot signal which is extracted by the pilot signal extractor 1902. As a pilot signal is a known signal, a reference signal is easily obtained. The reference signal provided by the reference signal generator 1904 is applied to the phase rotation detector 1903, which detects phase rotation of the pilot signal supplied by the pilot signal extractor 1902 according to the reference signal from the reference signal generator 1904.

As phase rotation of only pilot signals are detected, it is not required to discriminate a reference signal for the detected signal, signal processing for taking phase rotation information is simplified. Further, even when large noise is added to a coherently detected signal, reference signal of the detected signal is discriminated correctly, and therefore, phase rotation is detected accurately.

Phase rotation information provided by the phase rotation detector 1903 is applied to a weighting circuit 1803, which gives an weight to the phase rotation information according to the smoothed signal level information provided by the signal level information smoothing circuit 1802. As the weighting circuit 1803 gives a weight to the phase rotation information relating to a pilot signal, it should be noted that the signal level detector 1801 detects a signal level of the subcarrier signal which relates to a pilot signal among the subcarrier signals provided by the Fourier transform circuit 105. For example, a weighted phase rotation information signal is obtained by generating a vector signal whose phase is equal to an input phase rotation provided by the phase rotation detector and amplitude is equal to the smoothed signal level supplied by the signal level information smoothing circuit 1802. The weighted phase rotation information is applied to an intra-symbol averaging circuit 1905, which carries out averaging process of weighted phase rotation information of pilot signals for each OFDM symbol. When the weighted phase rotation information is expressed by a vector signal, the average of phase component of a vector signal is provided by taking vector sum of the vector signals relating to pilot signals in an OFDM symbol. The phase rotation of each subcarrier caused by phase noise and/or residual carrier frequency error is almost uniform for all subcarriers in an OFDM symbol. Therefore, by taking an average of phase rotation information of all pilot signals in an OFDM symbol, noise component in a signal is suppressed, and phase rotation information can be obtained accurately. The averaging process in the intra-symbol averaging circuit 1905 is carried out in one OFDM symbol, and thus, it corresponds to an averaging along frequency axis. The intra-symbol averaging circuit 1905 outputs the averaged and weighted phase rotation information of pilot signals in one OFDM symbol for each OFDM symbol.

An output of the intra-symbol averaging circuit 1905 is applied to a time-oriented moving average circuit 1906, which carries out moving average along time axis for a plurality of signals. The moving average process further suppresses noise component in a signal. An output of the time-oriented moving average circuit 1906 is applied to a phase rotation compensator 1805.

In the current embodiment, pilot signals which are known are transmitted by using a part of subcarriers in OFDM signals. Therefore, circuit structure of a common phase rotation detection block is simplified, because phase rotation caused by residual carrier frequency error and phase noise can be efficiently detected by using only a part of coherently detected signals relating only to pilot signals. Further, even when large noise component is added to a detected signal, reference signal relating to the detected signal can be discriminated correctly, and therefore, the phase rotation is detected accurately. Further, the weighted phase rotation information is averaged along frequency axis and time axis, the noise component in phase rotation information is effectively suppressed. Thus, the accurate compensation of phase rotation caused by residual carrier frequency error and phase noise is carried out with simple circuit structure, although it is impossible in a prior art.

Twentieth Embodiment

Figure 20:
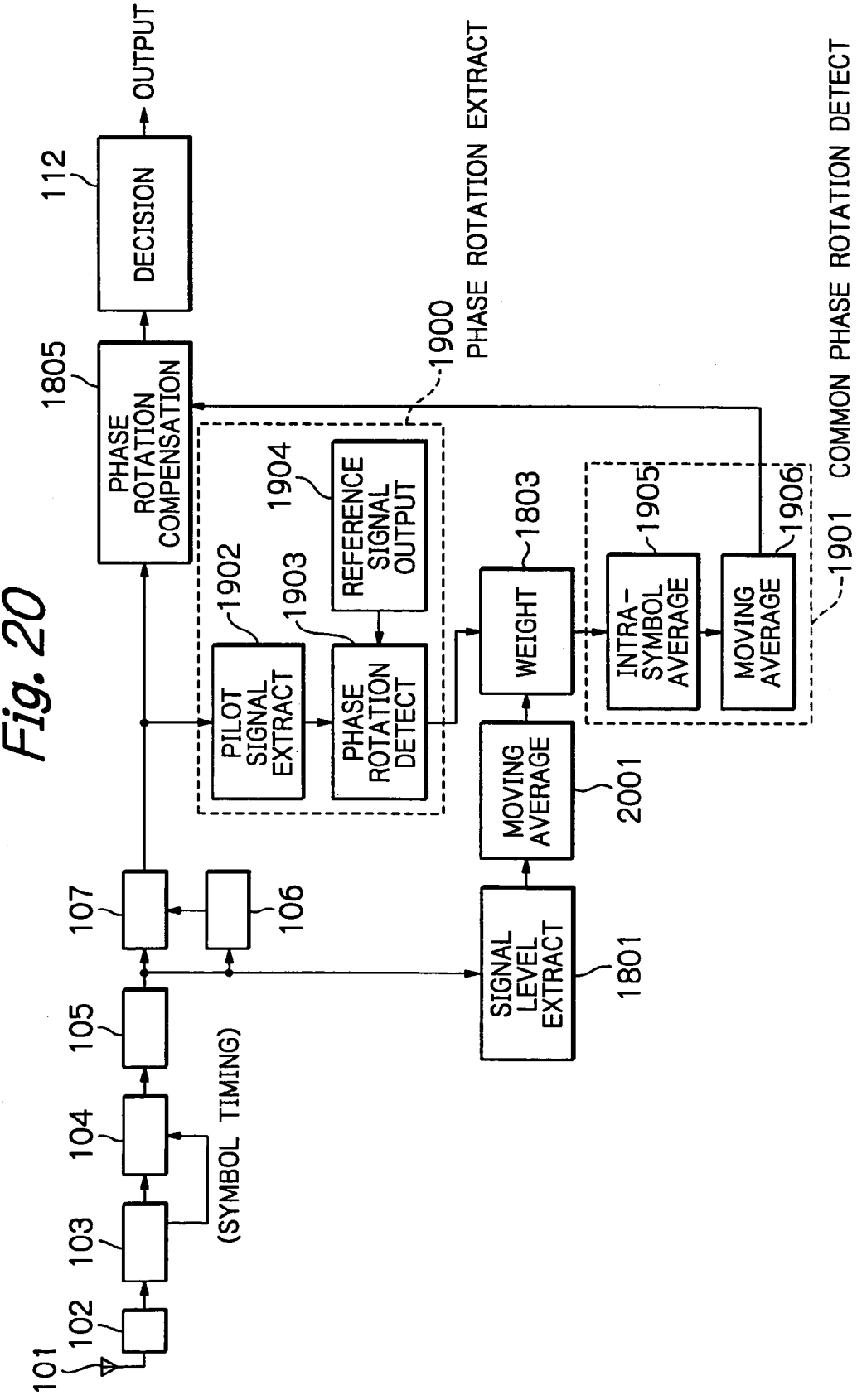
FIG. 20 is a block diagram of a twentith embodiment of an OFDM packet communication receiver.

FIG. 20 shows twentieth embodiment, which is a modification of FIG. 19, and is directed to claims 19, 20 and 29. The same numerals in FIG. 20 as those in FIG. 19 show the same members.

An OFDM packet communication receiver in FIG. 20 has a time-oriented moving average circuit 2001, instead of a signal level information smoothing circuit 1802 in FIG. 19. The time-oriented moving average circuit 2001 receives signal level information of the pilot signals in each OFDM symbol provided by a signal level detector 1801.

It is assumed in FIG. 20 that pilot signals which are known are transmitted by using a part of subcarriers in OFDM signals.

A time-oriented moving average circuit 2001 carries out moving average of signal level information of pilot signals along time axis. The moving average process realizes the smoothing process for the pilot signal level information provided by the signal level detector 1801. The signal level information which is moving averaged is applied to a weighting circuit 1803.

When the condition of a transmission channel fluctuates within a packet by fading, signal level of each subcarriers depends upon time location of a related OFDM symbol in a packet. Therefore, the moving average of signal level of each subcarrier over a plurality of OFDM symbols suppresses the effect of noise component, and makes it possible to detect signal level of each subcarrier following the fluctuation of channel characteristics within a packet. Thus, the current embodiment can compensate phase rotation with high accuracy, even under fluctuation of channel characteristics within a packet.

Twenty-First Embodiment

Figure 21:
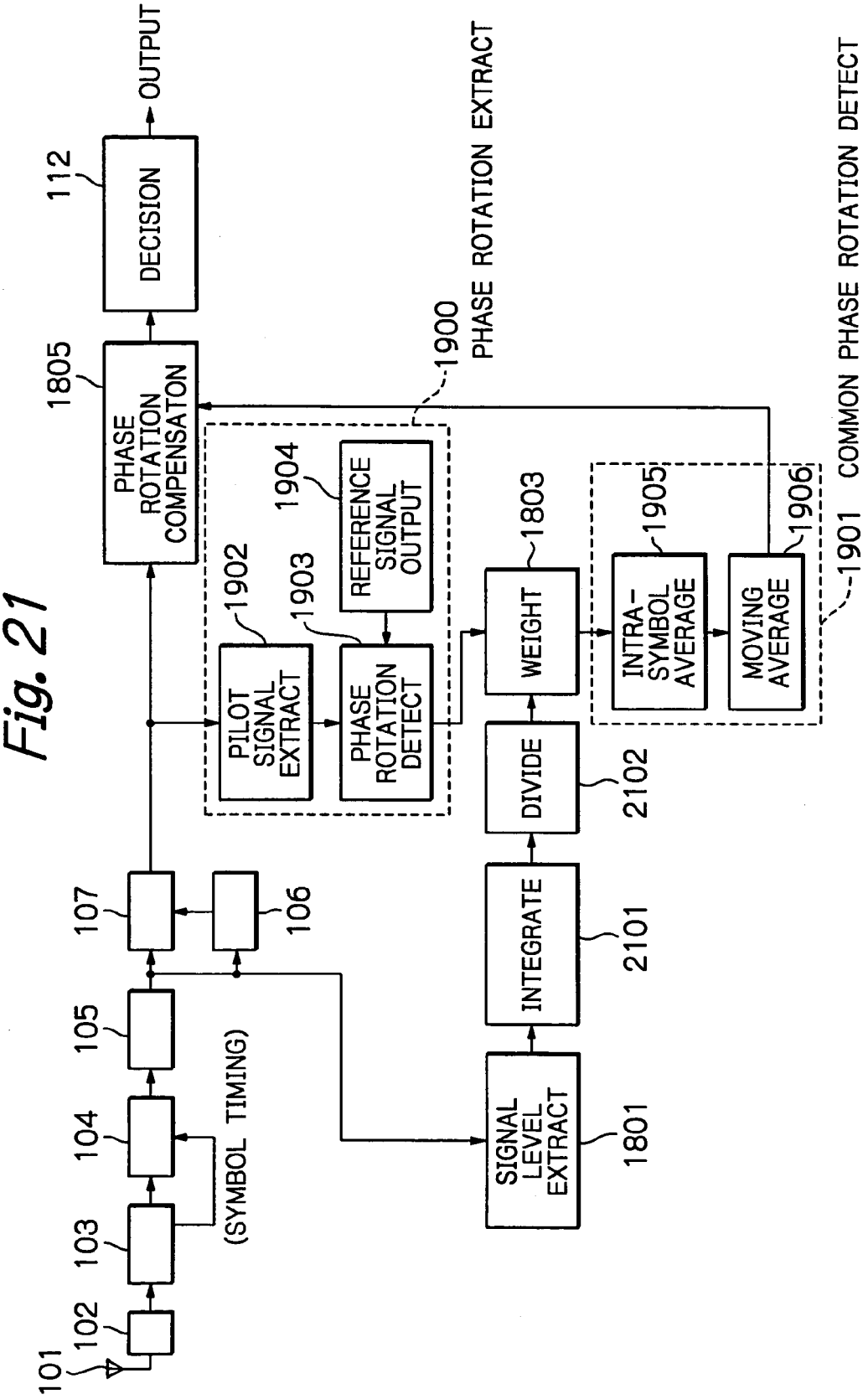
FIG. 21 is a block diagram of a twenty-first embodiment of an OFDM packet communication receiver.

FIG. 21 shows a twenty-first embodiment, which is a modification of FIG. 19, and is directed to claims 19, 20 and 30. The same numerals in FIG. 21 as those in FIG. 19 show the same members.

An OFDM packet communication receiver in FIG. 21 has an integration circuit 2101 and a division circuit 2102, instead of a signal level information smoothing circuit 1802 in FIG. 19. The integration circuit 2101 receives signal level information of the pilot signals in each OFDM symbol provided by the signal level detector 1801.

It is assumed in FIG. 21 that pilot signals which are known are transmitted by using a part of subcarriers in OFDM signals.

The integration circuit 2101 integrates signal level information of pilot signals provided by the signal level detector 1801 along time axis for each subcarrier. The integrated signal level information is applied to the division circuit 2102, which divides the integrated signal level information by the number of OFDM symbols which are integrated in the integrated circuit 2101, so that signal level information per one OFDM symbol is obtained. The signal level of each pilot signal for each OFDM symbol by using integration process can suppress thermal noise component, in particular, in a latter position in a packet. A signal level information of each pilot signal per one OFDM symbol provided by the division circuit 2102 is applied to a weighting circuit 1803.

When condition of transmission channel by fading hardly changes within a packet, signal level of each subcarrier can be obtained by integrating signal level of subcarrier for each subcarrier, and dividing the integrated value by the number of integration, i.e., the number of integrated OFDM symbols. In this case, since the number of OFDM symbols for integration becomes large at the latter position of a packet, the effect of smoothing, i.e., the effect of noise suppression, becomes large at the latter position of a packet. Thus, the effect of the thermal noise can be efficiently suppressed. Therefore, signal level information of each subcarrier can be detected with high accuracy. Therefore, the current embodiment is useful in the case where channel characteristics hardly changes within a packet.

Twenty-Second Embodiment

Figure 22:
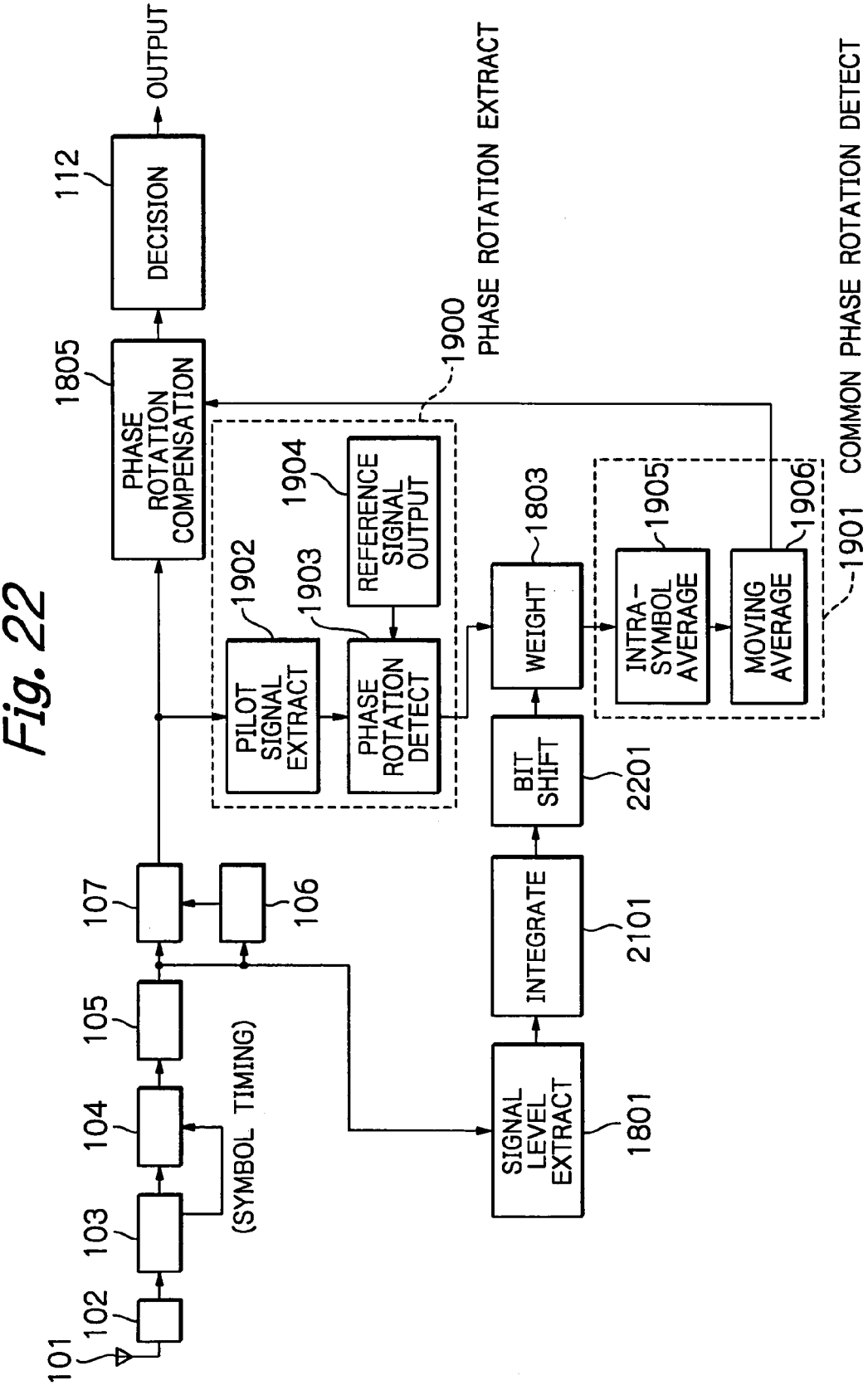
FIG. 22 is a block diagram of a twenty-second embodiment of an OFDM packet communication receiver.

FIG. 22 shows twenty-second embodiment, which is a modification of FIG. 21, and is directed to claims 19, 20 and 31. The same numerals in FIG. 22 as those in FIG. 21 show the same members.

An OFDM packet communication receiver in FIG. 22 has a bit shift circuit 2201, instead of a division circuit 2102 in FIG. 21. The bit shift circuit 2201 receives integrated signal level information of pilot signals provided by the integration circuit 2101.

It is assumed in FIG. 22 that pilot signals which are known are transmitted by using a part of subcarriers in OFDM signals.

When the number of OFDM symbols for integration process in the integration circuit 2101 is expressed by $2^N$ (N is an integer), the bit shift circuit 2201 carries out the bit shift operation of N bits of the integrated signal level information of the pilot signals provided by the integration circuit 2101 so that signal level per one OFDM symbol is obtained. The bit shift operation of N bits is the same as the division by N. The bit shift operation is carried out only when the number of OFDM symbols in the integration circuit 2101 is $2^N$ (N is an integer), and updates an output of the bit shift circuit 2201. When the number of OFDM symbols is not expressed by $2^N$, an output of the bit shift circuit 2201 keeps the value of the previous bit shift operation. When the number of OFDM symbols is one, the bit shift circuit 2201 provides an input signal as it is.

With the above process, the bit shift circuit 2201 updates an output frequently in a former position of a packet, and updates an output less in a latter position of a packet. It should be noted that since signal level information of a pilot signal per one OFDM symbol is obtained by using an integrated signal level information of pilot signals, thermal noise component is effectively suppressed in a latter position in a packet, therefore, the performance is not deteriorated even if the bit shift circuit 2201 updates less in a latter position of a packet. As a circuit for bit shift operation is generally small, the current embodiment extremely simplifies circuit structure. A signal level information of a pilot signal per one OFDM symbol obtained by the bit shift circuit 2201 is applied to a weighting circuit 1803.

When condition of transmission channel by fading hardly changes within a packet, signal level of each subcarrier can be obtained by integrating signal level of subcarrier for each subcarrier, and dividing the integrated value by the number of integration, i.e., the number of integrated OFDM symbols. In this case, since the number of OFDM symbols for integration becomes large at the latter position of a packet, the effect of smoothing, i.e., the effect of noise suppression, becomes large at the latter position of a packet. Thus, the effect of the thermal noise can be efficiently suppressed. Therefore, signal level information of each subcarrier can be detected with high accuracy. Further, as the division for obtaining signal level per one OFDM symbol is realized by bit shift operation, circuit structure is simplified. Further, as the bit shift operation is carried out only when the number of OFDM symbols for integration operation reaches $2^N$ (N is an integer), bit shift operation is not required for every OFDM symbols, and operation is less in a latter position in a packet, the power consumption is greatly reduced. Thus, the current embodiment provides phase rotation compensation accurately with simple circuit structure and small power consumption, when channel characteristics in a packet hardly changes within a packet.

Twenty-Third Embodiment

Figure 23:
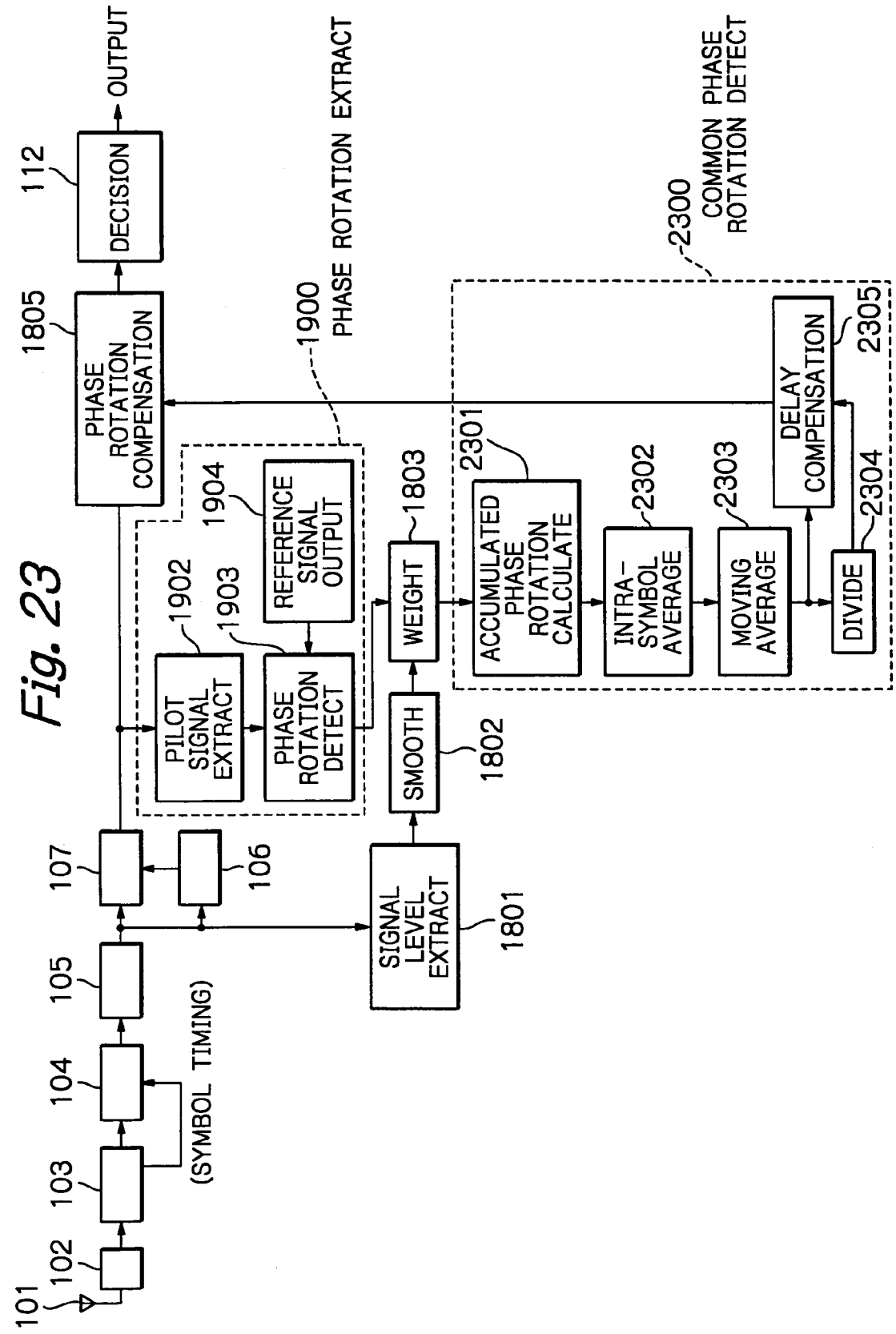
FIG. 23 is a block diagram of a twenty-third embodiment of an OFDM packet communication receiver.

FIG. 23 shows twenty-third embodiment, which is a modification of FIG. 19, and is directed to claims 18 and 38. The same numerals in FIG. 23 as those in FIG. 19 show the same members.

A common phase rotation detection block 2300 in FIG. 23 comprises an phase rotation accumulator 2301, an intra-symbol averaging circuit 2302, a time-oriented moving average circuit 2303, a division circuit 2304, and a delay compensator 2305.

It is assumed in FIG. 23 that pilot signals which are known are transmitted by using a part of subcarriers in OFDM signals.

A weighted phase rotation information of pilot signals provided by the weighting circuit 1803 are applied to an phase rotation accumulator 2301, which calculates accumulated phase rotation of pilot signals caused by phase noise and residual carrier frequency error from channel estimation until the current pilot signals. For instance, the accumulated phase rotation can be calculated by integrating the difference between the weighted phase rotation of the pilot signal when the relating OFDM symbol is processed, and that when the just previous OFDM symbol is processed, for each OFDM symbol. The accumulated phase rotation information thus calculated caused by phase noise and residual carrier frequency error is output by the accumulated phase rotation calculator 2301, and is applied to the intra-symbol averaging circuit 2302.

The intra-symbol averaging circuit 2302 carries out averaging process of accumulated phase rotation of pilot signals in one OFDM symbol. In the embodiment mentioned above, the vector signal relating to each pilot signal in an OFDM symbol is processed by vector-sum. The phase rotation of each subcarrier caused by phase noise and residual carrier frequency error is uniform for each subcarrier in one OFDM symbol. Therefore, the accumulated value is also uniform for each subcarrier in one OFDM symbol. Therefore, the averaging process of accumulated phase rotation of pilot signals in one OFDM symbol provides the accurate accumulated phase rotation of subcarrier signals cause by phase noise and residual carrier frequency error. The averaging process is carried out in one OFDM symbol, and therefore, it is averaging process along frequency axis. The intra-symbol averaging circuit 2302 outputs the accumulated weighted phase rotation information of pilot signals averaged in one OFDM symbol for each OFDM symbol. An output of the intra-symbol averaging circuit 2302 is applied to the time-oriented moving average circuit 2303.

The time-oriented moving average circuit 2303 carries out moving average of accumulated phase rotation averaged in one OFDM symbol, along time axis for a plurality of symbols. The averaging process along time axis reduces the degradation of a signal caused by thermal noise and others in the receiving circuit 102. An output of the time-oriented moving average circuit 2303 is applied to a division circuit 2303 and a delay compensator 2305.

The division circuit 2304 divides the accumulated phase rotation averaged along time axis by the difference between the number of OFDM symbols used for accumulation process in the phase rotation accumulator 2301 and the number relating to a delay in the moving average in the time-oriented moving average circuit 2303. For instance, if the number of OFDM symbols used for accumulated phase rotation calculation is 10, and the time-oriented moving average circuit 2303 carries out the moving average of 3 OFDM symbols, the moving average process of 3 OFDM symbols generates a delay of one OFDM symbol duration, therefore, the division circuit 2304 divides a dividend by 9. As accumulated phase rotation caused by phase noise becomes almost zero, thus, the division process provides phase rotation per one OFDM symbol caused by residual carrier frequency error. Thus, by calculating the phase rotation of pilot signals per one OFDM symbol by using the accumulated phase rotation information of each pilot signal, thermal noise and phase noise are suppressed finely at the latter position of a packet. The division circuit 2304 provides phase rotation information per one OFDM symbol caused by residual carrier frequency error. An output of the division circuit 2304 is applied to a delay compensator 2305.

The delay compensator 2305 compensates the effect of a delay caused by moving average included in the moving averaged accumulated phase rotation information by using said phase rotation information per one OFDM symbol caused by residual carrier frequency error, and provides accumulated phase rotation included in each subcarrier in the relating OFDM symbol caused by residual carrier frequency error and phase noise. The delay compensator 2305 provides the accumulated phase rotation which is free from the effect of said delay. An output of the delay compensator 2305 is applied to a phase compensation circuit 1805.

The phase compensation circuit 1805 compensates phase rotation caused by residual carrier frequency error and phase noise in a coherently detected signal provided by the coherent detection circuit 107 by using delay compensated accumulated phase rotation information provided by the delay compensator 2305. In the embodiment, highly accurate phase rotation compensation is achieved by using accumulated phase rotation information of each coherently detected signal caused by residual carrier frequency error and phase noise which is obtained by using the phase rotation information weighted according to accurate signal level information.

Further, as accumulated phase rotation is averaged along frequency axis and time axis, noise component is efficiently suppressed. Therefore, even when thermal noise is added to a signal in receiving process, accumulated phase rotation caused by residual carrier frequency error and phase noise is finely detected.

Further, the accumulated phase rotation is divided by the number of OFDM symbols used for the accumulation, so that phase rotation per one OFDM symbol caused by residual carrier frequency error is calculated accurately, and removing the effect of the delay relating to averaging process of the accumulated phase rotation along time axis according to said phase rotation information per one OFDM symbol. Thus, accumulated phase rotation caused by residual carrier frequency error and phase noise is further accurately detected. Thus, the accurate compensation of phase rotation caused by residual carrier frequency error and phase noise is carried out, although it is impossible in a prior art.

Twenty-Fourth Embodiment

Figure 24:
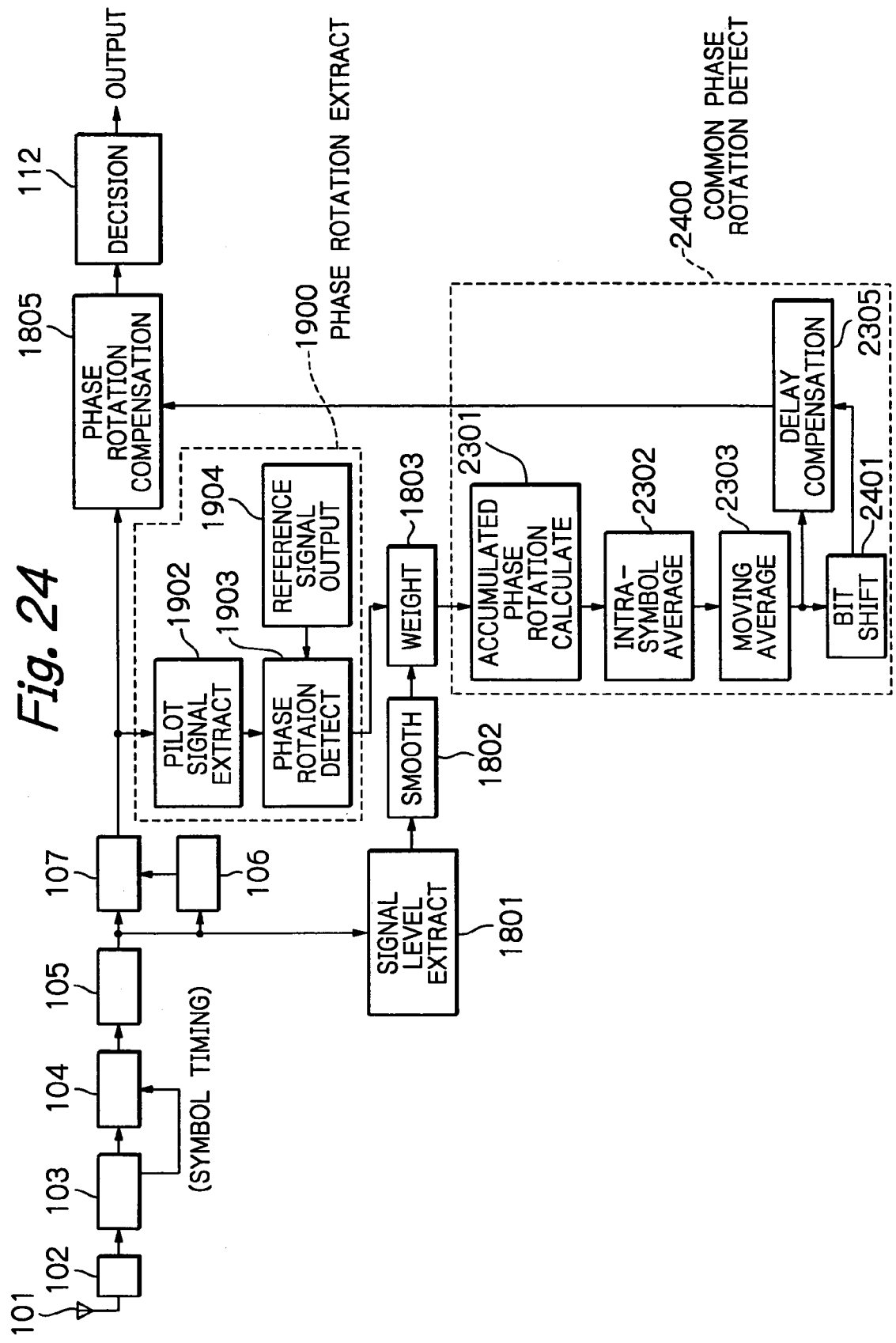
FIG. 24 is a block diagram of a twenty-fourth embodiment of an OFDM packet communication receiver.

FIG. 24 shows twenty-fourth embodiment, which is a modification of FIG. 23, and is directed to claims 18, 38 and 39. The same numerals in FIG. 24 as those in FIG. 23 show the same members.

An OFDM packet communication receiver in FIG. 24 comprises a bit shift circuit 2401, instead of a division circuit 2304 in FIG. 23. The bit shift circuit 2401 receives moving averaged accumulated phase rotation information from a time-oriented moving average circuit 2303.

It is assumed in FIG. 24 that pilot signals which are known are transmitted by using a part of subcarriers in OFDM signals.

The bit shift circuit 2401 carries out an N-bit shift (which is equivalent to division by $2^N$) of moving averaged accumulated phase rotation information provided by a time-oriented moving average circuit 2303, when moving averaged accumulated phase rotation is accumulated for $2^N$ (N is a natural integer) number of OFDM symbols, so that phase rotation of each pilot signal per one OFDM symbol is obtained. The bit shift operation is carried out only when an output of the time-oriented moving average circuit 2303 is accumulated for $2^N$ number of OFDM symbols, and updates an output of the bit shift circuit 2401. When an output of the time-oriented moving average circuit 2303 is not for $2^N$ number of OFDM symbols, a result of a previous bit shift operation is provided. When an output of the time-oriented moving average circuit 2303 is for one OFDM symbol, the bit shift circuit 2401 provides an input signal as it is.

With the above operation, an output of the bit shift circuit 2401 is updated frequently in the former position of a packet, and is updated less in the latter position of a packet. However, in the latter position of a packet, thermal noise component and phase noise component are removed efficiently, by calculating phase rotation information of each pilot signal per one OFDM symbol by using accumulated phase rotation information of each pilot signal. Therefore, the performance is not degraded even if update is less carried out in the latter position of a packet. As a circuit for bit shift operation is generally small, the total circuit structure is extremely simplified. An output of the bit shift circuit 2401, averaged phase rotation information of a pilot signal per one OFDM symbol, is applied to a delay compensator 2305.

The current embodiment provides highly accurate compensation for phase rotation caused by residual carrier frequency error and phase rotation, which is impossible in a prior art, with simple circuit structure.

Twenty-Fifth Embodiment

Figure 25:
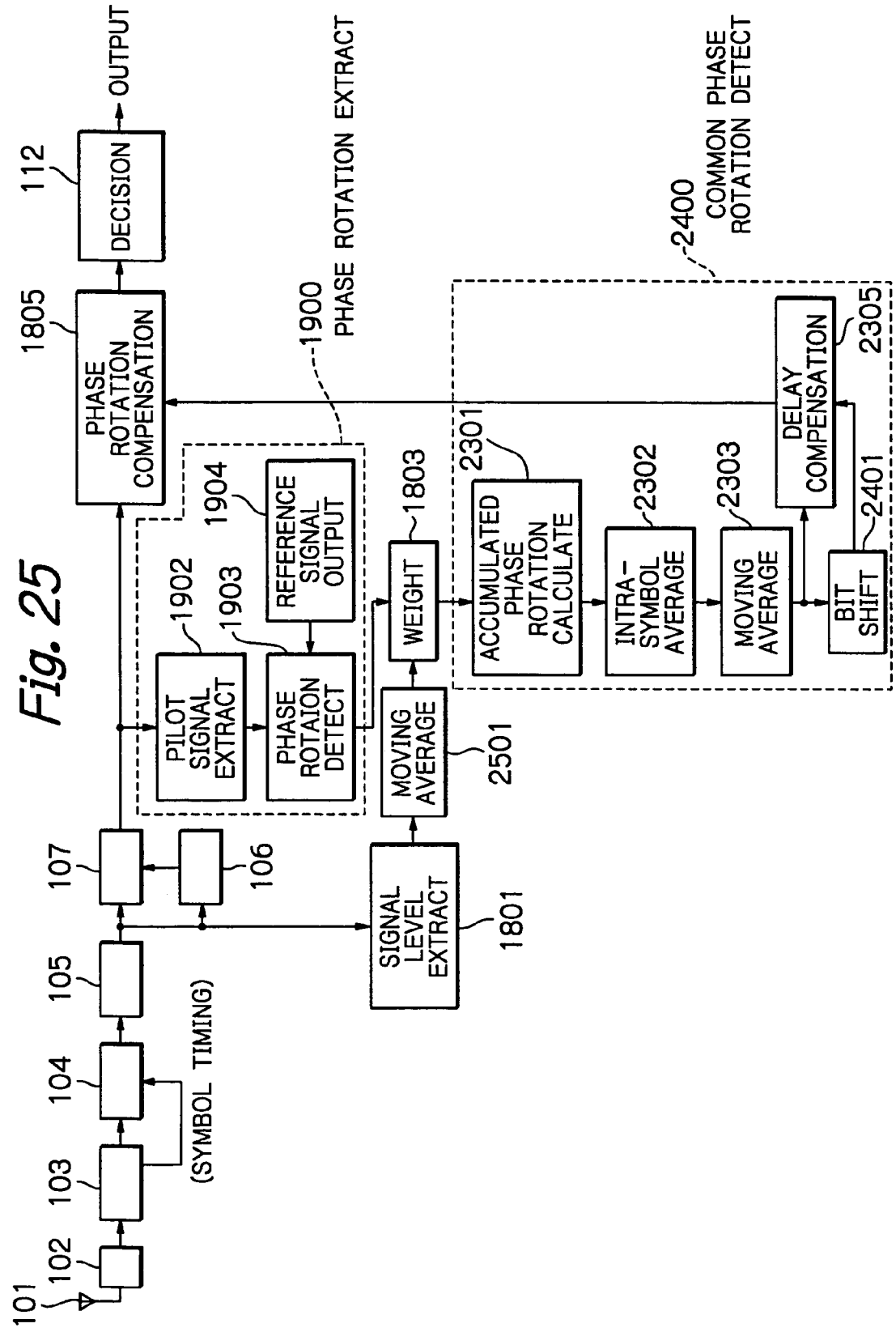
FIG. 25 is a block diagram of a twenty-fifth embodiment of an OFDM packet communication receiver.

FIG. 25 shows twenty-fifth embodiment, which is a modification of FIG. 24, and is directed to claims 18, 29, 38 and 39. The same numerals in FIG. 25 as those in FIG. 24 show the same members.

An OFDM packet communication receiver in FIG. 25 has a time-oriented moving average circuit 2501, instead of a signal level information smoothing circuit 1802 in FIG. 24. The time-oriented moving average circuit 2501 receives a signal level information of each pilot signal for each OFDM symbol supplied by the signal level detector 1801.

It is assumed in FIG. 25 that pilot signals which are known are transmitted by using a part of subcarriers in OFDM signals.

A time-oriented moving average circuit 2501 carries out the moving average of signal level information of each pilot signal along time axis. The moving average process provides the smoothing of signal level information of each pilot signal provided by the signal level detector 1801. The moving averaged signal level information is applied to a weighting circuit 1803.

When condition of transmission channel fluctuates in a packet by fading, the signal level of each subcarrier depends upon the location of the OFDM symbol including the subcarrier in a packet, therefore, the signal level information of subcarriers in a plurality of OFDM symbols is averaged, or moving averaged for each subcarrier, so that noise component is suppressed, and signal level of each subcarrier can be detected following the fluctuation of channel characteristics in a packet. Thus, even when channel characteristics fluctuate in a packet, the current embodiment provides highly accurate compensation of phase rotation caused by residual carrier frequency error and phase noise with simple circuit structure. That compensation is impossible in a prior art.

Twenty-Sixth Embodiment

Figure 26:
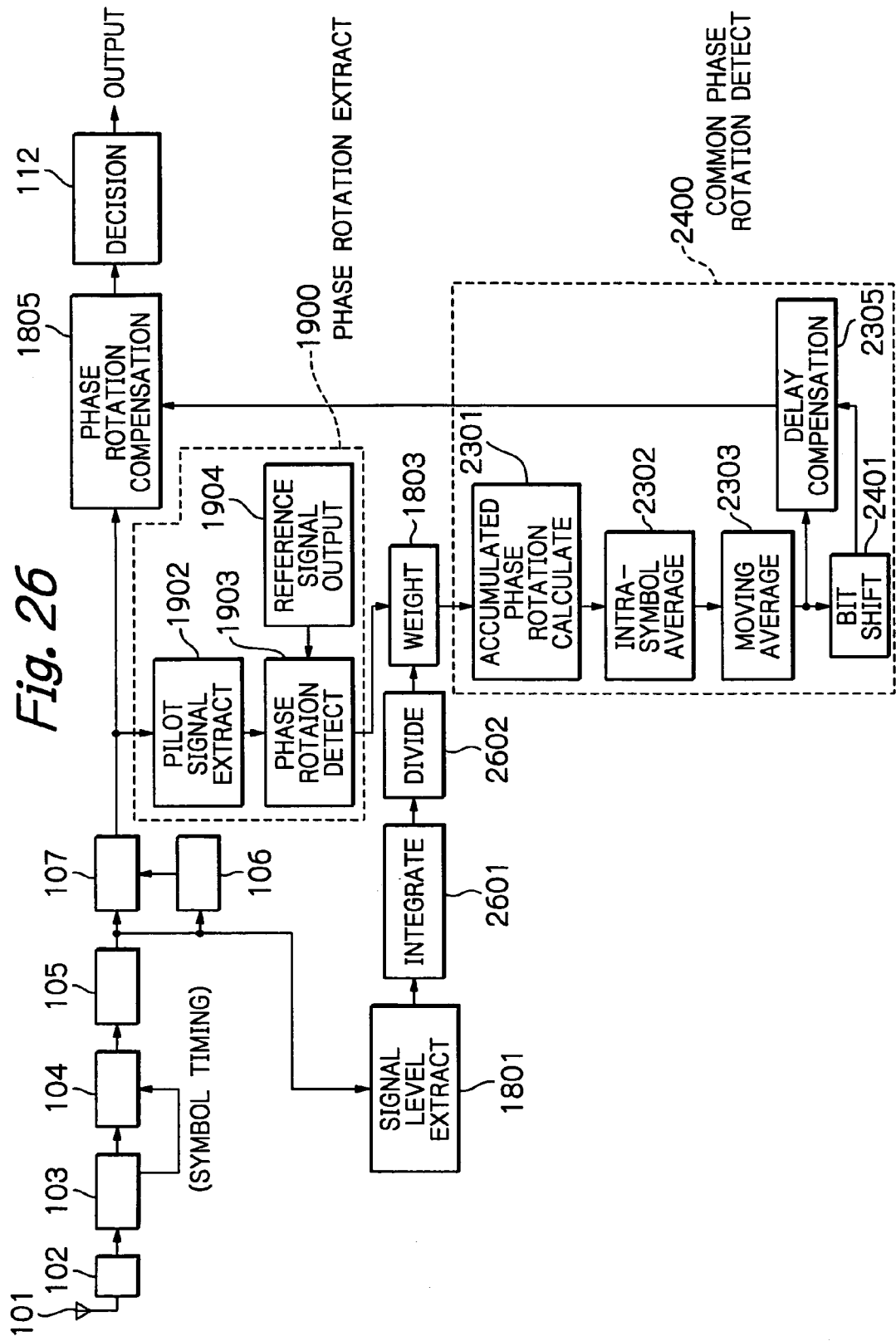
FIG. 26 is a block diagram of a twenty-sixth embodiment of an OFDM packet communication receiver.

FIG. 26 shows twenty-sixth embodiment, which is a modification of FIG. 24, and is directed to claims 18, 30, 38 and 39. The same numerals in FIG. 26 as those in FIG. 24 show the same members.

An OFDM packet communication receiver in FIG. 26 has an integration circuit 2601 and a division circuit 2602, instead of a signal level information smoothing circuit 1802 in FIG. 24. The integration circuit 2601 receives signal level information of each pilot signal provided by the signal level detector 1801.

It is assumed in FIG. 26 that pilot signals which are known are transmitted by using a part of subcarriers in OFDM signals.

The integration circuit 2601 integrates signal level information of pilot signals provided by the signal level detector 1801 along time axis for each subcarrier. The integrated signal level information of a pilot signal is applied to the division circuit 2602, which divides the integrated signal level information of pilot signals by the number of OFDM symbols for the integration, so that a signal level information per one OFDM symbol is obtained. As the signal level information of a pilot signal per one OFDM symbol is thus calculated by using the integrated signal level information of pilot signals, the effect of thermal noise is effectively suppressed in the latter part of a packet. The signal level information per one OFDM symbol provided by the division circuit 2602 is applied to a weighting circuit 1803.

When the condition of transmission channel by fading hardly changes within a packet, signal level of each subcarrier can be obtained by integrating signal level of subcarrier and dividing the integrated signal level information by the number of integration, i.e., the number of integrated OFDM symbols. In this case, since the number of integrated OFDM symbols becomes large at the latter position of a packet, the effect of smoothing, t.e., the effect of noise suppression, becomes large at the latter position of a packet. Thus, the effect of the thermal noise can be efficiently suppressed. Therefore, signal level of each subcarrier is detected accurately.

Thus, in the current embodiment, when channel characteristics hardly changes within a packet, highly accurate compensation of phase rotation caused by residual carrier frequency error and phase noise, which is impossible in a prior art, can be obtained with simple circuit structure.

Twenty-Seventh Embodiment

Figure 27:
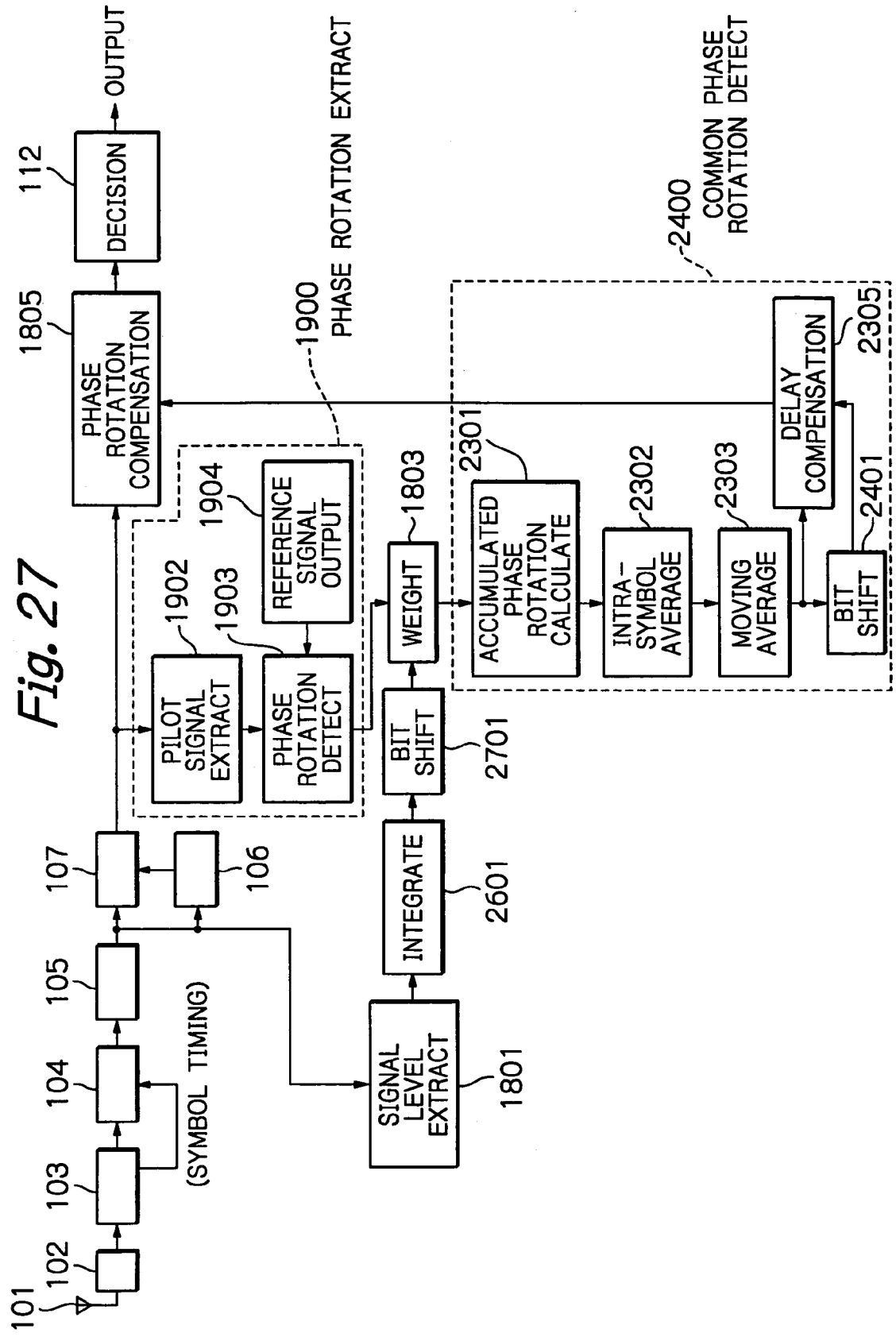
FIG. 27 is a block diagram of a twenty-seventh embodiment of an OFDM packet communication receiver.

FIG. 27 shows twenty-seventh embodiment, which is a modification of FIG. 26, and is directed to claims 18, 31, 38 and 39. The same numerals in FIG. 27 as those in FIG. 26 show the same members.

An OFDM packet communication receiver in FIG. 27 has a bit shift circuit 2701, instead of a division circuit 2602 in FIG. 26. The bit shift circuit 2701 receives an integrated signal level information from the integration circuit 2601.

It is assumed in FIG. 27 that pilot signals which are known are transmitted by using a part of subcarriers in OFDM signals.

When the number of OFDM symbols for integration process in the integration circuit 2601 is expressed by $2^N$ (N is an integer), the bit shift circuit 2701 carries out the bit shift operation of N bits of the integrated signal level information of the pilot signals provided by the integration circuit 2601 so that signal level per one OFDM symbol is obtained. The bit shift operation of N bits is the same as the division by N. The bit shift operation is carried out only when the number of OFDM symbols integrated in the integration circuit 2601 is expressed as $2^N$, and an output of the bit shift circuit 2701 is updated only when the bit shift operation is carried out. When the number of symbols is not expressed by $2^N$, an output of the previous bit shift operation is provided at the output of the bit shift circuit 2701. When the number of OFDM symbols is one, the bit shift circuit 2701 outputs an input signal as it is.

With the above operation, the output of the bit shift circuit 2701 is updated frequently at the former position of a packet, and updated less at the latter position of a packet. In this regard, thermal noise is suppressed effectively at the latter position of a packet when signal level of a pilot signal per one OFDM symbol is detected by using an integrated signal level, therefore, the total performance does not degrade even if the bit shift is updated less in the latter position of a packet. As a circuit structure for bit shift operation is generally small, the current embodiment extremely simplifies the circuit structure. A signal level information of a pilot signal per one OFDM symbol calculated by the bit shift circuit 2701 is applied to a weighting circuit 1803.

When the condition of transmission channel by fading hardly changes within a packet, signal level of each subcarrier can be obtained by integrating signal level of subcarrier for each subcarrier, and dividing the integrated value by the number of integration, i.e., the number of integrated OFDM symbols. In this case, since the number of OFDM symbols for integration becomes large at the latter position of a packet, the effect of smoothing, i.e., the effect of noise suppression, becomes large at the latter position of a packet. Thus, the effect of the thermal noise can be efficiently suppressed. Therefore, highly accurate signal level information of each subcarrier can be detected. Further, as the division for providing a signal level per one OFDM symbol is implemented by a bit shift circuit, a circuit structure can be simplified. Further, as the bit shift operation is carried out only when the number of integrated OFDM symbols is expressed by $2^N$, bit shift operation is not required for every OFDM symbols, and the number of bit shift operation is less in the latter position of a packet, thus, power consumption is extremely saved. Thus, when channel condition hardly changes within a packet, a highly accurate compensation of phase rotation caused by residual carrier frequency error and phase noise is achieved with a simple circuit structure, which is impossible in a prior art.

Twenty-Eighth Embodiment

Figure 28:
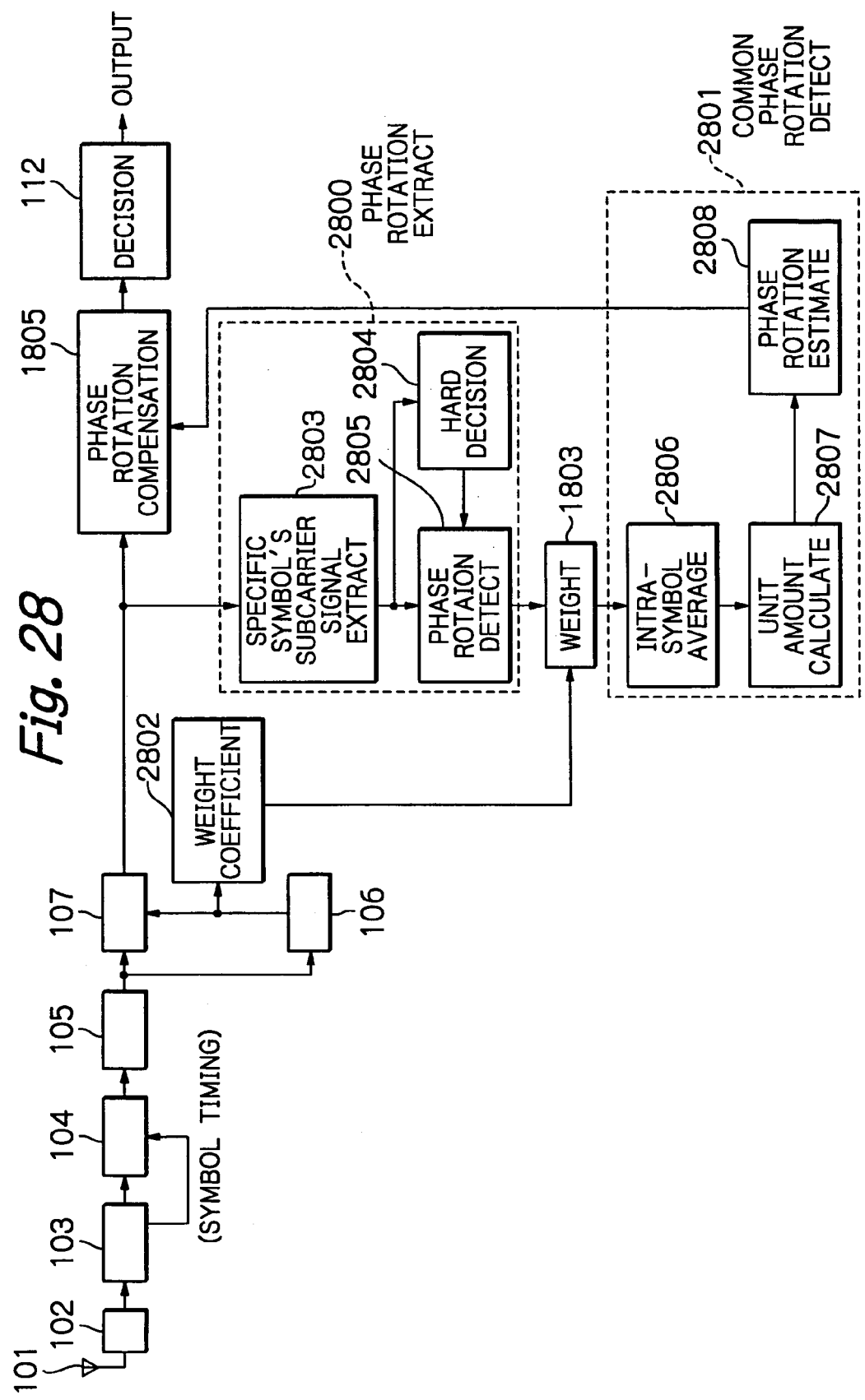
FIG. 28 is a block diagram of a twenty-eighth embodiment of an OFDM packet communication receiver.

FIG. 28 shows twenty-eighth embodiment, which is a modification of FIG. 18, and is directed to claims 18, 22, 40 and 41. The same numerals in FIG. 28 as those in FIG. 18 show the same members.

A phase rotation information detection block 2800 in FIG. 28 comprises a specific symbol's subcarrier signal extractor 2803, a hard decision circuit 2804, and a phase rotation detector 2805. A common phase rotation detection block 2801 comprises an intra-symbol averaging circuit 2806, a unit amount calculator 2807, and a phase rotation estimator 2808.

The channel estimation result provided by the channel estimator 106 is applied to a coherent detection circuit 107 and a weight coefficient calculator 2802, which calculates a weight coefficient for each subcarrier depending upon signal quality of each subcarrier according to channel estimation result provided by the channel estimator 106. For instance, received signal level of each subcarrier can be a measure of the signal quality of the subcarrier. The signal level of a received signal can be easily obtained by using channel estimation result of a subcarrier provided by the channel estimator 106. For instance, the received signal level can be obtained by calculating square of amplitude component of the channel estimation result of each subcarrier. The weight coefficient provided by the weight coefficient calculator 2802 is applied to a weighting circuit 1803.

An output of a coherent detection circuit 107 is applied to a phase compensation circuit 1805, and a specific symbol's subcarrier signal extractor 2803, which extracts all the coherently detected signals relating to the subcarriers included in the specific at least one OFDM symbol located close to a head of a packet. An output of the specific symbol's subcarrier signal extractor 2803 is applied to a hard decision circuit 2804 and a phase rotation detector 2805. The hard decision circuit 2804 carries out hard decision of coherently detected signal supplied by the specific symbol's subcarrier signal extractor 2803. The hard decision result is applied to the phase rotation detector 2805, which detects phase rotation of extracted subcarrier signals supplied by the specific symbol's subcarrier signal extractor 2803, caused by residual carrier frequency error, according to the hard decision result. When the extracted subcarrier signals are modulated by using BPSK modulation scheme, the signal after coherent detection locates at S0 or S1 in FIG. 46. However, when an output signal of the synchronization circuit 103 has phase rotation caused by residual carrier frequency error, a coherently detected signal has phase rotation proportional to residual carrier frequency error, an output (e.g., R0 or R1 in FIG. 46) of the coherent detection circuit 107 does not coincide with a reference signal S0 or S1 in FIG. 46. The phase rotation detector 2805 provides a phase rotation information or its equivalent signal of each extracted subcarrier signal. When the coherent detection circuit 107 outputs a signal R0 (see FIG. 46), the hard decision circuit 2804 outputs the reference signal S0 which is the closest to the signal R0, and the phase rotation detector 2805 detects and outputs the phase difference P0 between the reference signal S0 and the received signal R0. On the other hand, when the coherent detection circuit 107 outputs a signal R1 (see FIG. 46), the hard decision circuit 2804 outputs the reference signal S1 which is the closest to the signal R1, and the phase rotation detector 2805 detects and outputs the phase difference P1 between the reference signal S1 and the received signal R1. The phase rotation information provided by the phase rotation detector 2805 is applied to the weighting circuit 1803, which gives an weight to the phase rotation information provided by the phase rotation detector 2805 according to the weight coefficient of each subcarrier provided by the weight coefficient calculator 2802. The weighting operation functions to mitigate the effect of the use of phase rotation information which has low reliability caused by fading et al.

The weighted phase rotation information of a subcarrier is applied to an intra-symbol averaging circuit 2806, which carries out the averaging process of the weighted phase rotation information of all the subcarriers in the current OFDM symbol, so that the effect by thermal noise and others added at the receiving circuit 102 is suppressed, and the phase rotation common to all the subcarriers caused by residual carrier frequency error can be detected with high accuracy. An output of the intra-symbol averaging circuit 2806 is applied to a unit amount calculator 2807, which calculates phase rotation of a detected signal per one OFDM symbol caused by residual carrier frequency error according to the highly accurate phase rotation information provided by the intra-symbol averaging circuit 2806. This calculation can be simply implemented by dividing highly accurate phase rotation information provided by the intra-symbol averaging circuit 2806 by a quotient of time interval between a preamble signal for channel estimation (see FIG. 44) and the specific OFDM symbol, divided by the OFDM symbol duration.

An output of the unit amount calculator 2807 is applied to a phase rotation estimator 2808, which estimates phase rotation of each detected signal provided by the coherent detection circuit 107 according to the equation (6), by using an output of the unit amount calculator 2807. The estimation of the phase rotation can be easily implemented by the product operation of a quotient of time interval between a preamble signal for channel estimation (see FIG. 44) and the OFDM symbol which includes the current coherently detected signal, divided by time interval of the OFDM symbol duration, and the phase rotation per one OFDM symbol supplied by the unit amount calculator 2807. An output of the phase rotation estimator 2808 is applied to a phase compensator 1805, which compensates phase error caused by residual carrier frequency error of the detected signal provided by the coherent detection circuit 107 according to the estimated phase rotation information provided by the phase rotation estimator 2808.

Thus, when output signals of the synchronization means includes residual carrier frequency error, the detected signals of all the subcarriers in a specific OFDM symbol provided by the coherent detection circuit 107 are subject to phase rotation caused by residual carrier frequency error as shown in the equation (6), and the detected signal is located offset from a reference signal in a phase plane. Therefore, the residual carrier frequency error or the phase rotation per one OFDM symbol caused by residual carrier frequency error can be detected according to the equation (6) by detecting the phase rotation between a detected signal and a reference signal. As the detection is carried out by using the coherently detected signals of all the subcarriers in a specific OFDM symbol, highly accurate detection can be realized.

Further, a reference signal can be obtained by hard decision of a detected signal. If subcarriers in the specific OFDM symbol are modulated by using lower rate modulation scheme than other OFDM symbols (for instance the specific OFDM symbol is modulated by BPSK, and other symbols are modulated by 16QAM), the hard decision can be carried out accurately, because a signal modulated by using low rate modulation scheme is generally less affected by noise component than a signal modulated by using high rate modulation scheme. Thus, the residual carrier frequency error or the phase rotation per one OFDM symbol caused by residual carrier frequency error can be accurately detected.

Further, by using this detection result, the phase rotation of the detected signal in the OFDM symbols except for said specific OFDM symbol can be obtained according to the equation (6). Therefore, if said specific OFDM symbol is located close to the head of a packet, the phase rotation compensation of all coherently detected signals in a packet can be carried out with short process delay.

Further, under frequency-selective fading which frequently occurs in radio communication, communication quality of a certain subcarrier becomes different from that of the other subcarriers. Therefore, by giving large weight to a phase rotation information of the subcarrier with good communication quality, the effect by fading can be suppressed, and residual carrier frequency error can be accurately detected. Further, the smoothed phase rotation information of an OFDM symbol provides the mitigation of the effect of thermal noise and others, and improves the accuracy of residual carrier frequency error detection.

Thus, the current embodiment realizes highly accurate compensation of phase rotation caused by residual carrier frequency error with small process delay, which is impossible in a prior art.

Twenty-Ninth Embodiment

Figure 29:
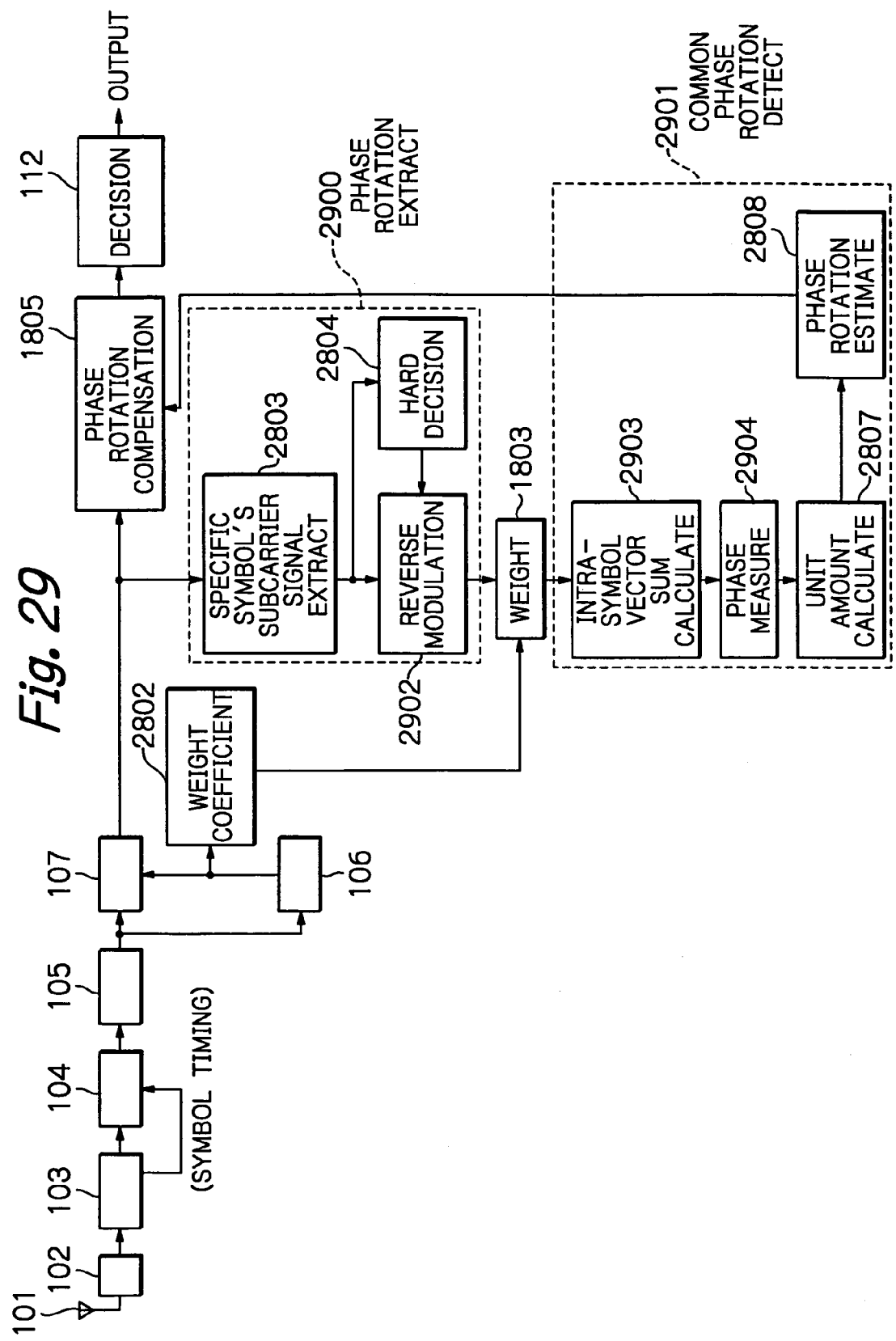
FIG. 29 is a block diagram of a twenty-ninth embodiment of an OFDM packet communication receiver.

FIG. 29 shows twenty-ninth embodiment, which is a modification of FIG. 28, and is directed to claims 18, 22, 23, 40, 41 and 42. The same numerals in FIG. 29 as those in FIG. 28 show the same members.

A phase rotation information detection block 2900 in FIG. 29 comprises a specific symbol's subcarrier signal extractor 2803, a hard decision circuit 2804, and a reverse modulator 2902. A common phase rotation detection block 2901 comprises an intra-symbol vector sum calculator 2903, a phase detector 2904, a unit amount calculator 2807 and a phase rotation estimator 2801.

An output of the specific symbol's subcarrier signal extractor 2803 is applied to a hard decision circuit 2804 and a reverse modulator 2902. The decision result provided by the hard decision circuit 2804 is applied to the reverse modulator 2902, which reversely modulate the detected signal extracted from said specific OFDM symbol on the baseband region, and outputs complex vector signal which is reversely modulated.

The reverse modulation removes signal component produced through modulation process in a transmitter, and therefore, the reversely modulated signal includes only phase component caused by phase rotation due to residual carrier frequency error, and thermal noise component and such like added to a signal in the receiving circuit 102.

The complex vector signal of each subcarrier thus reversely modulated is applied to a weighting circuit 1803, which gives an weight to the complex vector signal according to the weight coefficient supplied by the weight coefficient calculator 2802. The weighting operation can be, for instance, realized by exchanging amplitude component of the complex vector signal with the weight coefficient provided by the weight coefficient calculator 2802. This weighting operation suppresses the undesireable effect caused by using the unreliable phase rotation information due to fading and others.

An output of the weighting circuit 1803 is applied to an intra-symbol vector sum calculator 2903, which calculates the vector sum of all the weighted complex vector signals relating the current OFDM symbol. This vector sum operation provides the smoothed phase component of the complex vector signals, so that the undesirable effect of thermal noise and others added at the receiving circuit 102 is suppressed. In other words, phase component of the complex vector signal supplied by the intra-symbol vector sum calculator 2903 accurately indicates the phase rotation information which is common to all the subcarriers caused by residual carrier frequency error.

An output of the intra-symbol vector sum calculator 2903 is applied to a phase detector 2904, which detects phase component of an output of the intra-symbol vector sum calculator 2903. The phase component information detected by the phase detector 2904 is applied to a unit amount calculator 2807.

Thus, the current embodiment provides accurate compensation of phase rotation caused by residual carrier frequency error with small process delay, which is impossible in a prior art.

Thirtieth Embodiment

Figure 30:
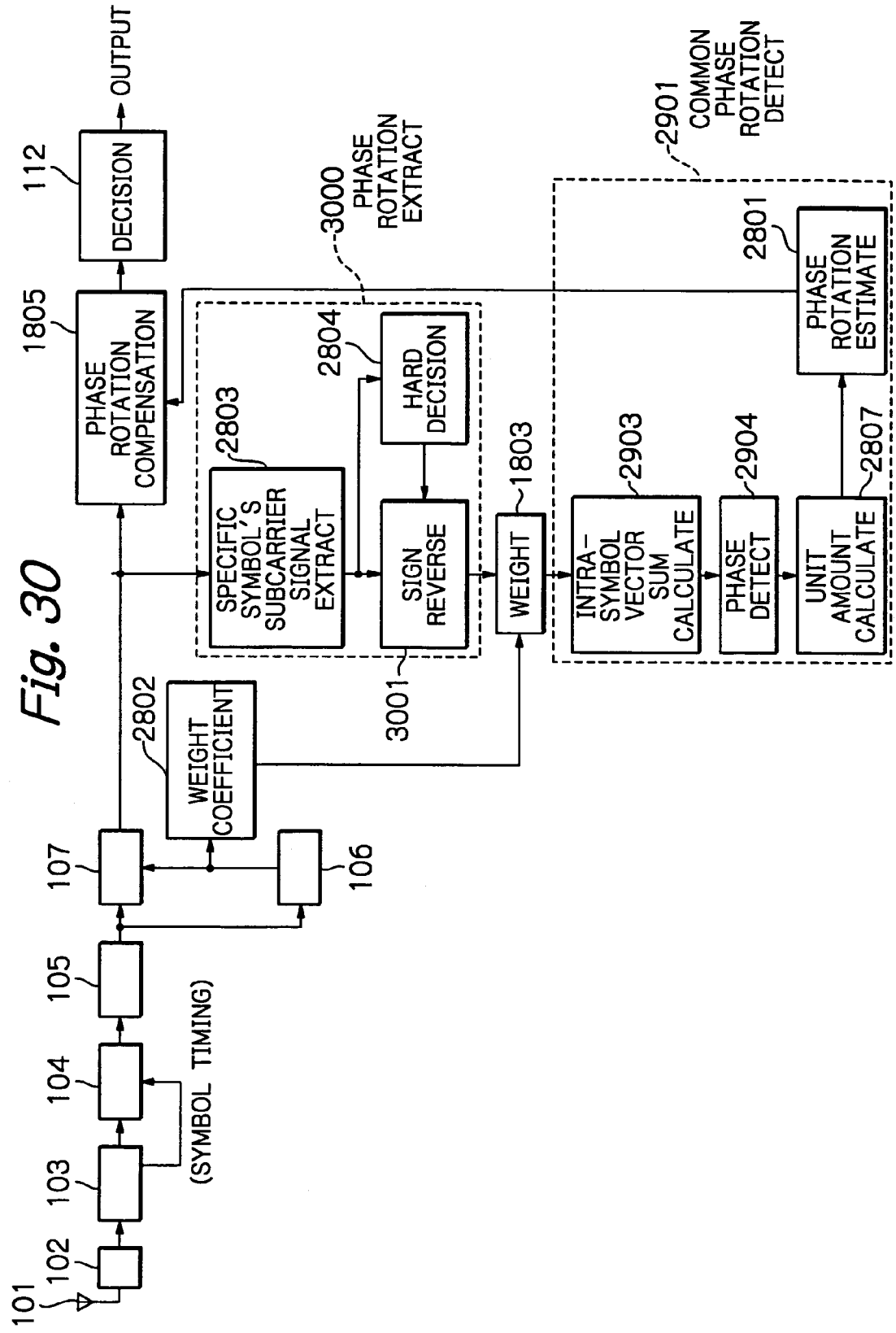
FIG. 30 is a block diagram of a thirtith embodiment of an OFDM packet communication receiver.

FIG. 30 shows thirtieth embodiment, which is a modification of FIG. 29, and is directed to claims 18, 22, 24, 40, 41 and 42. The same numerals in FIG. 30 as those in FIG. 29 show the same members.

In FIG. 30, a phase rotation information detection block 3000 comprises a specific symbol's subcarrier signal extractor 2803, a hard decision circuit 2804, and a sign controller 3001.

It is assumed in FIG. 30 that each subcarrier signal in at least one specific OFDM symbol used for detecting phase rotation caused by residual carrier frequency error is so modulated that transition from a reference signal point to another reference signal point is expressed merely by code inversion, such as BPSK or QPSK.

An output of the specific symbol's subcarrier signal extractor 2803 is applied to a hard decision circuit 2804 and a sign controller 3001, which realizes the reverse modulation operation of an input signal by code inversion. An output of the sign controller 3001 is applied to a weighting circuit 1803.

When a subcarrier is so modulated that transition from a reference signal point to another reference signal point is carried out merely by code inversion, such as BPSK or QPSK, reverse modulation can be realized by simple code inversion, therefore, reverse modulation means is simplified. Thus, the current embodiment provides accurate compensation for phase rotation caused by residual carrier frequency error with simple circuit structure and small process delay.

Thirty-First Embodiment

Figure 31:
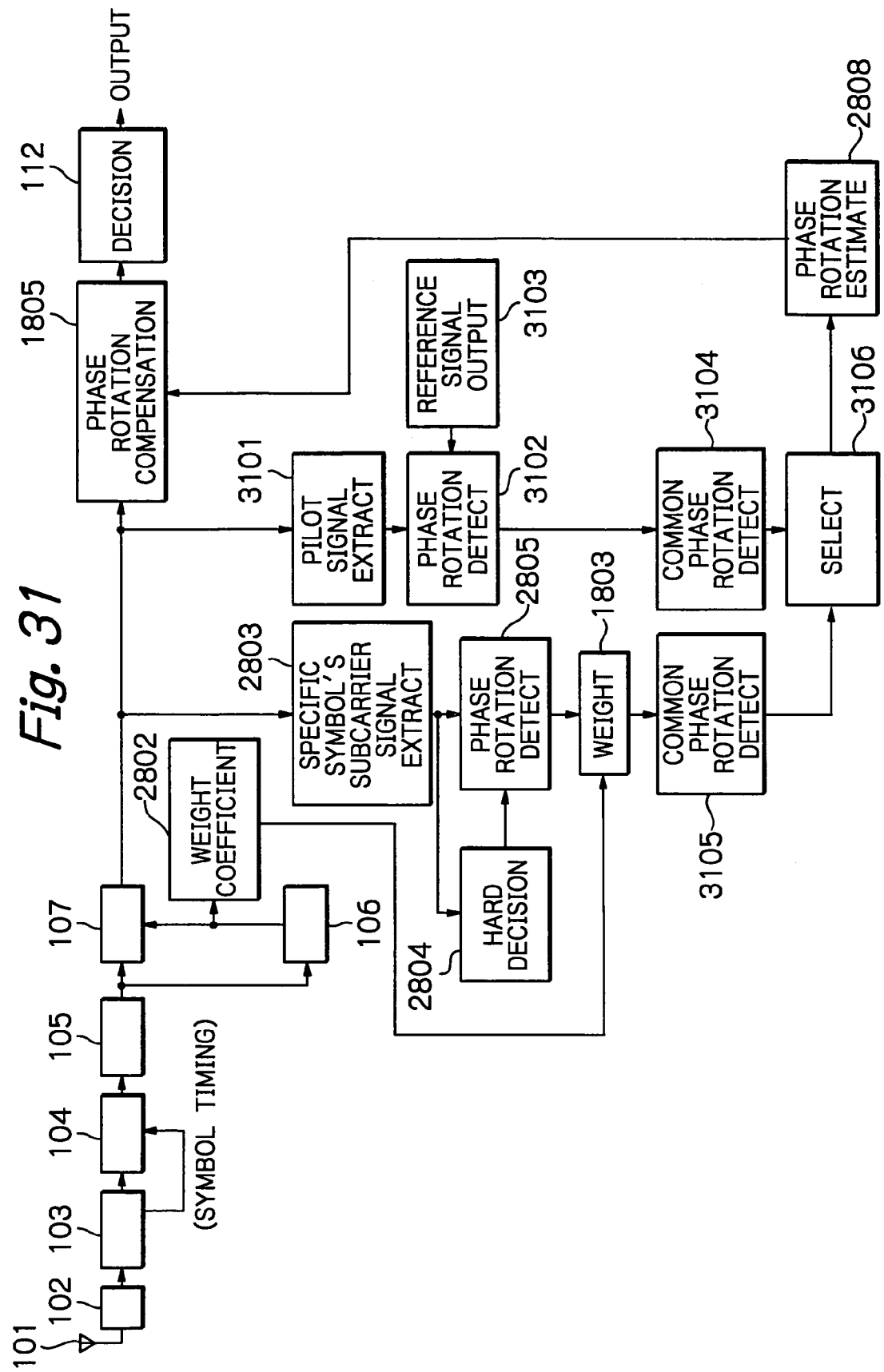
FIG. 31 is a block diagram of a thirty-first embodiment of an OFDM packet communication receiver.

FIG. 31 shows thirty-first embodiment, which is a modification of FIG. 28, and is directed to claim 26. The same numerals in FIG. 31 as those in FIG. 28 show the same members.

It is assumed in FIG. 31 that pilot signals which are known are transmitted by using a part of subcarriers in OFDM signals.

An output of a coherent detection circuit 107 is applied to a specific symbol's subcarrier signal extractor 2803, a phase rotation compensator 1805, and a pilot signal extractor 3101. The pilot signal extractor 3101 extracts pilot signals from the detected signals provided by the coherent detection circuit 107. An output of the pilot signal extractor 3101 is applied to a phase rotation detector 3102. The phase rotation detector 3102 also receives a reference signal from a reference signal generator 3103, which supplies a reference signal corresponding to the output pilot signal of the pilot signal extractor 3101. As a pilot signal is a known signal, a reference signal is easily obtained. The phase rotation detector 3102 detects phase rotation of the pilot signal according to the reference signal provided by the reference signal generator 3103. An output of the phase rotation detector 3102 is applied to a common phase rotation detector 3104, which detects phase rotation per one OFDM symbol common to all coherently detected signals, caused by residual carrier frequency error, and provides an output as residual carrier frequency error information, which is applied to a selector 3106.

On the other hand, the weighted phase rotation information provided by the weighted circuit 1803 is applied to a common phase rotation detector 3105, which detects phase rotation per one OFDM symbol caused by residual carrier frequency error, and outputs the detected phase rotation information as residual carrier frequency error information. The output of the common phase rotation detector 3105 is applied to the selector 3106.

The difference of residual carrier frequency error information between outputs of the common phase rotation detectors 3104 and 3105 is briefly described.

First input of the selector 3106 from the common phase rotation detector 3104 is detected from the coherently detected signal relating to a pilot signal, and second input of the selector 3106 from the common phase rotation detector 3105 is detected from the coherently detected signals included in the specific OFDM symbol. Naturally, the carrier frequency error information obtained by using more coherently detected signals is more accurate.

In the current embodiment, it is assumed that pilot signals are transmitted by using a part (plural) of subcarriers in OFDM signals, and therefore, the number of pilot signals increases with elapse of time or increase of the number of processed OFDM symbols, although the number of coherently detected signals included in the specific OFDM symbol is fixed. Assuming that an OFDM symbol includes 52 subcarriers, and 4 subcarriers among said 52 subcarriers are used to transmit pilot signals, and the number of said specific OFDM symbols is one, then, if the common phase rotation detector 3104 treats more than 52 pilot signals included in more than 13 OFDM symbols, the output residual carrier frequency error information of the common phase rotation detector 3104 becomes more accurate obviously than that of the common phase rotation detector 3105. However, if the common phase rotation detector 3104 treats less than 52 pilot signals, the more accurate information is obtained by the common phase rotation detector 3105.

The selector 3106 selects one of the input signals from the common phase rotation detector 3104 and common phase rotation detector 3105 so that the more accurate signal is selected. For instance, as mentioned above, the signal accuracy can be easily judged by the number of OFDM symbols processed at the coherent detection circuit 107. An output of the selector 3106 is applied to a phase rotation estimator 2808.

When output signals of the synchronization circuit 103 include residual carrier frequency error, detected signals of all the subcarriers in the specific OFDM symbol provided by the coherent detection circuit 107 have phase rotation common to all the subcarriers depending upon residual carrier frequency error as shown in the equation (6), and the detected signals are offset from the reference signals on the phase plane. Therefore, by detecting the difference between a coherently detected signal and a reference signal and calculating the phase rotation common to all the coherently detected signal in the OFDM symbol, the residual carrier frequency error or the phase rotation per one OFDM symbol caused by the residual carrier frequency error can be detected according to the equation (6). The accuracy of the detection is high, since all the subcarriers in the specific OFDM symbol are used for the detection.

Moreover, as described above, a reference signal can be obtained through hard decision of a detected signal. If subcarriers in the specific OFDM symbol are modulated by using lower rate modulation scheme than other OFDM symbols (for instance the specific OFDM symbol is modulated by BPSK, and other symbols are modulated by 16QAM), the hard decision can be carried out accurately, because a signal modulated by using low rate modulation scheme is generally less affected by noise component than a signal modulated by using high rate modulation scheme. Thus, residual carrier frequency error or phase rotation per one OFDM symbol caused by residual carrier frequency error can be accurately detected.

Further, by using the detection result, the phase rotation of the detected signals in other OFDM symbols can be easily obtained by using the equation (6), therefore, if the specific OFDM symbol locates nearby a head of a packet, phase rotation of each detected signal can be obtained from nearby the head of a packet with small process delay.

Further, under frequency selective fading which frequently occurs in radio communication, communication quality of a certain subcarrier becomes different from that of the other subcarriers. Therefore, by giving large weight to a phase rotation information of the subcarrier with good communication quality, the effect by fading can be suppressed, and residual carrier frequency error can be accurately detected.

However, if phase rotation caused by residual carrier frequency error is detected by using only the signals in the specific OFDM symbol, high detection accuracy beyond a certain accuracy level can not be obtained. When phase rotation is detected not only by using the signals in the specific OFDM symbol, but also enough large number of pilot signals in OFDM symbols and calculating sufficiently averaged phase rotation information per one OFDM symbol, the accuracy of residual carrier frequency error detection can be improved. However, as enough many pilot signals must be processed for the highly accurate detection, when OFDM symbols located nearby the head of a packet are processed, phase rotation detection by using pilot signals is not so accurate. In particular, the number of pilot signals included in one OFDM symbol is smaller than that of subcarriers, the accuracy of residual carrier frequency error detected by using pilot signals in OFDM symbols close to a head of a packet becomes less accurate as compared to that by using all the subcarriers in the specific OFDM symbol. Therefore, in the present embodiment, as for phase rotation in the OFDM symbols close to a head of a packet, all the subcarriers in the specific OFDM symbol are used for phase rotation compensation, and as for phase rotation in succeeding OFDM symbols, enough number of pilot signals in OFDM symbols are used for phase rotation compensation, so that highly accurate phase rotation compensation can be performed throughout a packet.

Thus, the current embodiment provides highly accurate compensation for phase rotation caused by residual carrier frequency error with small delay, which is impossible in a prior art.

Thirty-Second Embodiment

Figure 32:
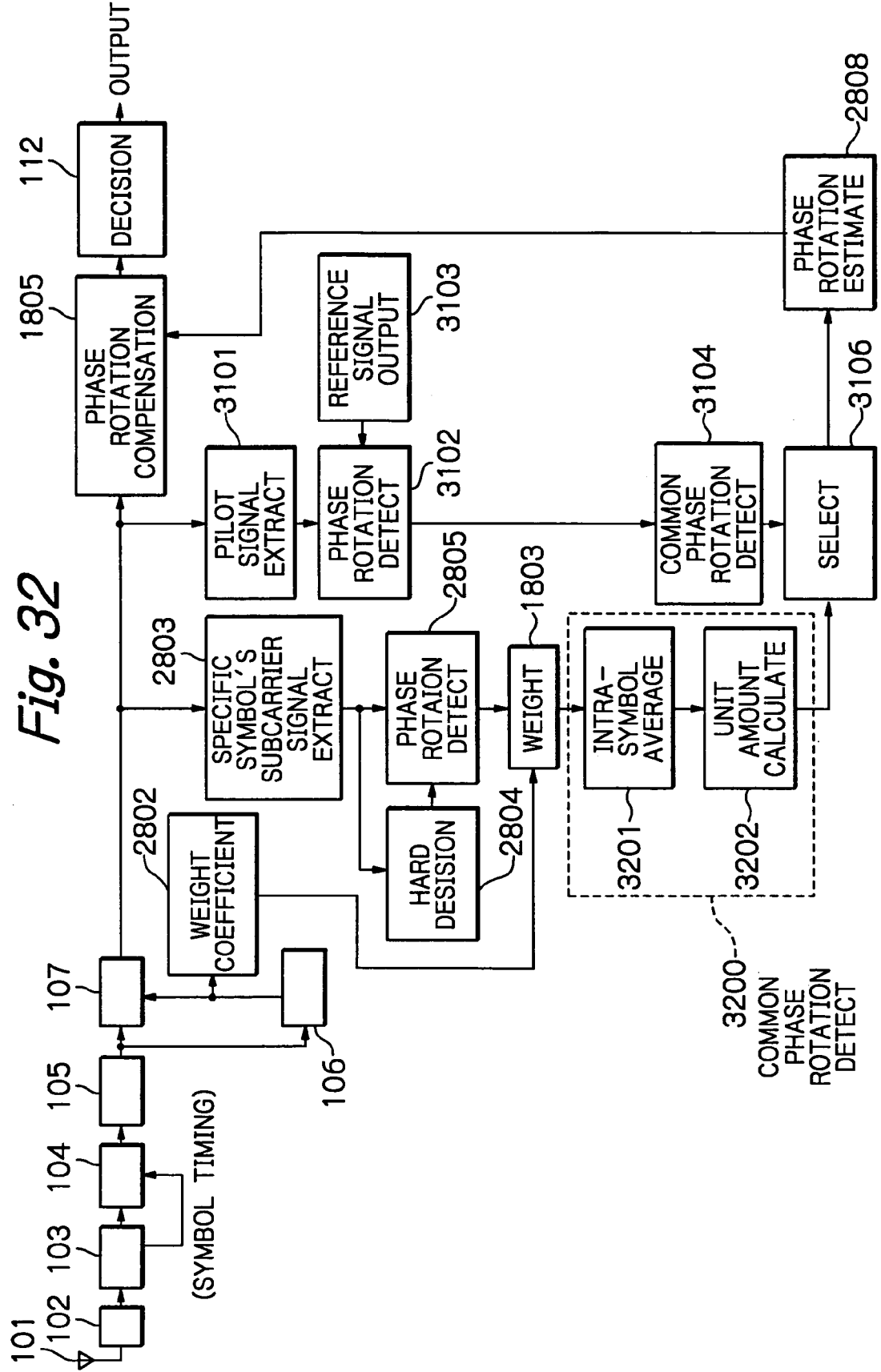
FIG. 32 is a block diagram of a thirty-second embodiment of an OFDM packet communication receiver.

FIG. 32 shows a thirty-second embodiment, which is a modification of FIG. 31, and is directed to claims 26 and 44. The same numerals in FIG. 32 as those in FIG. 31 show the same members.

It is assumed in FIG. 32 that pilot signals which are known are transmitted by using a part of subcarriers in OFDM signals.

In FIG. 32, a common phase rotation detection block 3200 comprises an intra-symbol averaging circuit 3201 and a unit amount calculator 3202.

A weighted phase rotation information provided by the weighting circuit 1803 is applied to an intra-symbol averaging circuit 3201, which averages the weighted phase rotation information of all the subcarriers in the specific OFDM symbol, so that the undesired effect of thermal noise and others added in the receiving circuit 102 is suppressed, and phase rotation common to all the subcarriers caused by residual carrier frequency error is accurately detected. An output of the intra-symbol averaging circuit 3201 is applied to a unit amount calculator 3202, which calculates phase rotation per one OFDM symbol. An output of the unit amount calculator 3202 is applied to a selector 3106.

As above described, the phase rotation detection accuracy can be improved because the effect of thermal noise and others is suppressed by the averaging operation within the specified OFDM symbol. Thus, the current embodiment provides highly accurate phase rotation compensation caused by residual carrier frequency error with small process delay, which is impossible in a prior art.

Thirty-Third Embodiment

Figure 33:
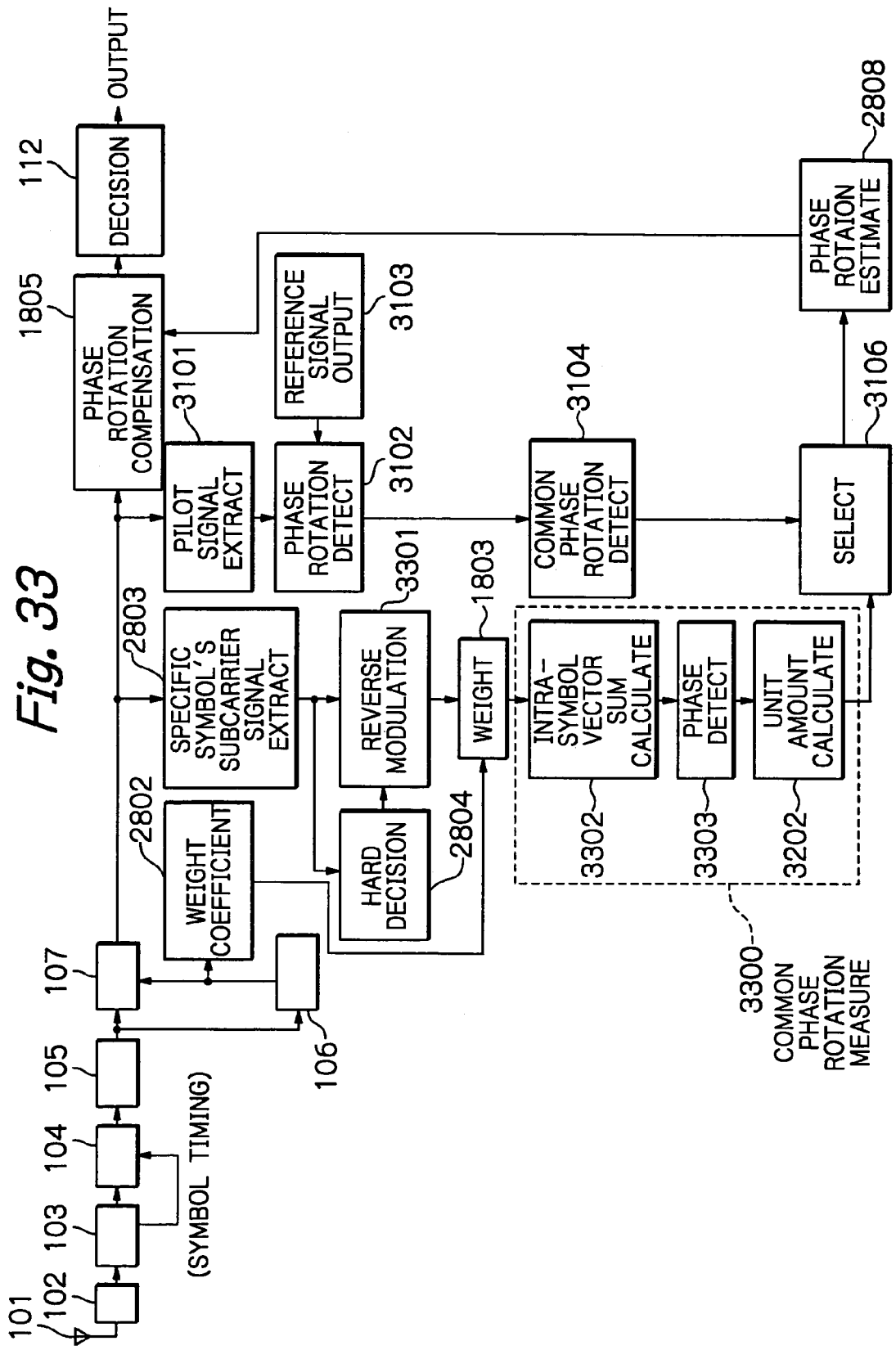
FIG. 33 is a block diagram of a thirty-third embodiment of an OFDM packet communication receiver.

FIG. 33 shows a thirty-third embodiment, which is a modification of FIG. 32, and is directed to claims 26, 44, 45 and 49. The same numerals in FIG. 33 as those in FIG. 32 show the same members.

It is assumed in FIG. 33 that pilot signals which are known are transmitted by using a part of subcarriers in OFDM signals.

A common phase rotation detection block 3300 in FIG. 33 comprises an intra-symbol vector sum calculator 3302, a phase detector 3303, and a unit amount calculator 3202.

An output of a specific symbol's subcarrier signal extractor 2803 is applied to a reverse modulator 3301, and a hard decision circuit 2804. The output of the hard decision circuit 2804 is applied to the reverse modulator 3301. The reverse modulator 3301 carries out reverse modulation for each signal provided by the specific symbol's subcarrier signal extractor 2803 on baseband, and outputs reversely modulated complex vector signal. The reverse modulation removes signal component produced through modulation process in a transmitter, and therefore, the reversely modulated signal includes only phase component caused by phase rotation due to residual carrier frequency error, and thermal noise component added to a signal in the receiving circuit 102. An output of the reverse modulator 3301 is applied to a weighting circuit 1803, which gives an weight to the complex vector signal according to the weight coefficient supplied by the weight coefficient calculator 2802. The weighting operation can be, for instance, realized by exchanging amplitude component of the complex vector signal with the weight coefficient provided by the weight coefficient calculator 2802. An output of the weighting circuit 1803 is applied to an intra-symbol vector sum calculator 3302, which calculates the vector sum of all the weighted complex vector signals of the OFDM symbol. The vector sum operation provides the smoothed phase component of the complex vector signals, so that the undesirable effect of thermal noise and others added at the receiving circuit 102 is suppressed. Thus, phase component of the complex vector signal provided by the intra-symbol vector sum calculator 3302 accurately indicates the phase rotation information which is common to all the subcarriers caused by residual carrier frequency error. An output of the intra-symbol vector sum calculator 3302 is applied to a phase detector 3303, which detects phase component of the complex vector signal provided by the intra-symbol vector sum calculator 3302. The phase component information detected by the phase detector 3303 is applied to a unit amount calculator 3202.

Thus, the current embodiment provides highly accurate compensation of phase rotation caused by residual carrier frequency error with small process delay, which is impossible in a prior art.

Thirty-Fourth Embodiment

Figure 34:
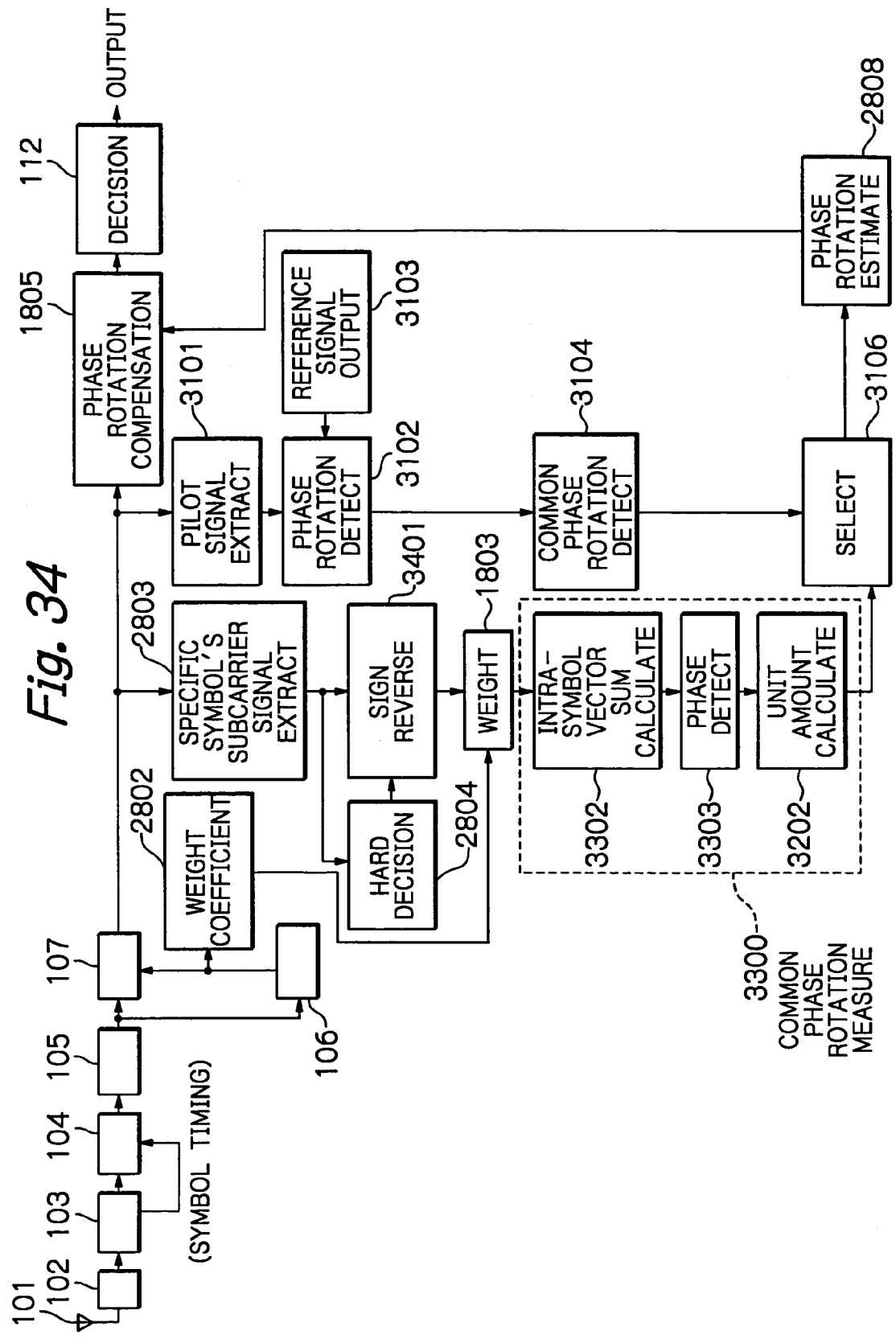
FIG. 34 is a block diagram of a thirty-fourth embodiment of an OFDM packet communication receiver.

FIG. 34 shows a thirty-fourth embodiment, which is a modification of FIG. 33, and is directed to claims 26, 44, 46 and 49. The same numerals in FIG. 34 as those in FIG. 33 show the same members.

It is assumed in FIG. 34 that pilot signals which are known are transmitted by using a part of subcarriers in OFDM signals.

In FIG. 34, it is assumed that the subcarriers in an at least one specific OFDM symbol which are used for detecting phase rotation caused by residual carrier frequency error are modulated so that a transition from a reference signal point to another reference signal point is expressed merely by inversion of a code, such as BPSK and QPSK.

An output of a specific symbol's subcarrier signal extractor 2803 is applied to a sign controller 3401 and a hard decision circuit 2804. The sign controller 3401 realizes the reverse modulation operation of an input signal by code inversion. The output of the sign controller 3401 is applied to a weighting circuit 1803.

When a subcarrier is so modulated that transition from a reference signal point to another reference signal point is carried out merely by code inversion, such as BPSK or QPSK, reverse modulation can be realized by simple code inversion, therefore, reverse modulation means is simplified.

Thus, the current embodiment provides highly accurate phase rotation compensation caused by residual carrier frequency error with simple structure and small process delay, which is impossible in a prior art.

Thirty-Fifth Embodiment

Figure 35:
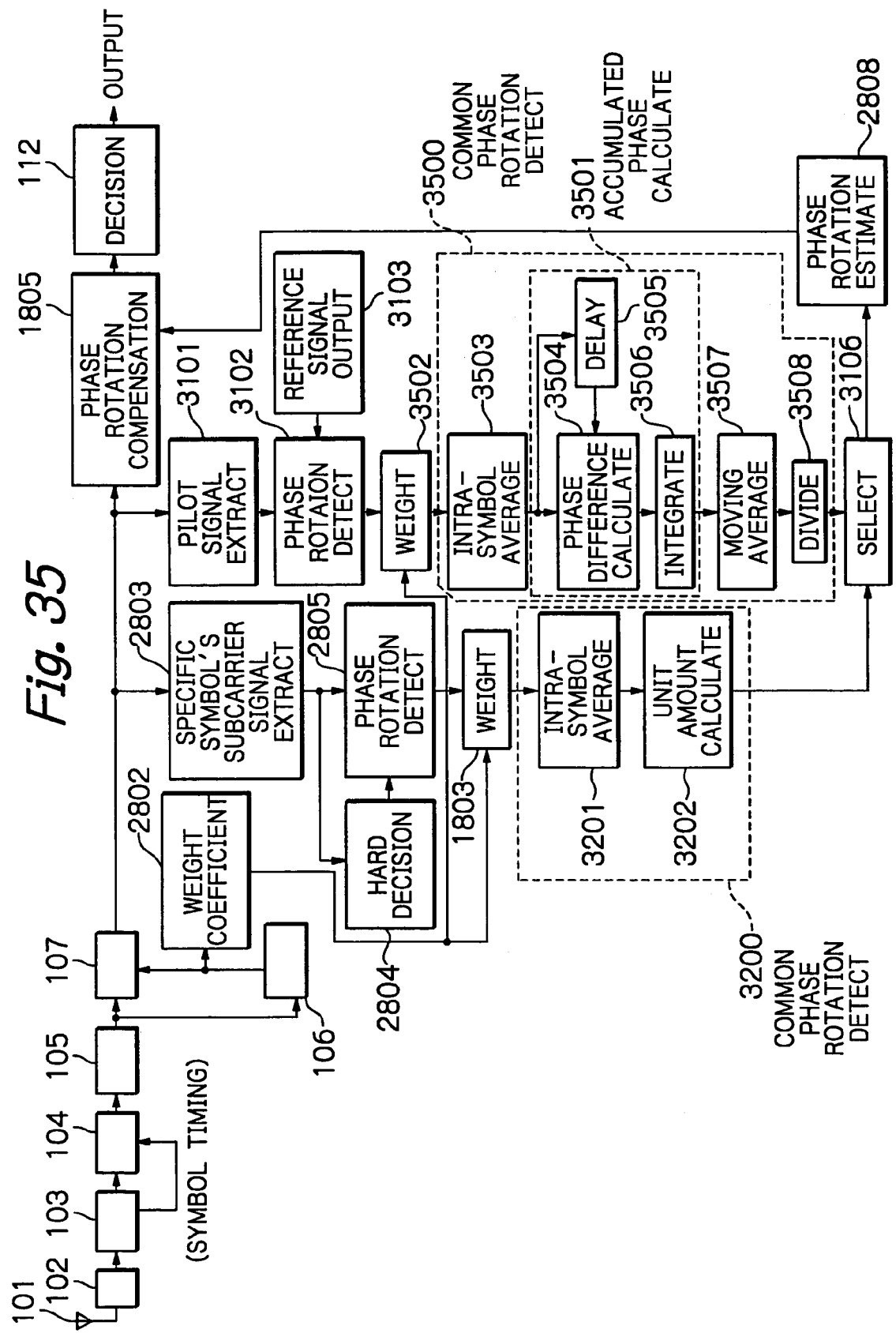
FIG. 35 is a block diagram of a thirty-fifth embodiment of an OFDM packet communication receiver.

FIG. 35 shows a thirty-fifth embodiment, which is a modification of FIG. 32, and is directed to claims 26, 34, 35, 44 and 47. The same numerals in FIG. 35 as those in FIG. 32 show the same members.

It is assumed in FIG. 35 that pilot signals which are known are transmitted by using a part of subcarriers in OFDM signals.

An phase rotation accumulation block 3501 comprises a phase difference calculator 3504, a delay circuit 3505, and an integration circuit 3506. A common phase rotation detection block 3500 comprises an intra-symbol averaging circuit 3503, a phase rotation accumulation block 3501, a time-oriented moving average circuit 3507, and a division circuit 3508.

A phase rotation information of a pilot signal provided by a phase rotation detector 3102 is applied to a weighting circuit 3502, which gives a weight to the phase rotation information of a pilot signal according to the weight coefficient supplied by a weight coefficient calculator 2802. This weighting operation mitigates undesired effect caused by the use of unreliable phase rotation information of a poor subcarrier due to fading. An output of the weighting circuit 3502 is applied to an intra-symbol averaging circuit 3503, which averages the weighted phase rotation information provided by the weighting circuit 3502. When the weighting circuit 3502 provides an output phase rotation information signal in the form of a vector signal, the averaging operation of the phase rotation information can be realized by the vector sum operation. An output of the intra-symbol averaging circuit 3503 is applied to a phase difference calculator 3504 and a delay circuit 3505, which delays an input signal by one OFDM symbol duration. A output of the delay circuit 3505 is applied to the phase difference calculator 3504, which calculates difference between a delayed phase rotation information provided by the delay circuit 3505 and a phase rotation information provided by the intra-symbol averaging circuit 3503, and outputs the obtained phase difference information for each OFDM symbol to the integration circuit 3506. The integration circuit 3506 integrates the phase difference information so that accumulated phase rotation caused by residual carrier frequency error and phase noise is obtained. This accumulated phase rotation indicates the accumulated phase rotation caused by residual carrier frequency error and phase noise of the detected signal in the relating OFDM symbol provided by the coherent detection circuit 107. An output of the integration circuit 3506 is applied to a time-oriented moving average circuit 3507, which averages the accumulated phase rotation information through a plurality of OFDM symbols along time axis. The moving average operation mitigates the undesired effect of thermal noise and others added in the receiving circuit 102. An output of the time-oriented moving average circuit 3507 is applied to a division circuit 3508, which divides the moving averaged accumulated phase rotation information by the number of related OFDM symbols, so that the phase rotation per one OFDM symbol is obtained. For instance, assuming that the integration circuit 3506 carries out integration process for 10 OFDM symbols, and the time-oriented moving average circuit 3507 carries out moving average process for 3 OFDM symbols, the delay equivalent to one OFDM symbol duration is inevitably happens by the moving average process for 3 OFDM symbols. Therefore, the division circuit 3508 divides the input signal by 9, so that phase rotation information for one OFDM symbol is obtained.

If the integration circuit 3506 integrates the number of signals larger than the number of OFDM symbols extracted by the specific symbol's subcarrier signal extractor 2803, the division circuit 3508 can provide more accurate phase rotation information per one OFDM symbol than that provided by the unit amount calculator 3202. An output of the division circuit 3508 is applied to a selector 3106. As above described, the phase rotation which is weighted according to accurate signal quality information is averaged within one OFDM symbol, so that noise component included in the phase rotation is suppressed. Thus, the phase rotation information common to all the subcarriers caused by residual carrier frequency error can be accurately detected. Further, the information of phase rotation per one OFDM symbol, caused by residual carrier frequency error, can be accurately calculated, because the accumulated phase rotation information is divided by the number of accumulated OFDM symbols. Further, phase rotation per one OFDM symbol is accurately detected, because the moving average operation of said accumulated phase rotation information before said dividing operation suppresses the undesired effect of thermal noise.

Thus, the current embodiment provides highly accurate compensation of phase rotation caused by residual carrier frequency error with small process delay, which is impossible in a prior art.

Thirty-Sixth Embodiment

Figure 36:
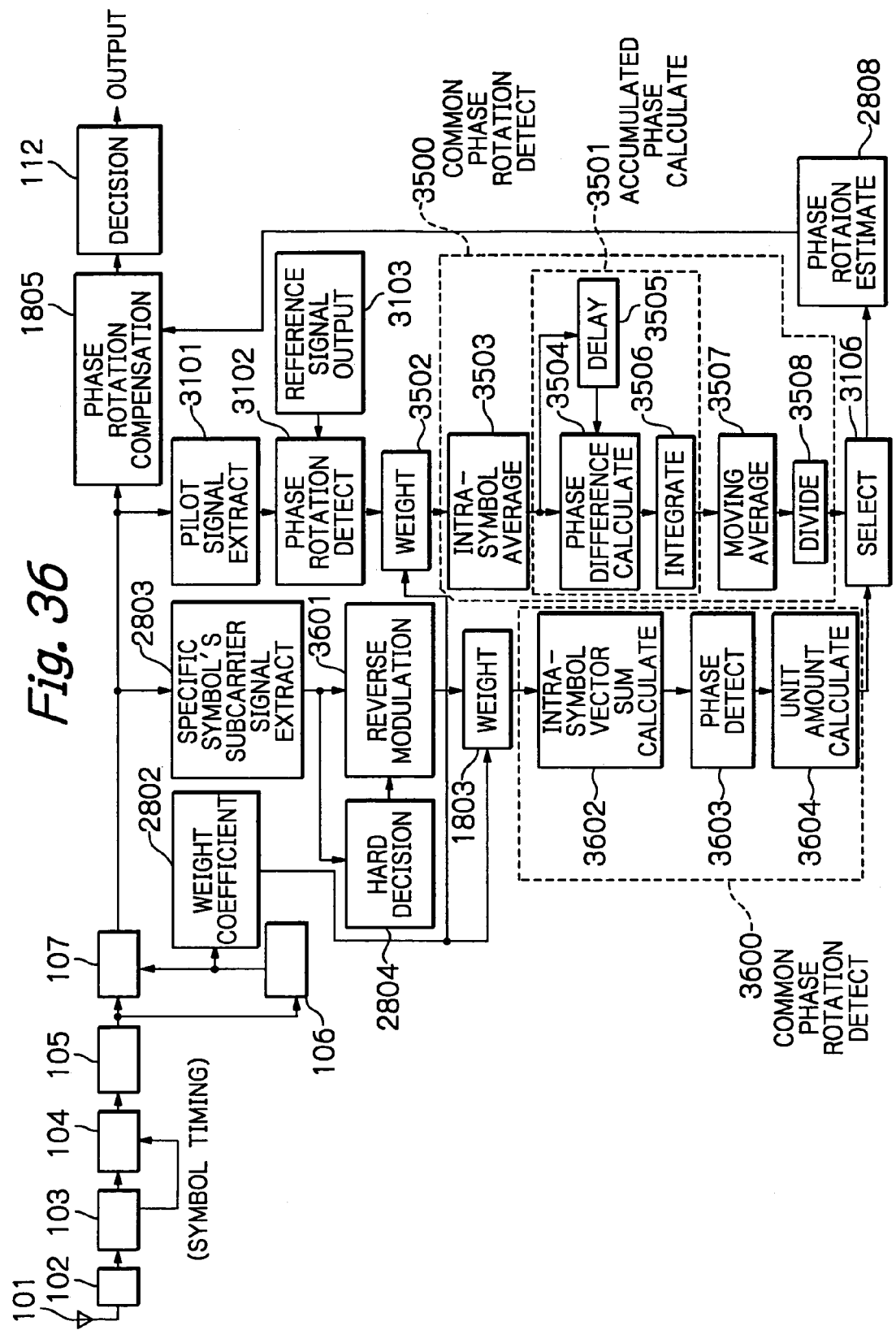
FIG. 36 is a block diagram of a thirty-sixth embodiment of an OFDM packet communication receiver.

FIG. 36 shows a thirty-sixth embodiment, which is a modification of FIG. 35, and is directed to claims 26, 34, 35, 44, 45, 47 and 49. The same numerals in FIG. 36 as those in FIG. 35 show the same members.

It is assumed in FIG. 36 that pilot signals which are known are transmitted by using a part of subcarriers in OFDM signals.

A common phase rotation detection block 3600 in FIG. 36 comprises an intra-symbol vector sum calculator 3602, a phase detector 3603 and a unit amount calculator 3604.

An output of a specific symbol's subcarrier signal extractor 2803 is applied to a reverse modulator 3601 and a hard decision circuit 2804. The hard decision circuit 2804 provides the decision result to the reverse modulator 3601. The reverse modulator 3601 carries out the reverse modulation of the signals provided by the specific symbol's subcarrier signal extractor 2803 on baseband according to the hard decision result provided by the hard decision circuit 2804, and provides the reversely modulated signals in the form of complex vector signal. The reverse modulation removes signal component produced through modulation process in a transmitter, and therefore, the reversely modulated signal includes only phase component caused by phase rotation due to residual carrier frequency error, and thermal noise component added to a signal in the receiving circuit 102. An output of the reverse modulator 3301 is applied to a weighting circuit 1803, which gives an weight to the complex vector signal according to the weight coefficient supplied by the weight coefficient calculator 2802. The weighting operation can be, for instance, realized by exchanging amplitude component of the complex vector signal with the weight coefficient provided by the weight coefficient calculator 2802. An output of the weighting circuit 1803 is applied to an intra-symbol vector sum calculator 3602, which calculates the vector sum of all the weighted complex vector signals of the OFDM symbol. The vector sum operation provides the smoothed phase component of the complex vector signals, so that the undesirable effect of thermal noise and others added at the receiving circuit 102 is suppressed. Therefore, the phase component of the complex vector signal provided by the intra-symbol vector sum calculator 3602 accurately indicates the phase rotation information which is common to all the subcarriers caused by residual carrier frequency error. An output of the intra-symbol vector sum calculator 3602 is applied to a phase detector 3603, which detects phase component of the complex vector signal provided by the intra-symbol vector sum calculator 3602. The phase component information detected by the phase detector 3603 is applied to a unit amount calculator 3604.

Thus, the current embodiment provides highly accurate compensation of phase rotation caused by residual carrier frequency error with small process delay, which is impossible in a prior art.

Thirty-Seventh Embodiment

Figure 37:
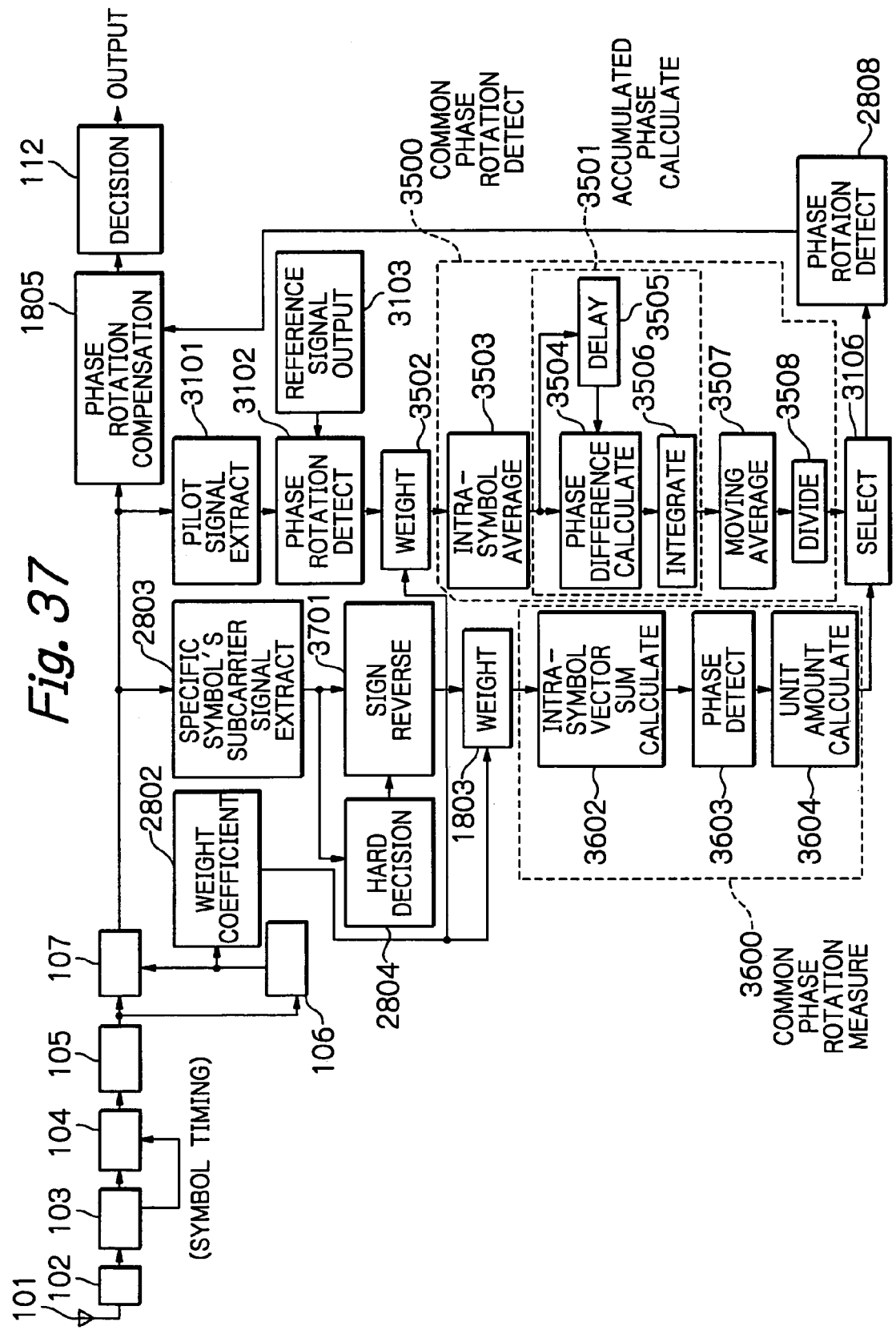
FIG. 37 is a block diagram of a thirty-seventh embodiment of an OFDM packet communication receiver.

FIG. 37 shows a thirty-seventh embodiment, which is a modification of FIG. 36, and is directed to claims 26, 34, 35, 44, 46, 47 and 49. The same numerals in FIG. 37 as those in FIG. 36 show the same members.

It is assumed in FIG. 37 that pilot signals which are known are transmitted by using a part of subcarriers in OFDM signals.

It is assumed in FIG. 37 that the subcarriers in the at least one specific OFDM symbol which are used for detecting phase rotation caused by residual carrier frequency error are modulated so that transition from a reference signal point to another reference signal point is expressed merely by code inversion, such as BPSK and QPSK.

An output of a specific symbol's subcarrier signal extractor 2803 is applied to a sign controller 3701 and a hard decision circuit 2804. The sign controller 3701 realizes the reverse modulation operation of an input signal by code inversion. An output of the sign controller 3701 is applied to a weighting circuit 1803.

When a subcarrier is modulated so that transition from a reference signal point to another reference signal point is carried out merely by code inversion, such as BPSK and QPSK, reverse modulation can be realized by simple code inversion, and thus, a reverse modulation means is simplified.

Thus, the current embodiment provides highly accurate phase rotation compensation caused by residual carrier frequency error with a simple circuit structure and small process delay, which is impossible in a prior art.

Thirty-Eighth Embodiment

Figure 38:
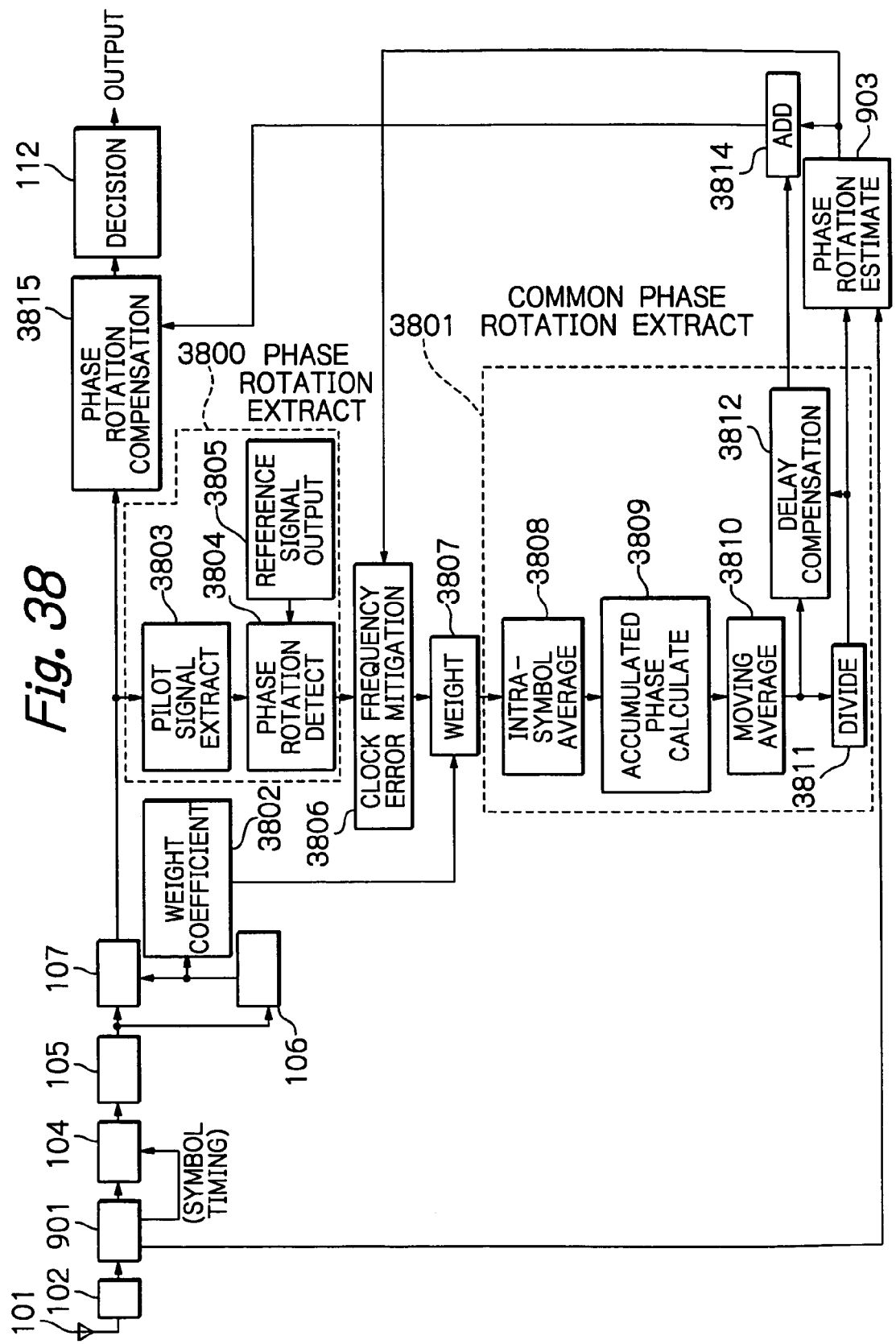
FIG. 38 is a block diagram of a thirty-eighth embodiment of an OFDM packet communication receiver.

FIG. 38 shows a thirty-eighth embodiment, which is a modification of FIG. 17, and is directed to claims 17, 20, 25, 32, 33 and 43. The same numerals in FIG. 38 as those in FIG. 17 show the same members.

It is assumed in FIG. 38 that pilot signals which are known are transmitted by using a part of subcarriers in OFDM signals.

It is further assumed in FIG. 38 that sampling clock frequency is synchronized with carrier frequency in a transmitter, and an OFDM packet communication receiver in FIG. 38 controls a clock frequency so that it synchronizes with carrier frequency.

A phase rotation information detection block 3800 in FIG. 38 comprises a pilot signal extractor 3803, a phase rotation detector 3804, and a reference signal generator 3805. A common phase rotation detection block 3801 comprises an intra-symbol averaging circuit 3808, a phase rotation accumulator 3809, a time-oriented moving average circuit 3810, a division circuit 3811 and a delay compensator 3812.

The channel estimation result provided by the channel estimator 106 is applied to a coherent detection circuit 107 and a weight coefficient calculator 3802, which calculates a weight coefficient for each subcarrier depending upon communication quality of each subcarrier according to the channel estimation result of each subcarrier provided by the channel estimator 106. For instance, received signal level of each subcarrier can be a measure of the signal quality of the subcarrier. An output of the weight coefficient calculator 3802 is applied to a weighting circuit 3807.

An output of the coherent detection circuit 107 is applied to a phase rotation compensator 3815 and a pilot signal extractor 3803, which extracts pilot signals from the output signals of the coherent detection circuit 107. A pilot signal extracted by the pilot signal extractor 3803 is applied to a phase rotation detector 3804. A reference signal generator 3805 provides a reference signal which relates to the pilot signal extracted by the pilot signal extractor 3803. As a pilot signal is a known signal, a reference signal relating to the pilot signal is easily obtained in a receiver. The reference signal provided by the reference signal generator 3805 is applied to the phase rotation detector 3804, which detects phase rotation of the pilot signal extracted by the pilot signal extractor 3803 according to the reference signal supplied by the reference signal generator 3805. An output of the phase rotation detector 3804 is applied to a clock frequency error mitigation circuit 3806. Moreover, the phase rotation information of each pilot signal caused by clock frequency error provided by a phase rotation estimator 903 is also applied to a clock frequency error mitigation circuit 3806. The clock frequency error mitigation circuit 3806 removes phase rotation component of the phase rotation information provided by the phase rotation detector 3804, which is caused by the clock frequency error, according to the phase rotation information of each subcarrier provided by the phase rotation estimator 903. An output of the clock frequency error mitigation circuit 3806 is applied to the weighting circuit 3807, which gives a weight to the phase rotation information provided by the clock frequency error mitigation circuit 3806 according to the weight coefficient provided by the weight coefficient calculator 3802. This weighting operation suppresses the undesirable effect by the use of unreliable phase rotation information which is degraded by fading.

An output of the weighting circuit 3807 is applied to an intra-symbol averaging circuit 3808, which carries out averaging operation of the output signals of the weighting circuit 3807 in each OFDM symbol, so that it suppresses the undesirable effect of thermal noise and others in the receiving circuit 102, and provides an accurate phase rotation information, caused by residual carrier frequency error, common to all the subcarriers in each OFDM symbol. This averaging operation is carried out within each OFDM symbol, and therefore, it is equivalent to an averaging operation along frequency axis. An output of the intra-symbol averaging circuit 3808 is applied to the phase rotation accumulator 3809, which calculates phase rotation of a pilot signal caused by phase noise and residual carrier frequency error, accumulated from channel estimation until the current OFDM symbol. For instance, this calculation can be carried out by integrating difference of the phase rotation information between the current OFDM symbol and the immediately previous OFDM symbol for each OFDM symbol. An output of the phase rotation accumulator 3809 is applied to a time-oriented moving average circuit 3810, which carries out averaging operation of the output signals of the phase rotation accumulator 3809 which provides the accumulated phase rotation information for each OFDM symbol, through a plurality of OFDM symbols along time axis. This moving average operation mitigates the signal degradation caused by thermal noise and others added in the receiving circuit 102. An output of the time-oriented moving average circuit 3810 is applied to a division circuit 3811 and a delay compensator 3812.

The division circuit 3811 divides the accumulated phase rotation supplied by the time-oriented moving average circuit 3810 by the difference between the number of OFDM symbols used for accumulation process in the phase rotation accumulator 3809 and the number relating to a delay in the moving average operation. For instance, if the number of OFDM symbols used for accumulated phase rotation calculation is 10, and the time-oriented moving average circuit 3810 carries out the moving average of 3 OFDM symbols, the moving average process of 3 OFDM symbols generates a delay of one OFDM symbol duration, therefore, the division circuit 3811 divides a dividend by 9. As the accumulated phase rotation caused by phase noise becomes almost zero, the division provides phase rotation caused by residual carrier frequency error, per one OFDM symbol.

As described above, as the phase rotation of a pilot signal per one OFDM symbol is calculated by using the accumulated phase rotation information of each pilot signal, thermal noise and phase noise are suppressed finely at the latter position of a packet. The division circuit 3811 applies a phase rotation information per one OFDM symbol caused by residual carrier frequency error, to a delay compensator 3812, and a phase rotation estimator 903.

The delay compensator 3812 compensates the effect of a delay included in the moving averaged accumulated phase rotation information provided by the time-oriented moving average circuit 3810 by using the phase rotation information per one OFDM symbol provided by the division circuit 3811, so that the accumulated phase rotation caused by residual carrier frequency error and phase noise in the subcarriers in each OFDM symbol is accurately obtained. The accumulated phase rotation provided by the delay compensator 3812 is applied to an adder 3814.

On the other hand, the information of the phase rotation caused by clock frequency error provided by the phase rotation estimator 903 is applied to the clock frequency error mitigation circuit 3806 and the adder 3814. The adder 3814 adds two inputs, and provides phase rotation information caused by clock frequency error, residual carrier frequency error, and phase noise, and applies the sum to the phase rotation compensator 3815. The phase rotation compensator compensates phase rotation included in a detected signal provided by the coherent detection circuit 107 by using the output of the adder 3814. An output of the phase rotation compensator 3815 is applied to a decision circuit 112 for discrimination of a symbol.

As described above, when pilot signals which are known are transmitted by using a part of subcarriers in OFDM signals, residual carrier frequency error can be efficiently detected by using only a part of coherently detected signals, thus, the circuit structure of a common phase rotation detection block is simplified. Further, even when large noise component is included in a coherently detected signal, the reference signal point related to the pilot signal is correctly discriminated, and therefore, residual carrier frequency error can be accurately detected.

Further, phase rotation component which depends upon each subcarrier caused by clock frequency error included in a phase rotation information in a detected signal of an output of the phase rotation detector is removed, and further the weight operation is carried out based upon communication quality of each subcarrier. Thus, the accuracy of phase rotation common to each subcarrier in the phase rotation detector is improved.

Further, as the weighted phase rotation information is averaged along frequency axis, the accuracy of the phase rotation information is improved. Further, highly accurate phase rotation compensation can be realized, because the phase rotation compensation is carried out by using the cumulative phase rotation information caused by residual carrier frequency error and phase noise by using the accurate phase rotation information.

Further, the moving average of the accumulated phase rotation information along time axis suppresses noise component, therefore, even when thermal noise is added to the received signal at the receiving process, the cumulative phase rotation information caused by residual carrier frequency error and phase noise can be accurately detected.

Further, the moving averaged accumulated phase rotation information is divided by the number of OFDM symbols used for accumulation, so that phase rotation per one OFDM symbol caused by residual carrier frequency error is obtained accurately, and the error of accumulated phase rotation information added at the moving average operation along time axis is removed. Therefore, the accumulated phase rotation caused by residual carrier frequency error and phase noise can be detected further accurately.

Further, phase rotation caused by clock frequency error can be accurately obtained, because phase rotation caused by clock frequency error is estimated by using accurate phase rotation information caused by carrier frequency error per one OFDM symbol.

Thus, the accurate compensation of phase rotation caused by clock frequency error, residual carrier frequency error and phase noise is carried out, although it is impossible in a prior art.

Thirty-Ninth Embodiment

Figure 39:
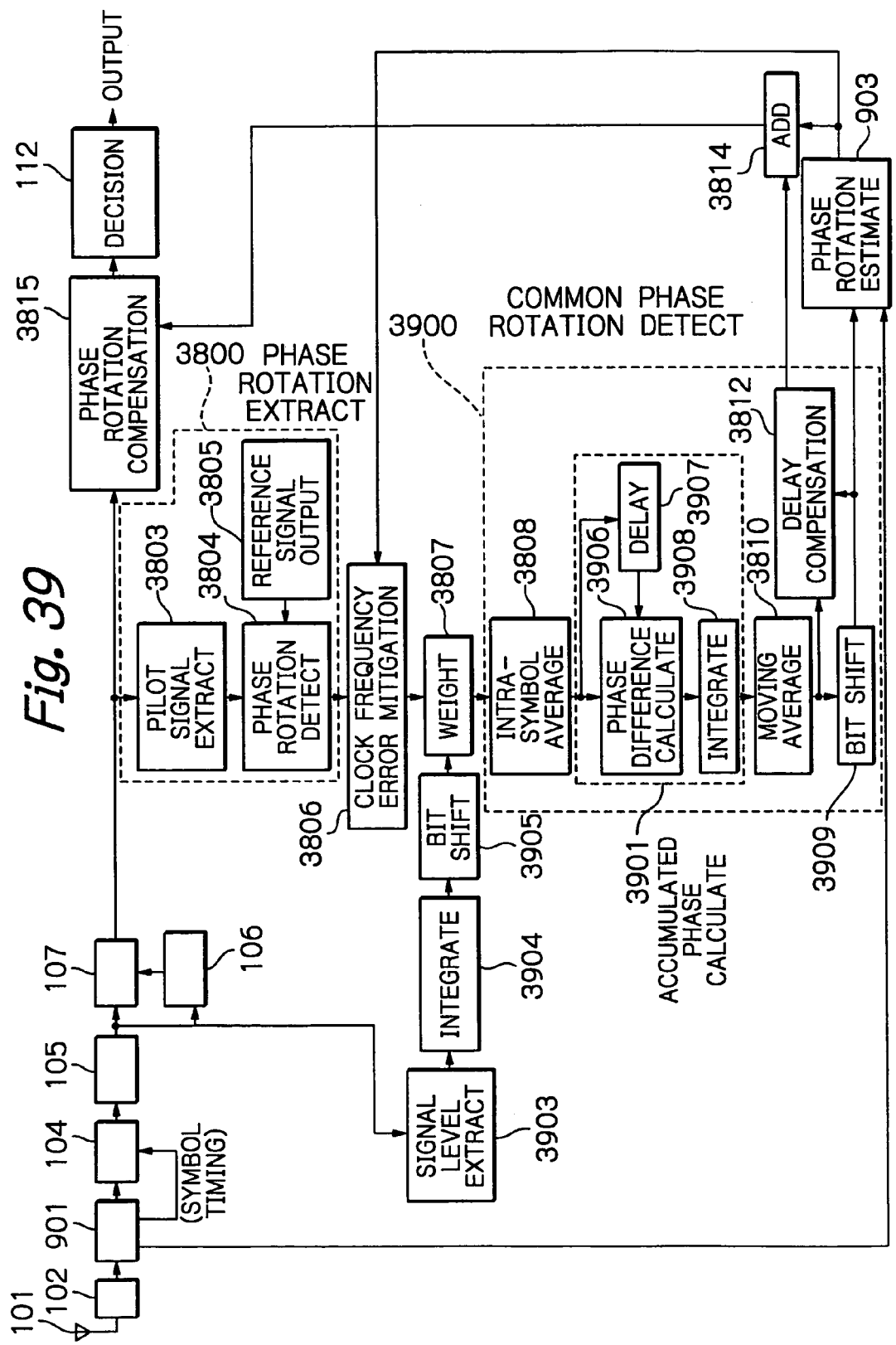
FIG. 39 is a block diagram of a thirty-ninth embodiment of an OFDM packet communication receiver.

FIG. 39 shows a thirty-ninth embodiment, which is a modification of FIG. 38, and is directed to claims 17, 20, 25, 28, 31, 32, 33, 35, 37, and 43. The same numerals in FIG. 39 as those in FIG. 38 show the same members.

It is assumed in FIG. 39 that pilot signals which are known are transmitted by using a part of subcarriers in OFDM signals.

It is further assumed that a sampling clock frequency is synchronized with a carrier frequency in a transmitter, and a sampling clock frequency in a receiver is controlled so that it synchronizes with a carrier frequency in a receiver.

An phase rotation accumulation block 3901 in FIG. 39 comprises a phase difference calculator 3906, a delay circuit 3907, and an integration circuit 3908. A common phase rotation detection block 3900 comprises an intra-symbol averaging circuit 3808, a phase rotation accumulation block 3901, a time-oriented moving average circuit 3810, a bit shift circuit 3909 and a delay compensator 3812.

Subcarrier signals provided by a Fourier transform circuit 105 are applied to a channel estimator 106, a coherent detection circuit 107 and a signal level detector 3903, which detects signal level of a part or all of subcarrier signals. The detected signal level is applied to an integration circuit 3904, which integrates the signal level of pilot signals along time axis for each subcarrier. The integrated signal level information is applied to a bit shift circuit 3905.

When the number of OFDM symbols for integration process in the integration circuit 3904 is expressed by $2^N$ (N is a natural integer), the bit shift circuit 3905 carries out the bit shift operation of N bits of the integrated signal level information of the pilot signals provided by the integration circuit 3904 so that signal level per one OFDM symbol is obtained. The bit shift operation of N bits is the same as the division by N. The bit shift operation is carried out only when the number of OFDM symbols which are integrated is expressed by $2^N$ (N is a natural integer), and an output of the bit shift circuit 3905 is updated. When the number of OFDM symbols is not expressed by $2^N$, an output of the bit shift circuit 3905 keeps the value of the previous bit shift operation. When the number of OFDM symbols is one, the bit shift circuit 3905 outputs an input signal as it is.

With the above-mentioned bit shift operation, an output of the bit shift circuit 3905 is updated frequently at a former position of a packet, and less at latter position of a packet. However, as described before, as a signal level information of a pilot signal per one OFDM symbol is obtained by using integrated signal level information of pilot signals, thermal noise component is effectively suppressed at latter position of a packet. Therefore, the performance is not deteriorated even if the bit shift circuit 3905 updates less in a latter position of a packet. As a circuit structure for bit shift operation is generally small, the circuit is extremely simplified by the use of a bit shift operation. An output of the bit shift circuit 3905 is applied to a weighting circuit 3807.

An averaged phase rotation information provided by an intra-symbol averaging circuit 3808 is applied to a phase difference calculator 3906 and a delay circuit 3907, which delays an output of the intra-symbol averaging circuit 3808 by one OFDM symbol period. The delayed phase rotation information is applied to the phase difference calculator 3906, which calculates the difference between phase rotation information provided by the intra-symbol averaging circuit 3808 and the delayed phase rotation information provided by the delay circuit 3907, and outputs the phase difference information signal for each OFDM symbol.

The phase difference information signal provided by the phase difference calculator 3906 is applied to an integration circuit 3908, which calculates cumulative phase rotation information caused by residual carrier frequency error and phase noise by integrating the phase difference information. The cumulative phase rotation information thus obtained is the accumulated phase rotation information included in coherently detected signals in a current OFDM symbol provided by the coherent detection circuit 107, caused by residual carrier frequency error and phase noise. The cumulative phase rotation information provided by the integration circuit 3908 is applied to a time-oriented moving average circuit 3810. An output of the time-oriented moving average circuit 3810 is applied to a bit shift circuit 3909 and a delay compensator 3812.

The bit shift circuit 3909 carries out the bit shift operation of the moving averaged cumulative phase rotation information provided by the time-oriented moving average circuit 3810 by N bits, when the difference between the number of OFDM symbols used for accumulation in the phase rotation accumulation block 3901 and a delay caused by the moving average operation in the time-oriented moving average circuit 3810 is expressed by $2^N$. The bit shift operation is carried out only when said difference is expressed by $2^N$, and updates an output of the bit shift circuit 3909. When said difference is not expressed by $2^N$, the result of the previous bit shift operation is used as it is. When said difference is one, the bit shift circuit 3909 outputs an input signal as it is. An output of the bit shift circuit 3909, or the phase rotation information per one OFDM symbol caused by residual carrier frequency error, is applied to a delay compensator 3812.

When condition of transmission channel by fading hardly changes within a packet, signal level of each subcarrier can be obtained by integrating signal level of subcarrier for each subcarrier, and dividing the integrated value by the number of integration, i.e., the number of integrated OFDM symbols. In this case, since the number of OFDM symbols for integration becomes large at the latter position of a packet, the effect of smoothing, i.e., the effect of noise suppression, becomes large at the latter position of a packet. Thus, the effect of the thermal noise can be efficiently suppressed. Therefore, signal level information of each subcarrier can be detected with high accuracy.

Further, as the division for obtaining signal level per one OFDM symbol is realized by bit shift operation, circuit structure is simplified. Further, as the bit shift operation is carried out only when the number of OFDM symbols for integration operation reaches $2^N$ (N is an integer), bit shift operation for every OFDM symbols is not required, and operation is less in a latter position in a packet, the power consumption is greatly reduced.

Thus, when channel condition hardly changes within a packet, the highly accurate phase rotation compensation, which is impossible in a prior art, is carried out with simple circuit structure and low power consumption.

Fortieth Embodiment

Figure 40:
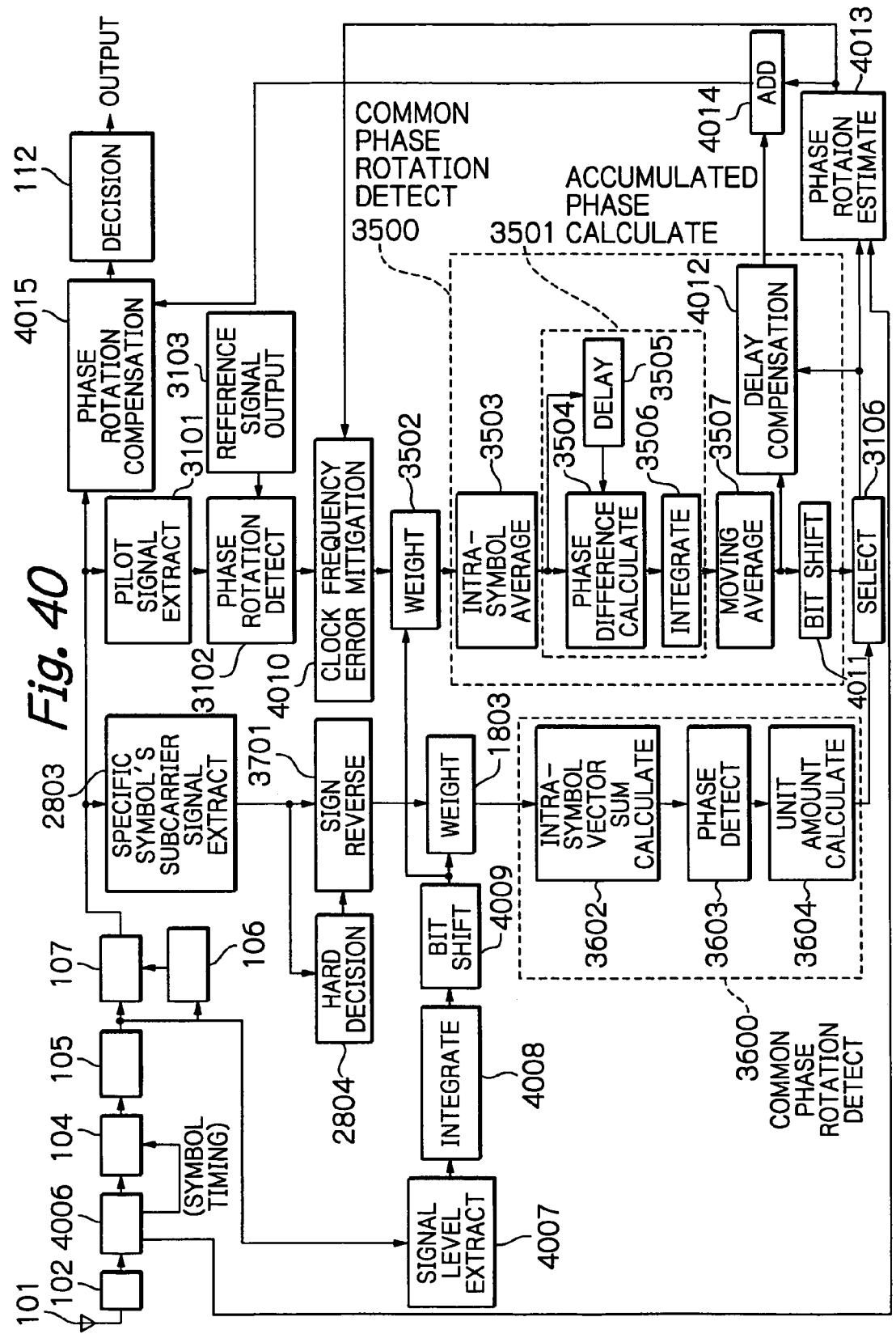
FIG. 40 is a block diagram of a fortity embodiment of an OFDM packet communication receiver.

FIG. 40 shows a forties embodiment, which is a modification of FIG. 37, and is directed to claims 26, 27, 34, 35, 44, 46, 47, 48, 49, and 50. The same numerals in FIG. 40 as those in FIG. 37 show the same members.

It is assumed in FIG. 40 that pilot signals which are known are transmitted by using a part of subcarriers in OFDM signals.

It is further assumed that a sampling clock frequency in a transmitter is synchronized with a carrier frequency, and a sampling clock frequency in a receiver is synchronized with a carrier frequency.

It is assumed in FIG. 40 that each subcarrier signal in at least one specific OFDM symbol used for detecting phase rotation caused by residual carrier frequency error is so modulated that transition from a reference signal point to another reference signal point is expressed merely by code inversion, such as BPSK or QPSK.

A common phase rotation detection block 3500 comprises an intra-symbol averaging circuit 3503, an phase rotation accumulation block 3501, a time-oriented moving average circuit 3507, and a bit shift circuit 4011.

A synchronization circuit 4006 detects carrier frequency error and OFDM symbol timing by using preamble signal for synchronization in input complex baseband signals, and carries out the carrier frequency error compensation for the complex baseband signals by using the detected carrier frequency error information, then, outputs the compensated complex baseband signals, the detected OFDM symbol timing information signal, and carrier frequency error information signal. The compensated complex baseband signals and OFDM symbol timing information signal, which are provided by the synchronization circuit 4006, are applied to a guard interval removing circuit 104. Further, the carrier frequency error information signal provided by the synchronization circuit 4006 is applied to a phase rotation estimator 4013.

The subcarrier signals provided by a Fourier transform circuit 105 are applied to a channel estimator 106, a coherent detection circuit 107, and a signal level detector 4007. The signal level detector 4007 detects signal level of a part or all of the input subcarrier signals. The signal level information detected by the signal level detector 4007 is applied to an integration circuit 4008, which integrates the signal level information of pilot signals provided by the signal level detector 4007 along time axis for each subcarrier. An output of the integration circuit 4008 is applied to a bit shift circuit 4009.

When the number of OFDM symbols for integration process in the integration circuit 4008 is expressed by $2^N$ (N is a natural integer), the bit shift circuit 4009 carries out the bit shift operation of N bits of the integrated signal level information of the pilot signals provided by the integration circuit 4008 so that signal level per one OFDM symbol is obtained. The bit shift operation of N bits is the same as the division by N. The bit shift operation is carried out only when the number of OFDM symbols used for integration is expressed by $2^N$, and an output of the bit shift circuit 4009 is updated upon the bit shift operation. When the number of OFDM symbols is not expressed by $2^N$, the bit shift circuit 4009 keeps the output value of the previous bit shift operation result. When the number of OFDM symbols is one, the bit shift circuit 4009 outputs an input signal as it is.

With the above mentioned bit shift operation, an output of the bit shift circuit 4009 is updated frequently at a former position of a packet, and less at a latter position of a packet. However, as described before, as a signal level information of a pilot signal per one OFDM symbol is obtained by using integrated signal level information of pilot signals, thermal noise component is effectively suppressed at latter position of a packet. Therefore, the performance is not deteriorated even if the bit shift circuit 4009 updates less in a latter position of a packet. As a circuit structure for bit shift operation is generally small, the circuit is extremely simplified by the use of a bit shift operation. A signal level information of a pilot signal per one OFDM symbol calculated by the bit shift circuit 4009 is applied to a weighting circuit 1803, and the other weighting circuit 3502.

A phase rotation information signal provided by the phase rotation detector 3102 is applied to a clock frequency error mitigation circuit 4010. The output of a phase rotation estimator 4013 is also applied to the clock frequency error mitigation circuit 4010. The clock frequency error mitigation circuit 4010 removes phase rotation caused by clock frequency error included in an output of a phase rotation detector 3102, according to phase rotation information of a subcarrier signal caused by clock frequency error provided by the phase rotation estimator 4013. An output of the clock frequency error mitigation circuit 4010 is applied to a weighting circuit 3502, which gives a weight to an output of the clock frequency error mitigation circuit 4010 according to an output of the bit shift circuit 4009 which gives a pilot level information. The weighting operation suppresses the undesireable effect by the use of unreliable phase rotation information which is degraded by fading and such like. An output of the weighting circuit 3502 is applied to an intra-symbol averaging circuit 3503.

On the other hand, the moving averaged cumulative phase rotation information provided by the time-oriented moving average circuit 3507 is applied to a bit shift circuit 4011 and a delay compensator 4012.

The bit shift circuit 4011 carries out the bit shift operation of the moving averaged cumulative phase rotation information provided by the time-oriented moving average circuit 3507 by N bits, when the difference between the number of OFDM symbols used for accumulation in the phase rotation accumulation block 3501 and a delay caused by the moving average operation in the time-oriented moving average circuit 3507 is expressed by $2^N$. The bit shift operation is carried out only when said difference is expressed by $2^N$, and an output of the bit shift circuit 4011 is updated. When said difference is not expressed by $2^N$, the bit shift circuit 4011 outputs the previous result of the bit shift operation. When said difference is one, the bit shift circuit 4011 outputs an input signal as it is. An output of the bit shift circuit 4011, or the phase rotation information per one OFDM symbol caused by residual carrier frequency error, is applied to a select circuit 3106.

The delay compensator 4012 compensates the effect of a delay included in the moving averaged cumulative phase rotation information provided by the time-oriented moving average circuit 3507 caused by the moving average operation according to phase rotation information per one OFDM symbol provided by the select circuit 3106, and provides cumulative phase rotation information included in each subcarrier signal in the OFDM symbol caused by residual carrier frequency error and phase noise. The delay compensated cumulative phase rotation information is provided by the delay compensator 4012. An output of the delay compensator 4012 is applied to an adder 4014.

On the other hand, a phase rotation estimator 4013 estimates phase rotation caused by clock frequency error by using carrier frequency error information provided by the synchronization circuit 4006 and residual carrier frequency error information provided by the selector 3106. An output of the phase rotation estimator 4013 is applied to a clock frequency error mitigation circuit 4010 and an adder 4014. The adder 4014 calculates the information of phase rotation caused by clock frequency error, residual carrier frequency error and phase noise by adding the cumulative phase rotation information caused by residual carrier frequency error and phase noise provided by the delay compensator 4012 and the phase rotation information caused by clock frequency error provided by the phase rotation estimator 4013. An output of the adder 4014 is applied to a phase rotation compensator 4015, which compensates phase rotation of coherently detected signals caused by clock frequency error, residual carrier frequency error and phase noise provided by the coherent detection circuit 107, by using the phase rotation information provided by the phase rotation estimator 4013. The phase rotation compensated signal provided by the phase rotation compensator 4015 is applied to a decision circuit 112.

When the condition of transmission channel by fading hardly changes within a packet, signal level of each subcarrier can be obtained by integrating signal level of subcarrier for each subcarrier, and dividing the integrated value by the number of integration, i.e., the number of integrated OFDM symbols. In this case, since the number of OFDM symbols for integration becomes large at the latter position of a packet, the effect of smoothing, i.e., the effect of noise suppression, becomes large at the latter position of a packet. Thus, the effect of the thermal noise can be efficiently suppressed. Therefore, highly accurate signal level information of each subcarrier can be detected. Moreover, as a division for obtaining signal level of a subcarrier per one OFDM symbol is carried out by bit shift operation, circuit structure can be simplified. Further, as the bit shift operation is carried out only when the number of integrated OFDM symbols is expressed by $2^N$, bit shift operation is not required for every OFDM symbols, and the number of bit shift operation is less in the latter position of a packet, thus, power consumption is extremely saved.

Further, phase rotation detection accuracy at the common phase rotation detection block 3500 is improved, because phase rotation component, which is caused by clock frequency error, included in the phase rotation information of pilot signals provided by the phase rotation detector 3102 is removed by the clock frequency error mitigation circuit 4010 and the phase rotation information, whose phase rotation component caused by clock frequency error has been removed, is weighted.

Further, the accumulated phase rotation provided by the time-oriented moving average circuit 3507 is divided by the number of OFDM symbols used for the accumulation, so that phase rotation per one OFDM symbol caused by residual carrier frequency error is calculated accurately, and removing the effect of the delay relating to averaging process of the accumulated phase rotation along time axis according to said phase rotation information per one OFDM symbol. Thus, accumulated phase rotation caused by residual carrier frequency error and phase noise is further accurately detected.

Further, as a division for obtaining phase rotation per one OFDM symbol caused by residual carrier frequency error is carried out by bit shift operation, circuit structure is simplified. Further, as the bit shift operation is carried out only when the number of OFDM symbols used for accumulation is expressed by $2^N$, bit shift operation is not required for every OFDM symbols, and the number of bit shift operation is less in the latter position of a packet, thus, power consumption is extremely saved.

Further, phase rotation caused by clock frequency error can be accurately obtained, because phase rotation caused by clock frequency error is estimated by using accurate phase rotation information caused by carrier frequency error per one OFDM symbol.

Thus, accurate compensation of phase rotation caused by clock frequency error, residual carrier frequency error and phase noise can be carried out with simple circuit structure and small power consumption, although it is impossible in a prior art.

Forty-First Embodiment

Figure 41:
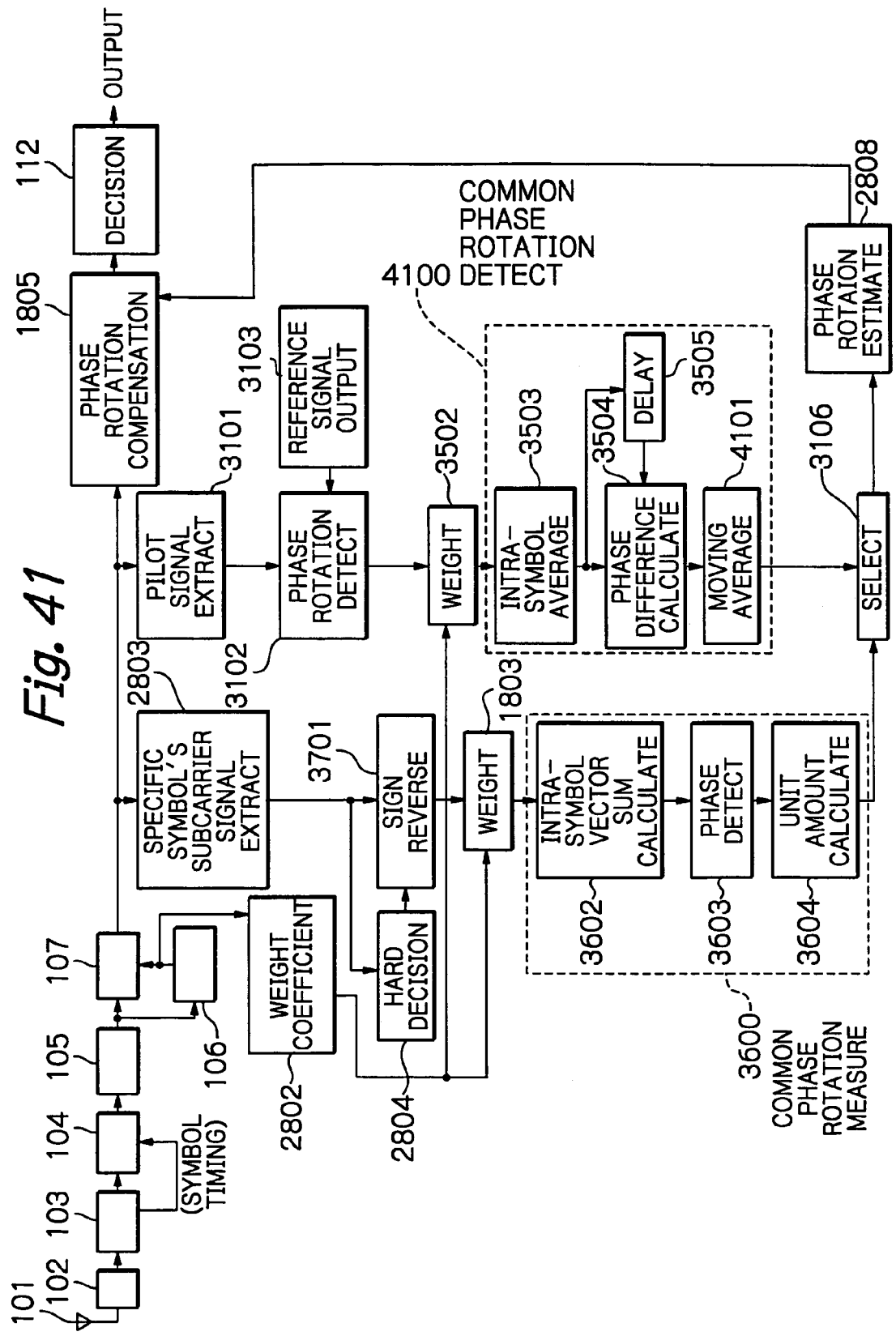
FIG. 41 is a block diagram of a forty-first embodiment of an OFDM packet communication receiver.

FIG. 41 shows a forty-first embodiment, which is a modification of FIG. 37, and is directed to claims 26, 44, 46, 47, 49, and 51. The same numerals in FIG. 41 as those in FIG. 37 show the same members.

It is assumed in FIG. 41 that pilot signals which are known are transmitted by using a part of subcarriers in OFDM signals.

It is assumed in FIG. 41 that each subcarrier signal in at least one specific OFDM symbol which is used for detecting phase rotation caused by residual carrier frequency error is modulated so that transition from a reference signal point to another reference signal point is expressed merely by code inversion, such as BPSK and QPSK.

A common phase rotation detection block 4100 in FIG. 41 comprises an intra-symbol averaging circuit 3503, a phase difference calculator 3504, a delay circuit 3505, and a time-oriented moving average circuit 4101.

Phase difference information signal provided by a phase difference calculator 3504 is applied to a time-oriented moving average circuit 4101. The phase difference information signal indicates a phase rotation information per one OFDM symbol caused by residual carrier frequency error for each OFDM symbol. The time-oriented moving average circuit 4101 carries out moving average of the phase difference information provided by the phase difference calculator 3504 along time axis through a plurality of OFDM symbols. The moving average operation suppresses the undesirable effect of thermal noise added at a receiving circuit 102, so that phase rotation per one OFDM symbol caused by residual carrier frequency error is accurately detected. The moving averaged phase rotation information provided by the time-oriented moving average circuit 4101 is applied to a selector 3106.

Thus, the current embodiment provides highly accurate compensation of phase rotation caused by residual carrier frequency error, which is impossible in a prior art.

Forty-Second Embodiment

Figure 42:
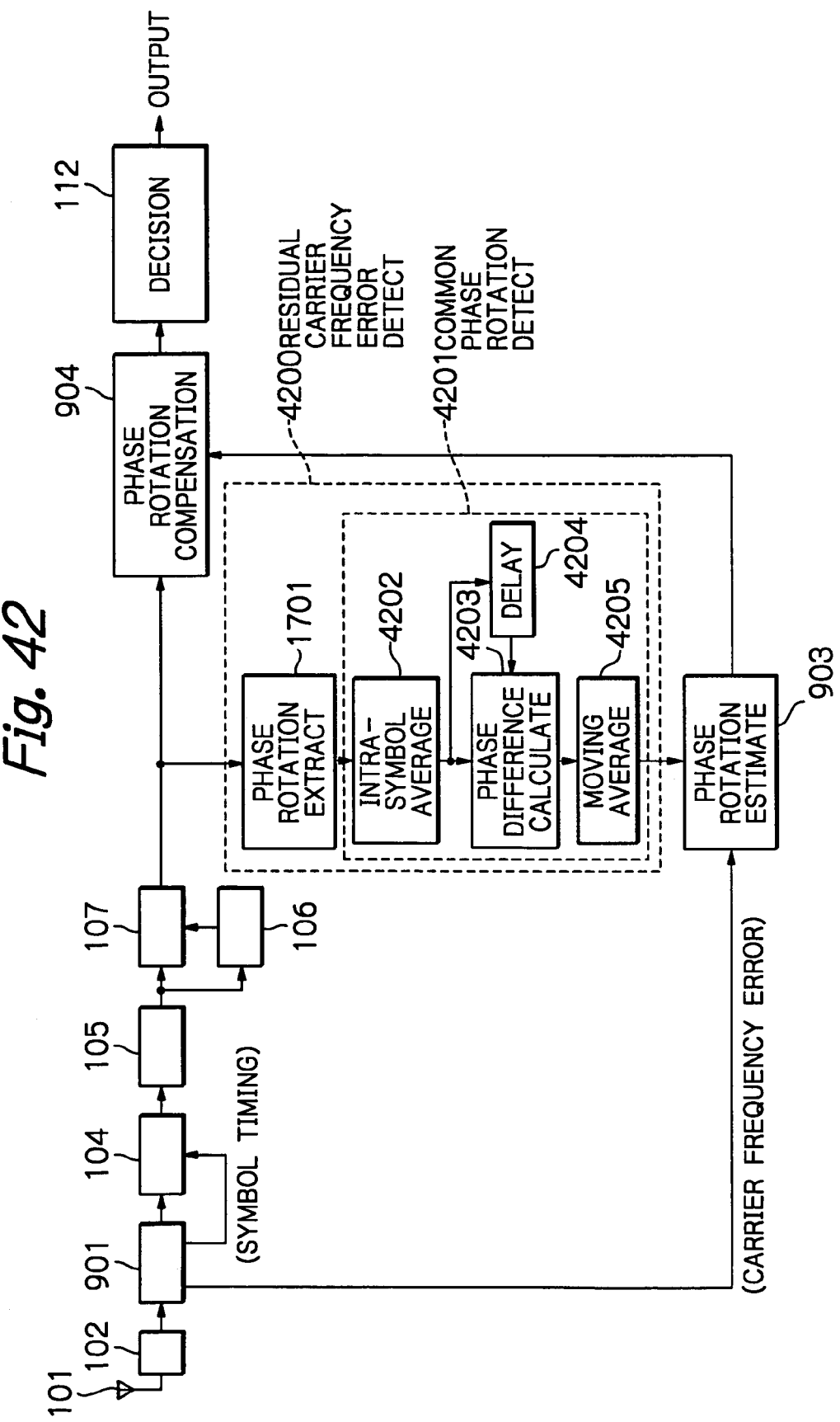
FIG. 42 is a block diagram of a forty-second embodiment of an OFDM packet communication receiver.
Figure 43A:
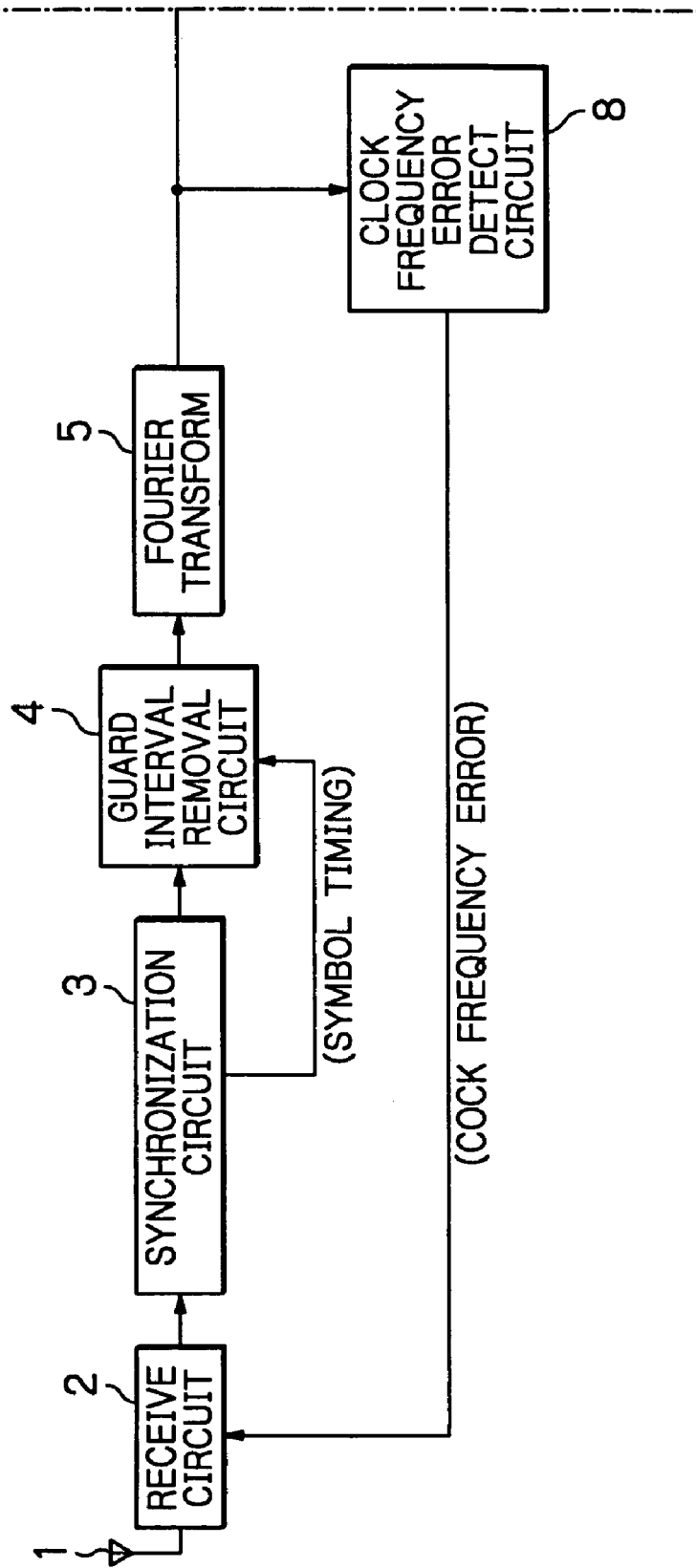
FIG. 43 is a block diagram of a prior OFDM packet communication receiver.
Figure 43B:
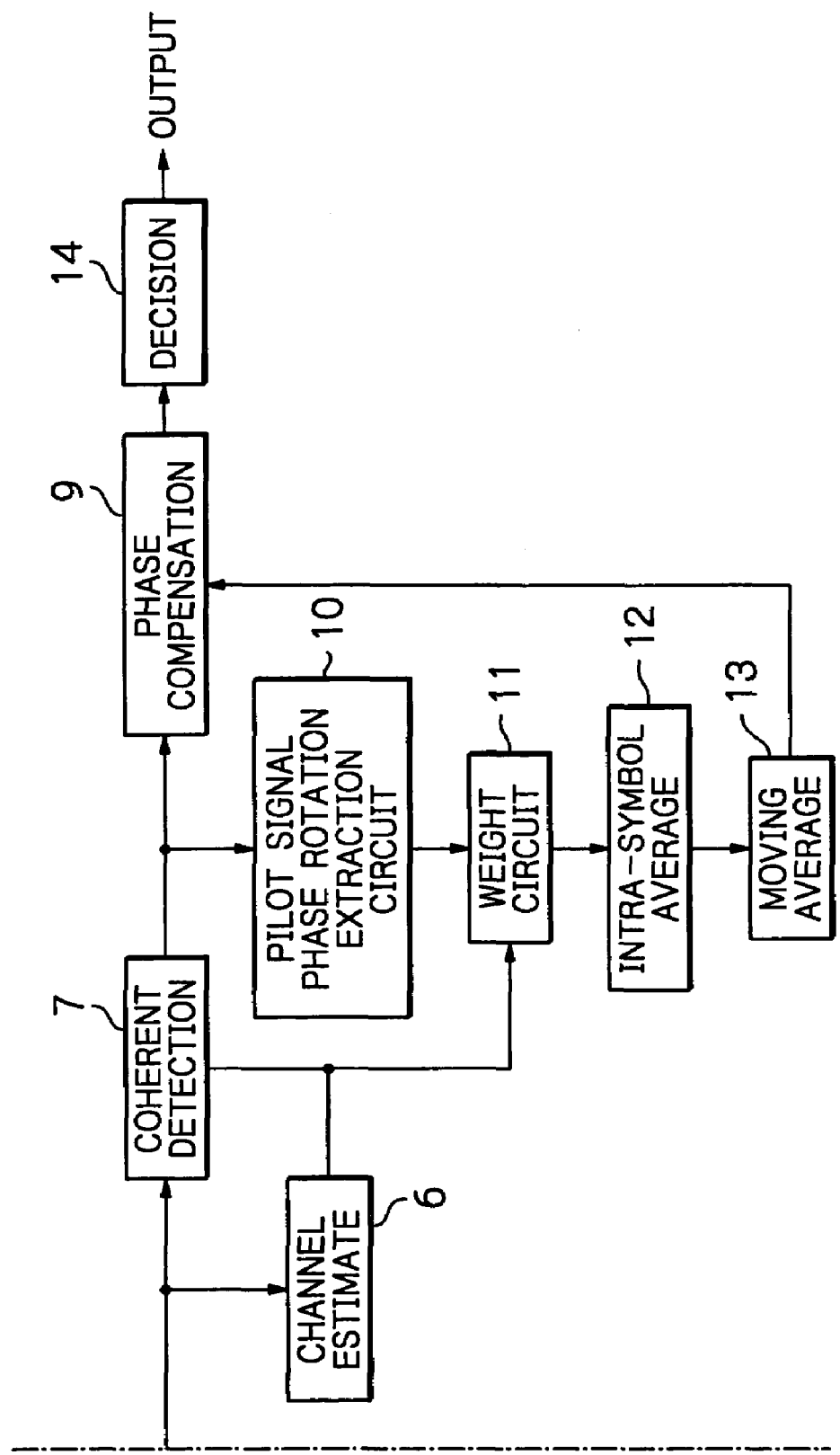

FIG. 42 shows a forty-second embodiment, which is a modification of FIG. 17, and is directed to claims 17 and 36. The same numerals in FIG. 42 as those in FIG. 17 show the same members.

Further, it is assumed in FIG. 42 that carrier frequency and clock frequency are synchronized with each other in a transmitter, and clock frequency is controlled in a receiver so that it synchronizes with carrier frequency.

A residual carrier frequency error detection block 4200 in FIG. 42 comprises a phase rotation information detector 1701, and a common phase rotation detection block 4201. The common phase rotation detection block 4201 comprises an intra-symbol averaging circuit 4202, a phase difference calculator 4203, a delay circuit 4204 and a time-oriented moving average circuit 4205.

The phase rotation information signal provided by the phase rotation information detector 1701 is applied to an intra-symbol averaging circuit 4202, which averages the phase rotation information provided by the phase rotation information detector 1701 within one OFDM symbol. The averaged phase rotation information signal provided by the intra-symbol averaging circuit 4202 is applied to a phase difference calculator 4203 and a delay circuit 4204. The delay circuit 4204 delays the averaged phase rotation information signal provided by the intra-symbol averaging circuit 4202 by one OFDM symbol duration. The delayed phase rotation information signal is applied to the phase difference calculator 4203, which calculates the difference between the phase rotation information provided by the intra-symbol averaging circuit 4202 and the delayed phase rotation information provided by the delay circuit 4204, and outputs the calculated phase difference information for each OFDM symbol. The phase difference information signal is applied to a time-oriented moving average circuit 4205. Said phase difference information signal indicates a phase rotation caused by residual carrier frequency error per one OFDM symbol and is outputted for each OFDM symbol. The time-oriented moving average circuit 4205 averages the phase difference information provided by the phase difference calculator 4203 along time axis through a plurality of OFDM symbols. The moving average operation suppresses the undesirable effect of thermal noise added at a receiving circuit 102, and phase rotation per one OFDM symbol caused by residual carrier frequency error is accurately detected. The moving averaged phase rotation information per one OFDM symbol provided by the time-oriented moving average circuit 4205 is applied to a phase rotation estimator 903.

Thus, the current embodiment realizes highly accurate compensation of phase rotation caused by clock frequency error, which is impossible in a prior art. Moreover, the above-mentioned compensation is carried out through digital process, no complicated analog circuit is required, and power consumption is suppressed.

APPLICAATION TO INDUSTRIAL FIELD

As described in detail, even when there exists an error in sampling clock frequencies between a transmitter and a receiver, OFDM signals can be accurately demodulated by using a simple digital circuit. Further, even when there exists an error of carrier frequencies between a transmitter and a receiver and/or phase noise is superimposed on a received signal, OFDM signals can be accurately demodulated by using a simple circuit with small process delay. Further, even when thermal noise is added to received signal in a receiver, degradation of communication quality can be reduced by using a simple circuit with no decrease of transmission efficiency.

Moreover, as phase rotation of a coherently detected signal is detected through weighting operation which uses channel estimation result and averaging operation, the phase rotation compensation is less affected by fading and/or thermal noise.

Further, pilot signals which are known are used for detecting phase rotation or accumulated phase rotation caused by clock frequency error, a circuit for detecting the phase rotation is simplified.

What is claimed is:

1. An OFDM packet communication receiver comprising:
    a receiving means (102) for receiving OFDM signals and carrying out a predetermined process to said OFDM signals,
    a synchronization means (103) for timing synchronization and carrier frequency synchronization for the received OFDM signals provided by said receiving means (102),
    a Fourier transform means (105) for carrying out Fourier transform of said received OFDM signals provided by said synchronization means to divide them into subcarrier signals for each OFDM symbol,
    a channel estimation means (106) for estimating channel condition of each subcarrier by using the subcarrier signals divided by said Fourier transform means,
    a coherent detection means (107) for carrying out coherent detection of the subcarrier signals divided by said Fourier transform means by using the channel estimation result provided by said channel estimation means,
    wherein a clock frequency error estimation means (100) for detecting phase rotation or accumulated phase rotation of a part or all of the coherently detected signals provided by the coherent detection means caused by clock frequency error between a transmitter and a receiver by detecting phase difference between the coherently detected signal (R1, R2) and a reference signal (S1 through S16), and generating phase rotation information ($\Delta\theta$) of each subcarrier signal caused by said clock frequency error ($f_{RCLK} - f_{TCLK}$),
    a phase rotation compensation means (109) for compensating the phase rotation of the coherently detected signals provided by said coherent detection means caused by clock frequency error according to said phase rotation information generated by said clock frequency error estimation means, and
    a decision means (112) for decision processing for the phase compensated coherently detected signals provided by said phase rotation compensation means.

2. An OFDM packet communication receive system according to claim 1, wherein said clock frequency error estimate means comprises:
    weighting means for weighting said phase rotation from a phase of a related reference signal in an output of said coherent detection means according to signal quality of each sub-carrier obtained in said channel estimating means, and smoothing means for smoothing weighted phase rotation along time axis, so that weighted and smoothed phase rotation is used for measuring phase rotation or accumulated phase rotation caused by clock frequency error.

3. An OFDM packet communication receiver of claim 1, wherein said clock frequency error estimation means estimates phase rotation or accumulated phase rotation of pilot signals included in the coherently detected signals provided by said coherent detection means caused by clock frequency error.

4. An OFDM packet communication receive system according to claim 1, wherein said clock frequency error estimate means comprises;

weighting means for weighting phase rotation of a pilot signal from n reference signal point, included in an output of said coherent detection means, and smoothing means for smoothing weighted phase rotation along a time axis, so that weighted and smoothed phase rotation is used for detecting phase rotation or accumulated phase rotation caused by clock frequency error.

5. An OFDM packet communication receive system comprising:

a receiving means for receiving OFDM signals and carrying out a predetermined process to said OFDM signals, a synchronization means for timing synchronization and carrier frequency synchronization for the received OFDM signals provided by said receiving means, a Fourier transform means for carrying out Fourier transform of said received OFDM signals provided by said synchronization means to divide them into subcarrier signals for each OFDM symbol, a channel estimation means for estimating channel condition of each subcarrier by using the subcarrier signals divided by said Fourier transform means, a coherent detection means for carrying out coherent detection of the subcarrier signals divided by said Fourier transform means by using the channel estimation result provided by said channel estimation means, a phase rotation compensation means for compensating phase rotation of the coherently detected signals provided by said coherent detection means caused by clock frequency error, a clock frequency error estimation means for detecting phase rotation of a part or all of the phase compensated coherently detected signals provided by the phase rotation compensation means caused by clock frequency error, generating phase rotation information of each subcarrier signal caused by said clock frequency error, and applying generated phase rotation: information to said phase rotation compensation means.

6. An OFDM packet communication receive system according to claim 5 wherein said clock frequency error estimation means comprises:

weighting means for weighting phase rotation of a part or all of detected signal from a reference signal point in an output of said coherent detection means according to signal quality of each sub-carrier obtained in said channel estimate means, and smoothing means for smoothing weighted phase rotation along a time axis, so that weighted and smoothed phase rotation is used to detect phase rotation caused by clock frequency error.

7. An OFDM packet communication receive system according to claim 5, wherein said clock frequency error estimation means estimates phase rotation of pilot signals included in the phase compensated coherently detected signals provided by said phase rotation compensation means caused by clock frequency error.

8. An OFDM packet communication receive system according to claim 5, wherein said clock frequency error estimation means comprises:

weighting means for weighting phase rotation of a pilot signal from a reference signal point, included in an output of said coherent detection means, and smoothing means for smoothing weighted phase rotation along a time axis, so that weighted and smoothed phase rotation is used for detecting said phase rotation caused by clock frequency error.

9. An OFDM packet communication receiver comprising:

a receiving means for receiving OFDM signals and carrying out a predetermined process to said OFDM signals, a synchronization means for timing synchronization and carrier frequency synchronization for the received OFDM signals provided by said receiving means, a Fourier transform means for carrying out Fourier transform of said received OFDM signals provided by said synchronization menus to divide them into subcarrier signals for each OFDM symbol, a channel estimation means for estimating channel condition of each subcarrier by using the subcarrier signals divided by said Fourier transform means, a coherent detection means for carrying out coherent detection of the subcarrier signals divided by said Fourier transform means by using the channel estimation result provided by said channel estimation means, a residual carrier frequency error estimation means for estimating phase rotation of a part or all of an output of said coherent detection means caused by residual carrier frequency error, a phase rotation estimation means for estimating phase rotation of the coherently detected signal provided by said coherent detection means caused by clock frequency error according to carrier frequency error information supplied by said synchronization means and residual carrier frequency error information supplied by said residual carrier frequency error estimation means, and a phase rotation compensation means for compensating phase rotation of coherently detected signal provided by said coherent detection means caused by clock frequency error according to phase rotation information supplied by said phase rotation estimation means.

10. An OFDM packet communication receive system according to claim 9, further comprising:

weighting means for weighting said phase rotation from a reference phase point of a detected signal in an output of said coherent detection means according to signal quality of each sub-carrier obtained in said channel estimation means, and smoothing means for smoothing the weighted phase rotation along a time axis, so that the weighted and smoothed phase rotation is applied to said residual carrier frequency error estimation means.

11. An OFDM packet communication receiver according to claim 9, wherein said residual carrier frequency error estimation means detects phase rotation of a coherently detected signal caused by residual carrier frequency error according to phase rotation of a pilot signal provided by said coherent detection means.

12. An OFDM packet communication receive system according to claim 9, further comprising:
- weighting means for weighting phase rotation of a pilot signal from a reference signal point, included in an output of said coherent detection means, and
- smoothing means for smoothing weighted phase rotation along a time axis, so that the weighted and smoothed phase rotation is applied to said residual carrier frequency error estimation means.

13. An OFDM packet communication receiver according to claim 9, wherein said residual carrier frequency error estimation means comprises a phase rotation information extraction means for extracting phase rotation information from a part or all of the input signals of said residual carrier frequency error estimation means, and a common phase rotation detection means which detects phase rotation common to all the subcarrier signals caused by residual carrier frequency error according to phase rotation information extracted by said phase rotation information extraction means.

14. An OFDM packet communication receiver according to claim 13, wherein said phase rotation information extraction means comprises a pilot signal extraction means for extracting pilot signals from the coherently detected signals inputted to: said phase rotation information extraction means, a reference signal generating means for generating reference signals corresponding to the pilot signals, and a phase rotation detection means for detecting phase rotation of the extracted pilot signals according to the reference signals.

15. An OFDM packet communication receiver according to claim 14, wherein said phase rotation detection means comprises a reverse modulation means for detecting phase rotation by reverse modulation.

16. An OFDM packet communication receiver according to claim 13, wherein said phase rotation detection means comprises a sign control means for detecting phase rotation by utilizing sign reverse control according to the reference signals provided by said reference signal generating means.

17. An OFDM packet communication receive system according to claim 14, further comprising:
- a delay compensation circuit for compensating phase error due to process delay in time-oriented moving average included in accumulated phase rotation which is subject to moving average according to an output of said division circuit providing a phase rotation per one OFDM symbol caused by a residual carrier frequency error of an output of said division means, and
- an addition means for adding accumulated phase rotation of an output of said delay circuit, and phase rotation due to clock frequency error of an output of said phase rotation estimation means,
- wherein said phase rotation compensation means compensates phase rotation caused by clock frequency error and residual carrier frequency error according to an output of said addition means.

18. An OFDM packet communication receiver according to claim 14, wherein said common phase rotation detection means comprises:
- an intra-symbol averaging means for carrying out averaging process to the phase rotation information within one OFDM symbol provided by the phase rotation detection means,
- a phase rotation accumulation means for calculating accumulated phase rotation from that time on the channel estimation according to the averaged phase rotation information provided by said intra-symbol averaging means,
- a moving average means for carrying out moving average process along time axis to the accumulated phase rotation information provided by said phase rotation accumulation means, and
- a division means for dividing moving averaged accumulated phase rotation provided by said moving average means by a difference between the number of OFDM symbols used for the accumulation and the number of delayed OFDM symbols caused by moving average process so that phase rotation caused by residual carrier frequency error for one OFDM symbol is obtained.

19. An OFDM packet communication receiver according to claim 18, wherein said phase rotation accumulation means comprises:
- a delay means for delaying the averaged phase rotation information within one OFDM symbol by one OFDM symbol period,
- a phase difference calculation means for calculating difference between the averaged phase rotation information provided by said intra-symbol averaging means and the delayed phase rotation information provided by said delay means so that phase rotation for each OFDM symbol is obtained, and
- an integration means for integrating the phase rotation information provided by said phase difference calculation means.

20. An OFDM packet communication receiver according to claim 18, wherein
said division means comprises a bit shift means for carrying out the division process by bit shift operation of N bits when a divisor can be expressed by 2 (N is a natural integer).

21. An OFDM packet communication receiver according to claim 13, wherein said phase rotation information extraction means comprises a specific symbol signal extraction means for extracting coherently detected signals in predetermined specific OFDM symbols inputted to said phase rotation information extraction means, a reference signal generating means for generating reference signals corresponding to said coherently detected signals provided by said specific symbol signal extraction means, and a phase rotation detection means for detecting phase rotation of said coherently detected signals provided by said specific symbol signal extraction means according to said reference signals provided by said reference signal generating means.

22. An OFDM packet communication receiver according to claim 21, wherein said reference signal generating means comprises a hard decision means for carrying out hard decision to the detected signals in the specific OFDM symbols provided by said specific symbol signal extraction means.

23. An OFDM packet communication receiver according to claim 21, wherein said phase rotation detection means comprises a reverse modulation means for detecting phase rotation by reverse modulation.

24. An OFDM packet communication receiver according to claim 21, wherein said phase rotation detection means comprises a sign control means for detecting phase rotation by utilizing sign reverse control according to the reference signals provided by said reference signal generating means.

25. An OFDM packet communication receiver according to claim 13, further comprising:
a weight coefficient calculation means for calculating weight coefficient for each subcarrier signal corresponding to the signal quality information obtained by the result of channel estimation,
a weighting means for weighting phase rotation information provided by said phase rotation information extraction means according to said weight coefficient of each subcarrier signal provided by said weight coefficient calculation means, 26. An OFDM packet communication receiver according to claim 25, wherein
a signal quality extraction means is provided for extracting signal quality information of a part or all of subcarrier signals divided by said Fourier transform means,
a signal quality smoothing means is provided for smoothing the signal quality information provided by said signal quality extraction means for each subcarrier along time axis,
said weighting means weights the phase rotation information according to smoothed signal quality information of the coherently detected signals provided by said signal quality smoothing means.

27. An OFDM packet communication receiver according to claim 26, wherein
said signal quality smoothing means carries out moving average process to signal quality information of coherently detected signals provided by said signal quality extraction means along time axis for each subcarrier.

28. An OFDM packet communication receive system according to claim 26, wherein
said signal quality smoothing means integrates the signal quality information of the coherently detected signals provided by said signal quality extraction means along the time axis to arrive at an integrated value, and divides said integrated value by the number of signals thus integrated.

29. An OFDM packet communication receive system according to claim 26, wherein
said signal quality smoothing means integrates the signal quality information of the coherently detected signals provided by said signal quality extraction means along the time axis to arrive at an integrated value, and divides said integrated value by bit shifting of N bits when the number of signals thus integrated can be expressed by 2 (N is a natural integer).

30. An OFDM packet communication receive system according to claim 25, wherein
a clock frequency error mitigation means is provided for reducing phase rotation of the phase rotation information provided by said phase rotation information extraction means caused by clock frequency error according to of the phase rotation information provided by said phase rotation estimation means, and
said weighting means weights the phase rotation information provided by said clock frequency error mitigation means.

31. An OFDM packet communication receiver according to claim 13, wherein said common phase rotation detection means comprises:
an intra-symbol averaging means for carrying out averaging process to the phase rotation information within one OFDM symbol provided by the phase rotation detection means,
a phase rotation accumulation means for calculating accumulated phase rotation from that time on the channel estimation according to the averaged phase rotation information provided by said intra-symbol averaging means,
a moving average means for carrying out moving average process along time axis to the accumulated phase rotation information provided by said phase rotation accumulation means, and
a division means for dividing moving averaged accumulated phase rotation provided by said moving average means by a difference between the number of OFDM symbols used for the accumulation and the number of delayed OFDM symbols caused by moving average process so that phase rotation caused by residual carrier frequency error for one OFDM symbol is obtained.

32. An OFDM packet communication receiver according to claim 31, wherein said phase rotation accumulation means comprises:
a delay means for delaying the averaged phase rotation information within one OFDM symbol by one OFDM symbol period,
a phase difference calculation means for calculating difference between the averaged phase rotation information provided by said intra-symbol averaging means and the delayed phase rotation information provided by said delay means so that phase rotation for each OFDM symbol is obtained, and
an integration means for integrating the phase rotation information provided by said phase difference calculation means.

33. An OFDM packet communication receiver according to claim 31, wherein
said division means comprises a bit shift means for carrying out the division process by bit shift operation of N bits when a divisor can be expressed by 2 (N is a natural integer).

34. An OFDM packet communication receive system according to claim 31, further comprising;
a delay compensation circuit for compensating phase error due to process delay in time-oriented moving average included in accumulated phase rotation which is subject to moving average according to an output of said division circuit providing a phase rotation per one OFDM symbol caused by a residual carrier frequency error of an output of said division means, and
an addition means for adding accumulated phase rotation of an output of said delay circuit, and phase rotation due to clock frequency error of an output of said phase rotation estimation means,
wherein said phase rotation compensation means compensates phase rotation caused by clock frequency error and residual carrier frequency error according to an output of said addition means.
and said common phase rotation detection means detects phase rotation common to each subcarrier signal caused by residual carrier frequency error according to phase rotation information supplied by said weighting circuit.

35. An OFDM packet communication receiver according to claim 13, wherein said common phase rotation detection means comprises:

an intra-symbol averaging means for averaging phase rotation information applied to said common phase rotation detection means within one OFDM symbol, a delay means for delaying the averaged phase rotation information provided by said intra-symbol averaging means by one OFDM symbol period, a phase difference calculation means for calculating the difference between the averaged phase rotation information provided by said intra-symbol Averaging means and the delayed phase rotation information provided by said delay means so that phase rotation for each OFDM symbol is obtained, and a time-oriented moving average means for carrying out moving average process along the time axis to the phase rotation information provided by said phase difference calculation means.

36. An OFDM packet communication receiver comprising:

a receiving means for receiving OFDM signals and carrying out a predetermined process to said OFDM signals, a synchronization means for timing synchronization and carrier frequency synchronization for the received OFDM signals provided by said receiving means, a Fourier transform means for carrying out Fourier transform of said received OFDM signals provided by said synchronization means to divide them into subcarrier signals for each OFDM symbol, a channel estimation means for estimating channel condition of each subcarrier by using the subcarrier signals divided by said Fourier transform means, a coherent detection means for carrying out coherent detection of the subcarrier signals divided by said Fourier transform means by using the channel estimation result provided by said channel estimation means, a first phase rotation estimation means for estimating phase rotation of each subcarrier signal caused by clock frequency error according to carrier frequency error information supplied by said synchronization means, a first phase rotation compensation means for compensating phase rotation of coherently detected signals provided by said coherent detection means caused by clock frequency error according to phase rotation information provided by said first phase rotation estimation means, a residual carrier frequency error estimation means for estimating phase rotation of a part or all of phase compensated signals provided by said first phase rotation compensation means caused by residual carrier frequency error, a second phase rotation estimation means for estimating residual phase rotation caused by clock frequency error of the phase compensated signal provided by said first phase rotation compensation means according to the residual carrier frequency error information supplied by said residual carrier frequency error estimation means, and a second phase rotation compensation means for compensating residual phase rotation of the phase compensated signal provided by said first phase rotation compensation means caused by clock frequency error according to the residual phase rotation information supplied by said second phase rotation estimation means.

37. An OFDM packet communication receive system according to claim 31, further comprising:

weighting means for weighting phase rotation from a reference signal point of an output of said first phase rotation compensation means according to signal quality of each sub-carrier obtained in said channel estimate means, and smoothing means for smoothing weighted phase rotation along a time axis, so that weighted and smoothed phase rotation is applied to said residual carrier frequency error estimation means.

38. An OFDM packet communication receiver according to claim 36, wherein said residual carrier frequency error estimation means estimates phase rotation of pilot signals included in the phase compensated signals provided by said first phase compensation means caused by residual carrier frequency error.

39. An OFDM packet communication receive system according to claim 31, further comprising:

weighting means for weighting phase rotation from a reference point of a pilot signal in an output of said first phase rotation compensation means according to signal quality of each sub-carrier obtained in said channel estimate means, and smoothing means for smoothing weighted phase rotation along a time axis, so that weighted and smoothed phase rotation is applied to said residual carrier frequency error estimation means.

40. An OFDM packet communication receiver according to claim 36, wherein said residual carrier frequency error estimation means comprises a phase rotation information extraction means for extracting phase rotation information from a part or all of the input signals of said residual carrier frequency error estimation means, and a common phase rotation detection means which detects phase rotation common to all the subcarrier signals caused by residual carrier frequency error according to phase rotation information extracted by said phase rotation information extraction means.

41. An OFDM packet communication receiver according to claim 40, wherein said phase rotation information extraction means comprises a specific symbol signal extraction means for extracting coherently detected signals in predetermined specific OFDM symbols inputted to said phase rotation information extraction means, a reference signal generating means for generating reference signals corresponding to said coherently detected signals provided by said specific symbol signal extraction means, and a phase rotation detection means for detecting phase rotation of said coherently detected signals provided by said specific symbol signal extraction means according to said reference signals provided by said reference signal generating means.

42. An OFDM packet communication receiver according to claim 41, wherein said reference signal generating means comprises a hard decision means for carrying out hard decision to the detected signals in the specific OFDM symbols provided by said specific symbol signal extraction means.

43. An OFDM packet communication receiver according to claim 41, wherein said phase rotation detection means comprises a reverse modulation means for detecting phase rotation by reverse modulation.

44. An OFDM packet communication receiver according to claim 41, wherein said phase rotation detection means comprises a sign control means for detecting phase rotation by utilizing sign reverse control according to the reference signals provided by said reference signal generating means.

45. An OFDM packet communication receiver according to claims 41, wherein said phase rotation detection means comprises a sign control means for detecting phase rotation by utilizing sign reverse control according to the reference signals provided by said reference signal generating means.

46. An OFDM packet communication receiver according to claim 41, wherein said phase rotation detection means comprises a signal control means for detecting phase rotation by utilizing sign reverse control according to the reference signals provided by said reference signal generating means.

47. An OFDM packet communication receiver according to claim 41, further comprising:
a weight coefficient calculation means for calculating weight coefficient for each subcarrier signal corresponding to the signal quality information obtained by the result of channel estimation,
a weighting means for weighting phase rotation information provided by said phase rotation information extraction means according to said weight coefficient of each subcarrier signal provided by said weight coefficient calculation means,
and said common phase rotation detection means detects phase rotation common to each subcarrier signal caused by residual carrier frequency error according to phase rotation information supplied by said weighting circuit.

48. An OFDM packet communication receiver according to claim 47, wherein
a signal quality extraction means is provided for extracting signal quality information of a part or all of subcarrier signals divided by said Fourier transform means,
a signal quality smoothing means is provided for smoothing the signal quality information provided by said signal quality extraction means for each subcarrier along time axis,
said weighting means weights the phase rotation information according to smoothed signal quality information of the coherently detected signals provided by said signal quality smoothing means.

49. An OFDM packet communication receiver according to claim 48, wherein
said signal quality smoothing means carries out moving average process to signal quality information of coherently detected signals provided by said signal quality extraction means along time axis for each subcarrier.

50. An OFDM packet communication receive system according to claim 48, wherein
said signal quality smoothing means integrates the signal quality information of the coherently detected signals provided by said signal quality extraction means along the time axis to arrive at an integrated value, and divides said integrated value by the number of signals thus integrated.

51. An OFDM packet communication receive system according to claim 48, wherein
said signal quality smoothing means integrates the signal quality information of the coherently detected signals provided by said signal quality extraction means along the tine axis to arrive at an integrated value, and divides said integrated value by bit shifting of N bits when the number of signals thus integrated can be expressed by 2 (N is a natural integer).

52. An OFDM packet communication receive system according to claim 48, wherein
a clock frequency error mitigation means is provided for reducing phase rotation of the phase rotation information provided by said phase rotation information extraction means caused by clock frequency error according to of the phase rotation information provided by said phase rotation estimation means, and
said weighting means weights the phase rotation information provided by said clock frequency error mitigation means.

53. An OFDM packet communication receiver according to claim 40, wherein
a signal quality extraction means is provided for extracting signal quality information of a part or all of subcarrier signals divided by said Fourier transform means,
a signal quality smoothing means is provided for smoothing the signal quality information provided by said signal quality extraction means for each subcarrier along time axis,
said weighting means weights the phase rotation information according to smoothed signal quality information of the coherently detected signals provided by said signal quality smoothing means.

54. An OFDM packet communication receiver according to claim 53, wherein
said signal quality smoothing means carries out moving average process to signal quality information of coherently detected signals provided by said signal quality extraction means along time axis for each subcarrier.

55. An OFDM packet communication receive system according to claim 53, wherein
said signal quality smoothing means integrates the signal quality information of the coherently detected signals provided by said signal quality extraction means along the time axis to arrive at an integrated value, and divides said integrated value by the number of signals thus integrated.

56. An OFDM packet communication receive system according to claim 53, wherein
said signal quality smoothing means integrates the signal quality information of the coherently detected signals provided by said signal quality extraction means along the time axis to arrive at an integrated value, and divides said integrated value by bit shifting of N bits when the number of signals thus integrated can be expressed by 2 (N is a natural integer).

57. An OFDM packet communication receive system according to claim 53, wherein
a clock frequency error mitigation means is provided for reducing phase rotation of the phase rotation information provided by said phase rotation information extraction means caused by clock frequency error according to of the phase rotation information provided by said phase rotation estimation means, and
said weighting means weights the phase rotation information provided by said clock frequency error mitigation means.

58. An OFDM packet communication receive system according to claim 47, wherein
a clock frequency error mitigation means is provided for reducing phase rotation of the phase rotation information provided by said phase rotation information extraction means caused by clock frequency error according to of the phase rotation information provided by said phase rotation estimation means, and
said weighting means weights the phase rotation information provided by said clock frequency error mitigation means.

59. An OFDM packet communication receiver according to claim 40, wherein said common phase rotation detection means comprises:

an intra-symbol averaging means for carrying out averaging process to the phase rotation information within one OFDM symbol provided by the phase rotation detection means, a phase rotation accumulation means for calculating accumulated phase rotation from that time on the channel estimation according to the averaged phase rotation information provided by said intra-symbol averaging means, a moving average means for carrying out moving average process along time axis to the accumulated phase rotation information provided by said phase rotation accumulation means, and a division means for dividing moving averaged accumulated phase rotation provided by said moving average means by a difference between the number of OFDM symbols used for the accumulation and the number of delayed OFDM symbols caused by moving average process so that phase rotation caused by residual carrier frequency error for one OFDM symbol is obtained.

60. An OFDM packet communication receiver according to claim 59, wherein said phase rotation accumulation means comprises:

a delay means for delaying the averaged phase rotation information within one OFDM symbol by one OFDM symbol period, a phase difference calculation means for calculating difference between the averaged phase rotation information provided by said intra-symbol averaging means and the delayed phase rotation information provided by said delay means so that phase rotation for each OFDM symbol is obtained, and an integration means for integrating the phase rotation information provided by said phase difference calculation means.

61. An OFDM packet communication receiver according to claim 59, wherein said division means comprises a bit shift means for carrying out the division process by bit shift operation of N bits when a divisor can be expressed by 2 (N is a natural integer).

62. An OFDM packet communication receiver according to claim 40, wherein said common phase rotation detection means comprises:

an intra-symbol averaging means for averaging phase rotation information applied to said common phase rotation detection means within one OFDM symbol, a delay means for delaying the averaged phase rotation information provided by said intra-symbol averaging means by one OFDM symbol period, a phase difference calculation means for calculating the difference between the averaged phase rotation information provided by said intra-symbol averaging means and the delayed phase rotation information provided by said delay means so that phase rotation for each OFDM symbol is obtained, and a time-oriented moving average means for carrying out moving average process along the time axis to the phase rotation information provided by said phase difference calculation means.

63. An OFDM packet communication receive system according to claim 40, further comprising:

a delay compensation circuit for compensating phase error due to process delay in time-oriented moving average included in accumulated phase rotation which is subject to moving average according to an output of said division circuit providing a phase rotation per one OFDM symbol caused by a residual carrier frequency error of an output of said division means, and an addition means for adding accumulated phase rotation of an output of said delay circuit, and phase rotation due to clock frequency error of an output of said phase rotation estimation means, wherein said phase rotation compensation means compensates phase rotation caused by clock frequency error and residual carrier frequency error according to an output of said addition means.

64. An OFDM packet communication receiver according to claim 40, wherein said phase rotation information extraction means comprises a pilot signal extraction means for extracting pilot signals from the coherently detected signals inputted to said phase rotation information extraction means, a reference signal generating means for generating reference signals corresponding to the pilot signals, and a phase rotation detection means for detecting phase rotation of the extracted pilot signals according to the reference signals.

65. An OFDM packet communication receiver according to claim 64, wherein said phase rotation detection means comprises a reverse modulation means for detecting phase rotation by reverse modulation.

66. An OFDM packet communication receiver according to claim 64, wherein said phase rotation detection means comprises a sign control means for detecting phase rotation by utilizing sign reverse control according to the reference signals provided by said reference signal generating means.

67. An OFDM packet communication receiver comprising:

a receiving means for receiving OFDM signals and carrying out a predetermined process to said OFDM signals, a synchronization means for timing synchronization and carrier frequency synchronization for the received OFDM signals provided by said receiving means, a Fourier transform means for carrying out Fourier transform of said received OFDM signals provided by said synchronization means to divide them into subcarrier signals for each OFDM symbol, a channel estimation means for estimating channel condition of each subcarrier by using the subcarrier signals divided by said Fourier transform means, a coherent detection means for carrying out coherent detection of the subcarrier signals divided by said Fourier transform means by using the channel estimation result provided by said channel estimation means, a phase rotation information extraction means for extracting phase rotation information from a part or all of the output signals of said coherent detection means, a signal quality extraction means for extracting signal quality information of a part or all of the subcarrier signals divided by said Fourier transform circuit, a smoothing means for smoothing said signal quality information of each subcarrier provided by said signal quality extraction means along a time axis, a weighting means for weighting said phase rotation information provided by said phase rotation information extraction means according to smoothed signal quality information provided by said smoothing means, a common phase rotation detection means for detecting phase rotation of the coherently detected signals provided by said coherent detection means caused by residual carrier frequency error according to said weighted phase rotation information, and a phase rotation compensation means for compensating phase rotation of the coherently detected signals provided by said coherent detection means according to the estimated phase rotation information provided by said common phase rotation estimation detection means.

68. An OFDM packet communication receiver according to claim 67, wherein said common phase rotation detection means comprises an intra-symbol averaging means for averaging phase rotation information inputted to said common phase rotation detection means in one OFDM symbol, and a moving average means for carrying out moving average of a signal averaged by said intra-symbol averaging means in one OFDM symbol along said time axis.

69. An OFDM packet communication receiver according to claim 67, wherein
said signal quality smoothing means carries out moving average process to signal quality information of coherently detected signals provided by said signal quality extraction means along time axis for each subcarrier.

70. An OFDM packet communication receive system according to claim 67, wherein
said signal quality smoothing means integrates the signal quality information of the coherently detected signals provided by said signal quality extraction means along the time axis to arrive at an integrated value, and divides said integrated value by the number of signals thus integrated.

71. An OFDM packet communication receive system according to claim 67, wherein
said signal quality smoothing means integrates the signal quality information of the coherently detected signals provided by said signal quality extraction means along the time axis to arrive at an integrated value, and divides said integrated value by bit shifting of N bits when the number of signals thus integrated can be expressed by 2 (N is a natural integer).

72. An OFDM packet communication receiver according to claim 67, wherein said common phase rotation detection means comprises:
a phase rotation accumulation means for calculating accumulated phase rotation from that time on the channel estimation according to the phase rotation information provided by said weighting means,
an intra-symbol averaging means for averaging the accumulated phase rotation information provided by said phase rotation accumulation means within one OFDM symbol period,
a time-oriented moving average means for carrying out moving average process along time axis to the averaged accumulated phase rotation information provided by said intra-symbol averaging means,
a division means for dividing moving averaged accumulated phase rotation information provided by said time-oriented moving average means by a difference between the number of OFDM symbols used for the accumulation and the number of delayed OFDM symbols caused by the moving average process along time axis so that phase rotation caused by residual carrier frequency error for one OFDM symbol is obtained, and
a delay compensation means for compensating phase error of the phase rotation information provide by said time-oriented moving average means caused by the moving average process along time axis according to the information of phase rotation per one OFDM symbol caused by residual carrier frequency error provided by said division means.

73. An OFDM packet communication receiver according to claim 67, wherein said common phase rotation detection means comprises:
an intra-symbol averaging means for carrying out averaging process to the weighted phase rotation information per one OFDM symbol provided by said weighting means,
a unit amount calculation means for calculating phase rotation of the coherently detected signals for one OFDM symbol caused by residual carrier frequency error according to the averaged accumulated phase rotation information provided by said intra-symbol averaging means,
a phase rotation estimation means for estimating phase rotation provided by said coherent detection means caused by residual carrier frequency error according to the phase rotation information for one OFDM symbol caused by residual carrier frequency error provided by said unit amount calculation means.

74. An OFDM packet communication receiver according to claim 73, further comprising:
a weight coefficient calculation means for calculating weight coefficient corresponding to the signal quality of each subcarrier signal according to channel estimation result provided by said channel estimation means, so that said weighting means weights phase rotation information provided by said phase rotation information extraction means according to the signal quality supplied by said weight coefficient calculation means.

75. An OFDM packet communication receiver according to claim 73, wherein
when the signal provided by said weighting means is vector signal,
said intra-symbol averaging means comprises an intra-symbol vector sum calculation means for carrying out averaging process to the phase component of said vector signal by summing the vector signals provided by said weighting means within one OFDM symbol, and a vector phase detection means for detecting phase of said vector sum provided by said intra-symbol vector sum calculation means.

76. An OFDM packet communication receiver comprising:
a receiving means for receiving OFDM signals and carrying out a predetermined process to said OFDM signals,
a synchronization means for timing synchronization and carrier frequency synchronization for the received OFDM signals provided by said receiving means,
a Fourier transform means for carrying out Fourier transform of said received OFDM signals provided by said synchronization means to divide them into subcarrier signals for each OFDM symbol,
a channel estimation means for estimating channel condition of each subcarrier by using the subcarrier signals divided by said Fourier transform means,
a coherent detection means for carrying out coherent detection of the subcarrier signals divided by said Fourier transform means by using the channel estimation result provided by said channel estimation means,
specific symbol signal extraction means for extracting coherently detected signals in at least one specific OFDM symbol provided by said coherent detection means,
a hard decision means for carrying out hard decision to the coherently detected signals extracted by said specific symbol signal extraction means, a first phase rotation detection means for detecting phase rotation of said extracted signals provided by said specific symbol signal extraction means according to the hard decision result provided by said hard decision means, a weight coefficient calculation means for calculating weight coefficient of each subcarrier signal corresponding to the signal quality according to the result of channel estimation provided by said channel estimation means, a weighting means for weighting phase rotation information detected by said first phase rotation detection means according to said weight coefficient of each subcarrier signal, a first common phase rotation detection means for detecting phase rotation common to each subcarrier signal caused by residual carrier frequency error according to said weighted phase rotation information provided by said weighting means, a pilot signal extraction means for extracting pilot signals from the coherently detected signals provided by said coherently detection means, a reference signal generating means for generating reference signals corresponding to the pilot signals extracted by said pilot signal extraction means, a second phase rotation detection means for detecting phase rotation of the pilot signals provided by said pilot signal extraction means, a second common phase rotation detection means for detecting phase rotation common to each subcarrier signal caused by residual carrier frequency error according to the phase rotation information provided by said second phase rotation detection means, a selection means for selecting one of the outputs of said first common phase rotation detection means and said second common phase rotation detection means according to the number of OFDM symbols provided by said coherent detection means, a phase rotation estimation means for estimating phase rotation caused by residual carrier frequency error of the coherently detected signals provided by said coherent detection means according to the selected phase rotation information provided by said selection means, a phase rotation compensation means for compensating phase rotation of the coherently detected signals provided by said coherent detection means according to the phase rotation information provided by said phase rotation estimation means.

77. An OFDM packet communication receiver according to claim 76, wherein a clock frequency is synchronized with carrier frequency in both a transmitter and a receiver, phase rotation estimation means is provided for estimating phase rotation of the coherently detected signals provided by said coherent detection means caused by clock frequency error according to the carrier frequency error information provided by said synchronization means and phase rotation information caused by residual carrier frequency error provided by said selection means, and said phase rotation compensation means compensates phase rotation of the coherently detected signals provided by said coherent detection means according to the phase rotation information provided by said phase rotation estimation means.

78. An OFDM packet communication receiver according to claim 77, wherein said second common phase rotation detection means comprises:

an intra-symbol averaging means for carrying out averaging process within one OFDM symbol to the phase rotation information provided by said second phase rotation detection means, a phase rotation accumulation means for calculating accumulated phase rotation from that time on the channel estimation according to the phase rotation information provided by said intra-symbol averaging means, a time-oriented moving average means for carrying out moving average process along time axis to the accumulated phase rotation information provided by said phase rotation accumulation means, and a division means for dividing moving averaged accumulated phase rotation provided by said time-oriented moving average means by a difference between the number of OFDM symbols used for the accumulation and the number of delayed OFDM symbols caused by the moving average process so that phase rotation caused by residual carrier frequency error for one OFDM symbol is obtained.

79. AN OFDM packet communication receiver according to claim 78, wherein said phase rotation accumulation means comprises:

a delay means for delaying the averaged phase rotation information within one OFDM symbol by one OFDM symbol period, a phase difference calculation means for calculating difference between the averaged phase rotation information provided by said intra-symbol averaging means and the delayed phase rotation information provided by said delay means so that phase rotation for each OFDM symbol is obtained, and an integration means for integrating the phase rotation information provided by said phase difference calculation means.

80. An OFDM packet communication receiver according to claim 76, wherein said second common phase rotation detection means comprises:

an intra-symbol averaging means for carrying out averaging process within one OFDM symbol to the phase rotation information provided by said second phase rotation detection means, a phase rotation accumulation means for calculating accumulated phase rotation from that time on the channel estimation according to the phase rotation information provided by said intra-symbol averaging means, a time-oriented moving average means for carrying out moving average process along time axis to the accumulated phase rotation information provided by said phase rotation accumulation means, and a division means for dividing moving averaged accumulated phase rotation provided by said time-oriented moving average means by a difference between the number of OFDM symbols used for the accumulation and the number of delayed OFDM symbols caused by the moving average process so that phase rotation caused by residual carrier frequency error for one OFDM symbol is obtained.

81. An OFDM packet communication receiver according to claim 80, wherein said division means comprises a bit shift means for carrying out division process by bit shift operation of N bits when a divisor can be expressed by 2 (N is a natural integer).

82. An OFDM packet communication receiver according to claim 80, wherein
- a delay compensation means for compensating phase error of the phase rotation information provided by said time-oriented moving average means caused by moving average process along time axis according to the information of phase rotation per one OFDM symbol caused by residual carrier frequency error provided by said selection means, and
- an addition means for adding delay-compensated accumulated phase rotation information provided by said delay compensation means, and phase rotation compensation means for compensating phase rotation caused by clock frequency error and residual carrier frequency error according to the signals provided by said addition means.

83. An OFDM packet communication receiver according to claim 80, wherein
said division means comprises a bit shift means for carrying out the division process by bit shift operation of N bits when a divisor can be expressed by 2 (N is a natural integer).

84. An OFDM packet communication receiver according to claim 80, wherein
said division means comprises a bit shift means for carrying out division process by bit shift operation of N bits when a divisor can be expressed by 2 (N is a natural integer).

85. An OFDM packet communication receiver according to claim 76, wherein said first common phase rotation detection means comprises:
- an intra-symbol averaging means for carrying out averaging process to said weighted phase rotation information provided by said weighting means within one OFDM symbol,
- a unit amount calculation means for calculating phase rotation of the coherently detected signals caused by residual carrier frequency error for one OFDM symbol according to the averaged accumulated phase rotation information provided by said intra-symbol averaging means.

86. An OFDM packet communication receiver according to claim 76, wherein said first phase rotation detection means comprises a reverse modulation means for detecting said phase rotation by reverse modulation.

87. An OFDM packet communication receiver according to claim 76, wherein said first phase rotation detection means comprises a sign control means for detecting said phase rotation by carrying out sign inversion control according to the result of hard decision provided by said hard decision means (2804).

88. An OFDM packet communication receive system according to claim 76, wherein phase rotation of an output of said second phase rotation detection circuit is weighted by a second weighting means according to weight coefficient of each sub-carrier.

89. An OFDM packet communication receiver according to claim 88, wherein
- a clock frequency error mitigation means is provided for compensating phase error of the phase rotation information provided by said second phase rotation detection means caused by clock frequency error according to the phase rotation information generated by said phase rotation estimation means, and
- said second weighting means weights; to the phase-compensated phase rotation information provided by said clock frequency error mitigation means.

90. An OFDM packet communication receiver according to claim 76, wherein,
- when the signal provided by said weighting means is vector signal,
- said intra-symbol averaging means comprises an intra-symbol vector sum calculation means for carrying out averaging process to the phase component of said vector signal by summing the vector signals provided by said weighting means within one OFDM symbol, and a vector phase detection means for detecting phase of said vector sum provided by said intra-symbol vector sum calculation means.

91. An OFDM packet communication receiver according to claim 76, wherein said second common phase rotation detection means comprises:
- an intra-symbol averaging means for carrying out averaging process to phase rotation information applied to the second common phase rotation detection means within one OFDM symbol,
- a delay means for delaying said averaged phase rotation information provided by said intra-symbol averaging means by one OFDM symbol period,
- a phase difference calculation means for calculating phase rotation for each OFDM symbol between averaged phase rotation information provided by said intra-symbol averaging means and a delayed phase rotation information provided by said delay means, and
- a time-oriented moving average means for carrying out moving average process along time axis to said phase rotation information for each OFDM symbol provided by said phase difference calculation means.

* * * * *